(12) United States Patent
Niitani et al.

(10) Patent No.: US 7,919,570 B2
(45) Date of Patent: Apr. 5, 2011

(54) MULTIBRANCHED POLYMER AND METHOD FOR PRODUCING THE SAME

(75) Inventors: Takeshi Niitani, Ichihara (JP); Kiyoshi Kawamura, Chiba (JP); Akihiro Shirai, Ichihara (JP)

(73) Assignee: Nippon Soda Co., Ltd., Tokyo (JP)

( * ) Notice: Subject to any disclaimer, the term of this patent is extended or adjusted under 35 U.S.C. 154(b) by 1088 days.

(21) Appl. No.: 11/573,635

(22) PCT Filed: Aug. 11, 2005

(86) PCT No.: PCT/JP2005/014788
§ 371 (c)(1),
(2), (4) Date: Feb. 12, 2007

(87) PCT Pub. No.: WO2006/016665
PCT Pub. Date: Feb. 16, 2006

(65) Prior Publication Data
US 2008/0214685 A1    Sep. 4, 2008

(30) Foreign Application Priority Data

Aug. 13, 2004  (JP) ................... 2004-235855
Dec. 21, 2004  (JP) ................... 2004-368908
Jan. 31, 2005  (JP) ................... 2005-024232

(51) Int. Cl.
*C08F 116/12* (2006.01)
(52) U.S. Cl. .................... 526/209; 526/332; 526/333
(58) Field of Classification Search ................ 526/209, 526/332, 333
See application file for complete search history.

(56) References Cited

U.S. PATENT DOCUMENTS

| | | | |
|---|---|---|---|
| 5,102,966 A | 4/1992 | Higashimura et al. | |
| 5,338,532 A | 8/1994 | Tomalia et al. | |
| 6,222,004 B1 * | 4/2001 | Ishikawa et al. | 528/196 |
| 6,268,462 B1 * | 7/2001 | Okamoto et al. | 528/204 |
| 6,288,221 B1 * | 9/2001 | Grinstaff et al. | 536/25.3 |

FOREIGN PATENT DOCUMENTS

| | | |
|---|---|---|
| JP | 4-363306 A | 12/1992 |
| JP | A 4-363306 | 12/1992 |
| JP | 6-219966 A | 8/1994 |
| JP | A 6-219966 | 8/1994 |
| JP | 10-019515 A | 1/1998 |
| JP | A 10-19515 | 1/1998 |
| JP | 2000-10244 A | 4/2000 |
| JP | A 2000-100244 | 4/2000 |
| JP | 2002-20479 A | 1/2002 |
| JP | A 2002-20479 | 1/2002 |
| JP | 2004-107641 A | 4/2004 |
| JP | A 2004-107641 | 4/2004 |
| JP | 2004-189664 A | 7/2004 |
| JP | A 2004-189664 | 7/2004 |
| WO | WO 02/40594 A1 | 5/2002 |
| WO | WO-02/40594 A1 | 5/2002 |

OTHER PUBLICATIONS

Moinard, et al SAXS from four-Arm Polyelectrolyte Stars in Semi-Dilute Solutions, Macromol. Chem. Phys., vol. 204, pp. 89-97, 2003.
Gnanou et al., "Synthesis of Star-Shaped Poly(ethylene oxide)", Makromol. Chem., vol. 189, pp. 2885-2892, 1988.
Chen et al., "Isothermal Thickening and Thinning Processes in Low-Molecular-Weight Poly(ethylene oxide) Fractions Crystallized from the Melt. 8. Molecular Shape Dependence", Macromolecules, vol. 32, pp. 4784-4793, 1999.
Weyermann et al., "Dendritic Iron Porphyrins with Tethered Axial Ligands: New Model Compounds for Cytochromes", Angew Chem. Int. Ed., vol. 38, No. 21, pp. 3215-3219, 1999.
Kilian et al., "Synthesis and Cleavage of Core-Labile Poly(Alkyl Methacrylate) Star Polymers", Journal of Polymer Science Part A: Polymer Chemistry, vol. 41, pp. 3083-3093, 2003.
Khan et al., "ABA Triblock Comb Copolymers with Oligo(oxyethylene) Side Chains as Matrix for Ion Transport", Makromol. Chem., vol. 190, pp. 1069-1078, 1989.
Rizzardo et al., Radical Polymerization Handbook, pp. 107-114, 1999 (w/partial English translation).
Benoit et al., "Development of a Universal Alkoxyamine for "Living" Free Radical Polymerizations", J. Am. Chem. Soc., vol. 121, pp. 3904-3920, 1999.
International Search Report for PCT/JP2005/014788 mailed Dec. 6, 2005.
"Synthesis of star-shaped poly(ethylene oxide)" by Gnanou et al., Makromol. Chem. 189, pp. 2885-2892 (1988).

(Continued)

*Primary Examiner* — Bernard Lipman
(74) *Attorney, Agent, or Firm* — Oliff & Berridge, PLC

(57) ABSTRACT

The present invention provides a multibranched polymer represented by the following formula (I), and a method for producing the multibranched polymer:

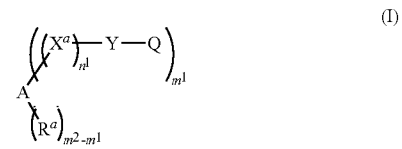

(I)

wherein A represents an organic group having 3 or more branched chains, $X^a$ represents a linking group containing any atom of Groups 14 to 16 in the Periodic Table, Y represents a functional group having a structure capable of having an active halogen atom, Q represents an arm moiety having a repeating unit derived from a polymerizable unsaturated bond, $m^1$ represents any integer of 1 to the number of branched chains of A, $m^2$ represents the number of branched chains of A, $n^1$ represents an integer of 0 or 1 or more, and $R^a$ represents an organic group which is not associated with the polymerization reaction.

6 Claims, 3 Drawing Sheets

OTHER PUBLICATIONS

"Isothermal Thickening and Thinning Processes in Low-Molecular-Weight Poly(ethylene oxide) Fractions Crystallized from the Melt, 8. Molecular Shape Dependence§" by Chen et al., Macromolecules 1999, 32, pp. 4754-4793.

"Dendritic Iron Porphyrins with Tethered Axial Ligands: New Model Compounds for Cytochromes", Weyermann et al., Angew. Chem. Int. Ed. 1999, 38, No. 21, pp. 3215-3219.

"Synthesis and Cleverage of Core-Labile Poly(Alkyl Methacrylate) Star Polymers" by Kilian et al., Journal of Polymer Science, Part A: Polymer Chemistry, vol. 41, pp. 3083-3093.

"ABA Triblock comb copolymers with oligo(oxyethylene) side chains as matrix for ion transport a)" by Khan et al., Makromol. Chem. 190, pp. 1069-1078 (1989).

"Radical Polymerization Handbook", pp. 107 (1999).

"Development of a Universal Alkoxyamine for "Living" Free Radical Polymerizations", by Benoit et al., J. Am. Chem. Soc. 1999. 121, pp. 3904-3920.

* cited by examiner

- ◆ : Polymer 13        TDI(100%) LiPF$_6$
- ◇ : Polymer 13        LiPF$_6$
- ● : Linear Polymer    TDI(100%) LiPF$_6$
- ○ : Linear Polymer    LiPF$_6$

MULTIBRANCHED POLYMER AND METHOD FOR PRODUCING THE SAME

CROSS-REFERENCE TO PRIOR APPLICATION

This is a U.S. National Phase Application under 35 U.S.C. §371 of International Patent Application No. PCT/JP2005/014788 filed Aug. 11, 2005, and claims the benefit of Japanese Patent Application Nos. 2004-235855, filed Aug. 13, 2004, 2004-368908, filed Dec. 21, 2004 and 2005-024232, filed Jan. 31, 2005, all of which are incorporated by reference herein. The International Application was published in Japanese on Feb. 16, 2006 as WO 2006/016665 A1 under PCT Article 21(2).

TECHNICAL FIELD

The present invention relates to a multibranched polymer comprising a core moiety having 3 or more branched chains, and an arm moiety having a repeating unit derived from a polymerizable unsaturated bond, which is bonded with a branched chain of the core moiety, and a method for producing the same.

Also, the present invention relates to a polymer solid electrolyte comprising a multibranched polymer comprising a core moiety and an arm moiety having a repeating unit derived from a polymerizable unsaturated bond having a polyalkylene oxide group, and a polymer solid electrolyte battery comprising the polymer solid electrolyte.

BACKGROUND OF THE INVENTION

There has hitherto been known a multibranched polymer having a structure comprising a core moiety constituting a core and a lot of arm chains which is bonded with the core moiety.

As a method for producing such a multibranched polymer, for example,
(a) a method comprising the steps of converting AB type and ABA type block polymers each having a different amphiphilic property into micelles in a solvent, and crosslinking the micelles or crosslinking an inner core by some method (Japanese Unexamined Patent Publication No. 10-19515),
(b) a method of forming an arm moiety from a core compound using a polymerization method such as living polymerization method (Macromol. Chem., 189, 2885-2889 (1998)), and
(c) a method of utilizing a dendrimer having a lot of multibranched chains (Japanese Unexamined Patent Publication No. 6-219966) are known.

However, in the method (a) of utilizing a block polymer, micelles must be formed in a critical micell concentration and it may be difficult to form micelles according to the composition of a polymer, and also it may be difficult to internally crosslink even if micells are formed. In the method (b) of forming an arm from a core compound using a polymerization method, a high technique and polymerization equipments in the polymerization are required. In the method (c) of utilizing a dendrimer, although the dendrimer to be used is a compound having excellent multibranching properties, a high synthetic technique is required similarly to the method (b).

As the other multibranched polymer, a star polymer comprising a core made of benzene or porphyrin, and an arm made of polyethylene oxide is also known (Macromolecules, 32, 484-4793 (1999) and Angew. Chem. Int. Ed., (21), 3215-3218 (1999)). However, any core made of benzene or porphyrin has a planar and rigid structure and has such a drawback that mobility of a chain moiety of the star polymer is restricted.

Also, it is reported that a polymer having a star-shaped structure is obtained by polymerizing methyl methacrylate, isobutyl methacrylate and t-butyl methacrylate using, as a polymerization initiator, diphenylhexyl lithium obtained by reacting 1,1-diphenylethylene with sec-butyl lithium, and reacting with dicumyl alcohol dimethacrylate or 2,5-dimethyl-2,5-hexanediol dimethacrylate (J. Polymer Science, Part A, 3083 (2003)).

However, molecular weight distribution of the multibranched polymer obtained by conventional production methods including the above described methods is 1.5 or more and thus it was difficult to form a multibranched polymer comprising an arm having the same polymer chain length.

Therefore, it is required to develop a technique of producing a narrowly dispersed multibranched polymer having a controlled molecular structure, simply and efficiently.

As a polymer solid electrolyte, a polymer solid electrolyte containing a X-Y-X type triblock copolymer as a matrix base material, which is obtained by copolymerizing methoxypolyethylene glycol monomethacrylate (component X) with styrene (component Y) using a living anionic polymerization method, has hitherto been proposed (Macromol. Chem., 190, 1069 (1989)). In the matrix base material described in this document, the component X is a component which forms a PEO domain as diffusion transport space of lithium ions. Therefore, it is preferred to increase the content of the component X in the matrix base material so as to enhance ionic conductivity.

However, since a homopolymer of the methoxypolyethylene glycol monomethacrylate as the component X is a liquid material at room temperature even if converted into a high molecular weight compound, the content of the component X is limited so as to use the X-Y-X type copolymer as the above matrix base material of the solid electrolyte. This fact means that the shape and size of the PEO domain as the diffusion transport space of lithium ions are limited. Actually, ionic conductivity at 40° C. of the matrix base material was unsatisfactory as $10^{-6}$ S/cm.

Also, WO02/40594 proposes a polymer solid electrolyte having flexibility wherein a hydrogen bond of poly(ethylene glycol)bis(carboxymethyl)ether and a nitrogen-containing heterocyclic compound such as pyrazine is utilized.

However, in the polymer solid electrolyte described in this document, a hydrogen bond with a polymer having a hydrogen bond site at the end of the polymer is utilized, and a hydrogen bond with a hydrogen bondable functional group in a repeating unit in polymer main chain is not utilized. Also, the polymer solid electrolyte is not still put in practical use because of lower ionic conductivity than that of a poly(ethylene glycol)bis(carboxymethyl)ether element.

Furthermore, WO02/40594 discloses that, when an ionic conductive polymer having a hydrogen bondable functional group in a repeating unit in a polymer main chain or an ionic conductive cyclic compound having a hydrogen bondable functional group contains a compound wherein a hydrogen bond is formed with a low molecular compound having a hydrogen bond site, control of a chain structure of the polymer and ionic conductivity are improved. In the document, a compound having a hydroxyl group, a carboxyl group or an amino group is disclosed as a low molecular compound.

However, the polymer solid electrolyte described in this document didn't have characteristics which satisfy both ionic conductivity and shape stability.

Therefore, it has been required to develop a polymer solid electrolyte which has excellent thermal characteristics, excellent physical characteristics and ionic conductivity.

SUMMARY OF THE INVENTION

Under these circumstances of the prior art, the present invention has been completed and an object thereof is to provide a narrowly dispersed multibranched polymer having a controlled molecular weight, and a method for producing the multibranched polymer. Another object of the present invention is to provide a polymer solid electrolyte comprising the multibranched polymer and an electrolyte salt, which has ionic conductivity in practical high level, and a polymer solid electrolyte battery comprising the polymer solid electrolyte.

The present inventors have intensively studied so as to achieve the above objects and found that a narrowly dispersed multibranched polymer having a controlled molecular weight is efficiently obtained by reacting 1,1,2,2-tetrakis(4-hydroxyphenyl)ethane (hereinafter referred to as "TEP", sometimes) or pentaerythritol with 2-bromoisobutyrylbromide thereby synthesizing a core moiety, and subjecting a compound having a polymerizable unsaturated bond to the living radical polymerization using plural polymerization active centers formed in the core moiety as a starting point to form a polymer chain (arm moiety), and thus the present invention has been completed.

Consequently, according to a first aspect of the present invention, there are provided the following multibranched polymers (1) to (11):

(1) A multibranched polymer having a structure represented by the formula (I):

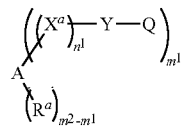
(I)

wherein A represents an organic group having 3 or more branched chains,
$X^a$ represents a linking group containing any atom of Groups 14 to 16 in the Periodic Table,
Y represents a functional group having a structure capable of having an active halogen atom,
$m^1$ represents any integer of 1 to the number of branched chains of A,
$m^2$ represents the number of branched chains of A,
$n^1$ represents an integer of 0 or 1 or more,
when $m^1$ is 2 or more, groups represented by the formula; —$(X^a)_{n1}$—Y-Q may be the same or different,
when $n^1$ is 2 or more, $X^a$(s) may be the same or different,
when ($m^2$–$m^1$) is 2 or more, $R^a$(s) may be the same or different,
Q represents an arm moiety having a repeating unit derived from a polymerizable unsaturated bond, plural Q(s) may be the same or different, and
$R^a$ represents an organic group which is not associated with the polymerization reaction;

(2) The multibranched polymer described in (1), wherein Ra is a group represented by the formula (Ia);

(Ia)

wherein $X^b$ represents a linking group containing any atom of Groups 14 to 16 in the Periodic Table,
R represents a hydrogen atom, a C1 to C6 alkyl group, an aryl group which may have a substituent, a halogen atom, or a C1 to C6 alkoxyl group,
$n^2$ represents an integer of 0 or 1 or more, and
when $n^2$ is 2 or more, $X^b$(s) may be the same or different;

(3) The multibranched polymer described in (1) or (2), wherein the multibranched polymer has a structure represented by the formula (II):

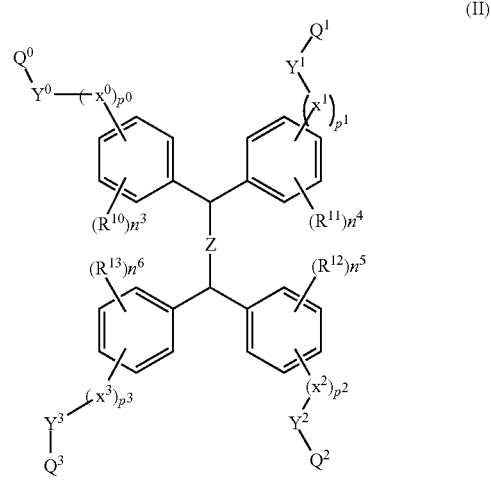
(II)

wherein Z represents $(CH_2)_q$ or a p-phenylene group,
q represents an integer of 0 to 3,
$R^{10}$, $R^{11}$, $R^{12}$ and $R^{13}$ each independently represents a hydrogen atom, a C1 to C6 alkyl group, an aryl group which may have a substituent, a halogen atom, or a C1 to C6 alkoxyl group,
$n^3$, $n^4$, $n^5$ and $n^6$ each independently represents an integer of 0 to 3,
$X^0$, $X^1$, $X^2$ and $X^3$ each independently represents a linking group containing any atom of Groups 14 to 16 in the Periodic Table,
$Y^0$, $Y^1$, $Y^2$ and $Y^3$ each independently represents a functional group having a structure capable of having an active halogen atom,
$p^0$ to $p^3$ each independently represents an integer of 0 or 1 or more, and
$Q^0$, $Q^1$, $Q^2$ and $Q^3$ each independently represents an arm moiety having a repeating unit derived from a polymerizable unsaturated bond;

(4) The multibranched polymer described in (1) or (2), wherein the multibranched polymer has a structure represented by the formula (III):

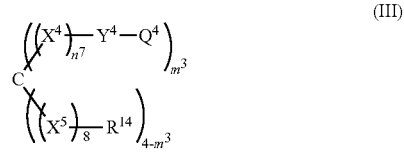
(III)

wherein C represents a carbon atom,
$X^4$ and $X^5$ each independently represents a linking group containing any atom of Groups 14 to 16 in the Periodic Table,
$Y^4$ represents a functional group having a structure capable of having an active halogen atom, $R^{14}$ represents a hydrogen atom, a C1 to C6 alkyl group, an aryl group which may have a substituent, a halogen atom, or a C1 to C6 alkoxyl group, $n^7$, $n^8$ each independently represents an integer of 0 or 1 or more, when $n^7$ and $n^8$ each is 2 or more, $X^4$(s) and $X^5$(s) may be the same or different, $m^3$ represents 3 or 4, and groups represented by the formula; —$(X^4)_{n7}$—$Y^4$-$Q^4$ may be the same or different, and $Q^4$ represents an arm moiety having a repeating unit derived from a polymerizable unsaturated bond;

(5) The multibranched polymer described in any one of (1) to (4), wherein the functional group having a structure capable of having an active halogen atom is a group having a structure represented by the formula (IV):

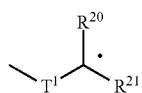

(IV)

wherein $T^1$ represents a divalent electron attractive group, $R^{20}$ represents a hydrogen atom, a halogen atom, a C1 to C6 alkyl group, a C7 to C12 aralkyl group, an aryl group, an ester group, or an acyl group, $R^{21}$ represents a hydrogen atom, a C1 to C6 alkyl group, a C7 to C12 aralkyl group, an aryl group, an ester group, or an acyl group, the symbol * represents the substitution position of a halogen atom, or the formula (V):

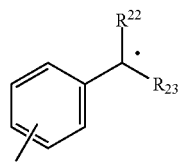

(V)

wherein $R^{22}$ represents a hydrogen atom, a halogen atom, a C1 to C6 alkyl group, a C7 to C12 aralkyl group, an aryl group, an ester group, or an acyl group, $R^{23}$ represents a hydrogen atom, a C1 to C6 alkyl group, a C7 to C12 aralkyl group, an aryl group, an ester group, or an acyl group, and the symbol * represents the substitution position of a halogen atom;

(6) The multibranched polymer described in (5), wherein $T^1$ in the formula (IV) is a group represented by the formula:

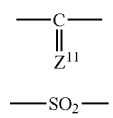

(t11)

—SO$_2$—

(t21)

wherein $Z^{11}$ represents an oxygen atom, a sulfur atom, or a group represented by $Nr^{71}$ ($r^{71}$ represents a hydrogen atom, a C1 to C6 alkyl group, a phenyl group which may have a substituent, an alkylcarbonyl group, a phenylcarbonyl group which may have a substituent, an alkylsulfonyl group, or a phenylsulfonyl group which may have a substituent);

(7) The multibranched polymer described in any one of (1) to (6), wherein the repeating unit derived from a polymerizable unsaturated bond is a repeating unit derived from at least one selected from the group consisting of (meth)acrylic acid, a (meth)acrylic acid derivative, styrene, a styrene derivative and a vinyl group-containing heteroaryl compound;

(8) The multibranched polymer described in (7), wherein the repeating unit derived from a polymerizable unsaturated bond comprises a repeating unit (a) derived from (meth)acrylic acid or a (meth)acrylic acid derivative and a repeating unit (c) derived from styrene or a styrene derivative, and a molar ratio of the repeating unit (a) to the repeating unit (c) is within a range from 95/5 to 70/30;

(9) The multibranched polymer described in (8), wherein the repeating unit derived from a polymerizable unsaturated bond includes a repeating unit (a) represented by the formula (a1):

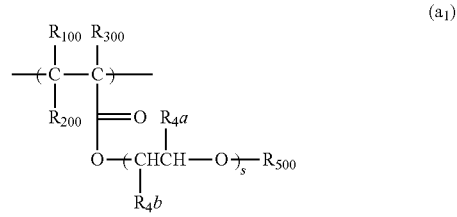

(a$_1$)

wherein $R_{100}$, $R_{200}$ and $R_{300}$ each independently represents a hydrogen atom or a C1 to 10 hydrocarbon group, $R_{100}$ and $R_{300}$ may be combined to form a ring, $R_{4a}$ and $R_{4b}$ each independently represents a hydrogen atom or a methyl group, $R_{500}$ represents a hydrogen atom, a hydrocarbon group, an acyl group, or a silyl group, s represents any integer of 2 to 100, and groups represented by groups represented by the formula: —CH($R_{4b}$)—CH($R_{4a}$)—O— may be the same or different;

(10) The multibranched polymer described in (7), wherein the repeating unit derived from a polymerizable unsaturated bond includes a repeating unit represented by the formula (b1):

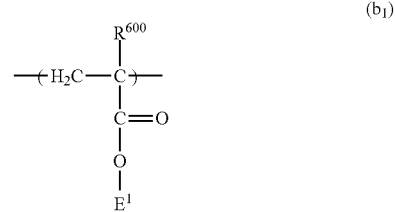

(b$_1$)

wherein $R^{600}$ represents a hydrogen atom or a C1 to C6 alkyl group, and $E^1$ represents a hydrogen atom, an organic group having an alicyclic hydrocarbon skeleton, or an organic group having a lactone ring; and

(11) The multibranched polymer described in any one of (1) to (10), which is a polymer having a weight average molecular weight of 10,000 to 2,000,000.

According to a second aspect of the present invention, there are provided the following methods for producing a multibranched polymer (12) to (20):

(12) A method for producing a multibranched polymer, which comprises the step of copolymerizing a compound represented by the formula (VII):

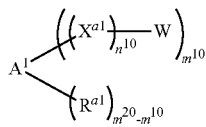

wherein $A^1$ represents an organic group having 3 or more branched chains,
$X^{a1}$ represents a linking group containing any atom of Groups 14 to 16 in the Periodic Table,
$m^{10}$ represents any integer of 1 to the number of branched chains of $A^1$,
$m^{20}$ represents the number of branched chains of $A^1$,
$n^{10}$ represents an integer of 0 or 1 or more,
when $m^{10}$ is 2 or more, groups represented by the formula: $—(X^{a1})_{n10}—W$ may be the same or different,
when $n^{10}$ is 2 or more, $X^{a1}$(s) may be the same or different,
when $(m^{20}-m^{10})$ is 2 or more, $R^{a1}$(s) may be the same or different,
$R^{a1}$ represents an organic group which is not associated with the polymerization reaction, and
W represents a functional group represented by the formula (VIII):

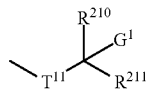

(wherein $T^{11}$ represents a divalent electron attractive group, $R^{210}$ represents a hydrogen atom, a halogen atom, a C1 to C6 alkyl group, a C7 to C12 aralkyl group, an aryl group, an ester group, or an acyl group,
$R^{211}$ represents a hydrogen atom, a C1 to C6 alkyl group, a C7 to C12 aralkyl group, an aryl group, an ester group, or an acyl group,
$G^1$ represents a halogen atom), or the formula (IX):

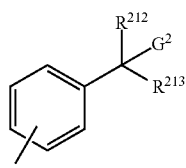

(wherein $R^{212}$ represents a hydrogen atom, a halogen atom, a C1 to C6 alkyl group, a C7 to C12 aralkyl group, an aryl group, an ester group, or an acyl group,
$R^{213}$ represents a hydrogen atom, a C1 to C6 alkyl group, a C7 to C12 aralkyl group, an aryl group, an ester group, or an acyl group, and
$G^2$ represents a halogen atom), with a compound having a polymerizable unsaturated bond under living radical polymerization conditions;

(13) The method for producing a multibranched polymer described in (12), wherein $R^{a1}$ is a group represented by the formula (VIIa):

wherein $X^{b1}$ represents a linking group containing any atom of Groups 14 to 16 in the Periodic Table,
$R^1$ represents a hydrogen atom, a C1 to C6 alkyl group, an aryl group which may have a substituent, a halogen atom, or a C1 to C6 alkoxyl group,
$n^{20}$ represents an integer of 0 or 1 or more, and
when $n^{20}$ is 2 or more, $X^{b1}$(s) may be the same or different;
(14) The method for producing a multibranched polymer described in (12) or (13), wherein $T^{11}$ in the formula (VIII) is a group represented by the formula (t111) or (t211):

wherein $Z^{111}$ represents an oxygen atom, a sulfur atom, or $Nr^{711}$ (wherein $r^{711}$ represents a hydrogen atom, a C1 to C6 alkyl group, a phenyl group which may have a substituent, an alkylcarbonyl group, a phenylcarbonyl group which may have a substituent, an alkylsulfonyl group, or a phenylsulfonyl group which may have a substituent);
(15) The method for producing a multibranched polymer described in any one of (12) to (14), wherein the compound represented by the formula (VII) is a compound represented by the formula (X):

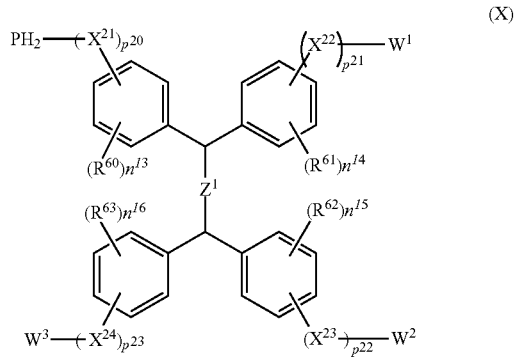

wherein $Z^1$ represents $(CH_2)_{q1}$ or a p-phenylene group,
q1 represents an integer of 0 to 3,
$R^{60}$ to $R^{63}$ each independently represents a C1 to C6 alkyl group, a phenyl group which may have a substituent, a halogen atom, or a C1 to C6 alkoxyl group,
$n^{13}$, $n^{14}$, $n^{15}$ and $n^{16}$ each independently represents an integer of 0 to 3,
$X^{21}$ to $X^{24}$ each independently represents a linking group containing any atom of Groups 14 to 16 in the Periodic Table,
$W^0$ to $W^3$ each independently represents a functional group represented by the formula (VIII):

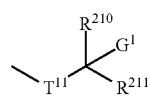

(VIII)

(wherein $T^{11}$ represents a divalent electron attractive group, $R^{210}$ represents a hydrogen atom, a halogen atom, a C1 to C6 alkyl group, a C7 to C12 aralkyl group, an aryl group, an ester group, or an acyl group, $R^{211}$ represents a hydrogen atom, a C1 to C6 alkyl group, a C7 to C12 aralkyl group, an aryl group, an ester group, or an acyl group, and $G^1$ represents a halogen atom, or the formula (IX):

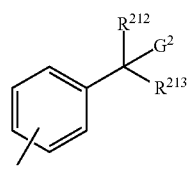

(IX)

(wherein $R^{212}$ represents a hydrogen atom, a halogen atom, a C1 to C6 alkyl group, a C7 to C12 aralkyl group, an aryl group, an ester group or acyl group, $R^{213}$ represents a hydrogen atom, a C1 to C6 alkyl group, a C7 to C12 aralkyl group, an aryl group, an ester group, or an acyl group, and $G^2$ represents a halogen atom), and $p^{20}$ to $p^{23}$ each independently represents an integer of 0 or 1 or more;

(16) The method for producing a multibranched polymer described in any one of (12) to (14), wherein the compound represented by the formula (VII) has a structure represented by the formula (XI):

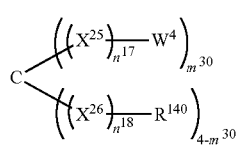

(XI)

wherein C represents a carbon atom, $X^{25}$ and $X^{26}$ each independently represents a linking group containing any atom of Groups 14 to 16 in the Periodic Table, $W^4$ represents a functional group represented by the formula (VIII):

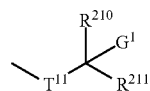

(VIII)

(wherein $T^{11}$ represents a divalent electron attractive group, $R^{210}$ represents a hydrogen atom, a halogen atom, a C1 to C6 alkyl group, a C7 to C12 aralkyl group, an aryl group, an ester group, or an acyl group, $R^{211}$ represents a hydrogen atom, a C1 to C6 alkyl group, a C7 to C12 aralkyl group, an aryl group, an ester group, or an acyl group, and $G^1$ represents a halogen atom), or the formula (IX):

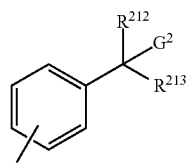

(IX)

(wherein $R^{212}$ represents a hydrogen atom, a halogen atom, a C1 to C6 alkyl group, a C7 to C12 aralkyl group, an aryl group, a ester group, or an acyl group, $R^{213}$ represents a hydrogen atom, a C1 to C6 alkyl group, a C7 to C12 aralkyl group, an aryl group, an ester group, or an acyl group, and $G^2$ represents a halogen atom), $R^{140}$ represents a hydrogen atom, a C1 to C6 alkyl group, an aryl group which may have a substituent, a halogen atom, or a C1 to C6 alkoxyl group, $n^{17}$ and $n^{18}$ each independently represents an integer of 0 or 1 or more and, when $n^{17}$ and $n^{18}$ each represents 2 or more, $X^{25}$ and $X^{26}$ may be the same or different, $m^{30}$ represents 3 or 4, and groups represented by the formula: $-(X^{25})_{n17}-W^4$ may be the same or different;

(17) The method for producing a multibranched polymer described in any one of (12) to (16), wherein at least one selected from the group consisting of (meth)acrylic acid, a (meth)acrylic acid derivative, styrene, a styrene derivative and a vinyl group-containing heteroaryl compound is used as the compound having a polymerizable unsaturated bond;

(18) The method for producing a multibranched polymer described in (17), wherein (meth) acrylic acid or a (meth) acrylic acid derivative and styrene or a styrene derivative are used as the compound having a polymerizable unsaturated bond and the proportion of the (meth) acrylic acid or (meth) acrylic acid derivative to the styrene or styrene derivative, which are to be polymerized, is within a range from 95/5 to 70/30 in terms of a molar ratio of [(meth)acrylic acid or a (meth)acrylic acid derivative]/[styrene or a styrene derivative];

(19) The method for producing a multibranched polymer described in (17) or (18), wherein, as the (meth)acrylic acid or (meth)acrylic acid derivative, a compound represented by the formula (a11):

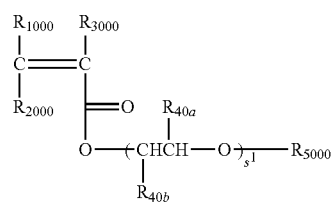

(a11)

wherein $R_{1000}$, $R_{2000}$ and $R_{3000}$ each independently represents a hydrogen agom or a C1 to 10 hydrocarbon group, $R_{1000}$ and $R_{3000}$ may be combined to form a ring, $R_{40a}$ and $R_{40b}$ each independently represents a hydrogen atom or a methyl group, $R_{5000}$ represents a hydrogen atom, a hydrocarbon group, an acyl group, or a silyl group, $s^1$ represents any integer of 2 to 100, and groups represented by groups represented by the formula: $-CH(R_{40b})-CH(R_{40a})-O-$ may be the same or different, is used; and

(20) The method for producing a multibranched polymer described in (17) or (18), wherein, as the (meth)acrylic acid or (meth)acrylic acid derivative, a compound represented by the formula (b11):

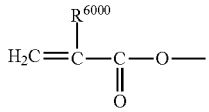

(b11)

wherein $R^{6000}$ represents a hydrogen atom or a C1 to C6 alkyl group, and $E^{10}$ represents a hydrogen atom, an organic group having an alicyclic hydrocarbon skeleton, or an organic group having a lactone ring, is used.

According to a third aspect of the present invention, there are provided the following polymer solid electrolytes and polymer solid electrolyte batteries comprising the polymer solid electrolyte (21) to (36):

(21) A polymer solid electrolyte comprising a multibranched polymer comprising a core moiety having 3 or more branched chains and an arm moiety having a repeating unit (a) represented by the formula (a1):

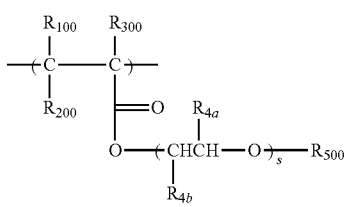

(a1)

wherein $R_{100}$, $R_{200}$ and $R_{300}$ each independently represents a hydrogen atom or a C1 to 10 hydrocarbon group, $R^{100}$ and $R_{300}$ may be combined to form a ring, $R_{4a}$ and $R_{4b}$ each independently represents a hydrogen atom or a methyl group, $R_{500}$ represents a hydrogen atom, a hydrocarbon group, an acyl group, or a silyl group, s represents any integer of 2 to 100, and groups represented by groups represented by the formula: —CH($R_{4b}$)—CH($R_{4a}$)—O— may be the same or different, and an electrolyte salt;

(22) A polymer solid electrolyte comprising a multibranched polymer, which comprises a structure represented by the formula (XI):

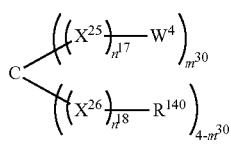

(XI)

wherein C represents a carbon atom, $X^{25}$ and $X^{26}$ each independently represents a linking group containing any atom of Groups 14 to 16 in the Periodic Table, $W^4$ represents the formula (VIII):

(VIII)

(wherein $T^{11}$ represents a divalent electron attractive group, $R^{210}$ represents a hydrogen atom, a halogen atom, a C1 to C6 alkyl group, a C7 to C12 aralkyl group, an aryl group, an ester group, or an acyl group, $R^{211}$ represents a hydrogen atom, a C1 to C6 alkyl group, a C7 to C12 aralkyl group, an aryl group, an ester group, or an acyl group, and $G^1$ represents a halogen atom), and
an arm moiety having a repearting unit (a) represented by formula (a1) as Q:

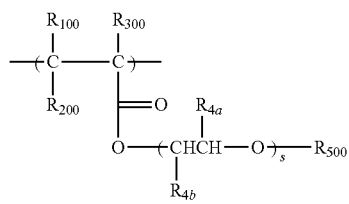

(a1)

(wherein $R_{100}$, $R_{200}$ and $R_{300}$ each independently represents a hydrogen atom or a C1 to 10 hydrocarbon group, $R_{100}$ and $R_{300}$ may be combined to form a ring, $R_{4a}$ and $R_{4b}$ each independently represents a hydrogen atom or a methyl group, $R_{500}$ represents a hydrogen atom, a hydrocarbon group, an acyl group, or a silyl group, s represents any integer of 2 to 100, and groups represented by groups represented by the formula: —CH($R_{4b}$)—CH($R_{4a}$)—O— may be the same or different), and an electrolyte salt;

(23) The polymer solid electrolyte described in (22), wherein the multibranched polymer represented by the formula (I) is a multibranched polymer having a structure represented by the formula (II-1):

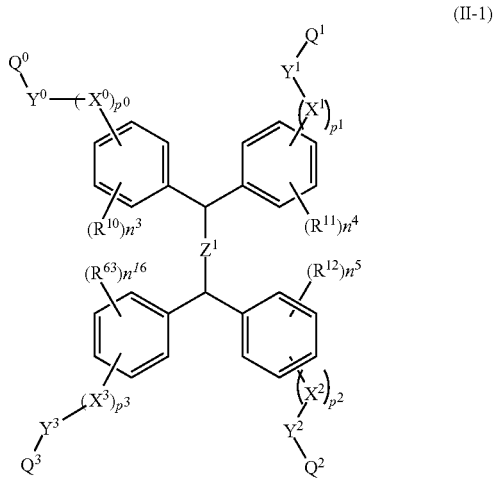

(II-1)

wherein Z represents a $(CH_2)_q$ or p-phenylene group, q represents an integer of 0 to 3,
$R^{10}$, $R^{11}$, $R^{12}$ and $R^{13}$ each independently represents a hydrogen atom, a C1 to C6 alkyl group, an aryl group which may have a substituent, a halogen atom, or a C1 to C6 alkoxyl group, $n^3$, $n^4$, $n^5$ and $n^6$ each independently represents an integer of 0 to 3, $X^0$, $X^1$, $X^2$ and $X^3$ each independently represents a linking group containing any atom of Groups 14 to 16 in the Periodic Table, $Y^0$, $Y^1$, $Y^2$ and $Y^3$ each independently represents a functional group having a structure capable of having an active halogen atom, $p^0$ to $p^3$ each independently represents an integer of 0 or 1 or more, and $Q^0$, $Q^1$, $Q^2$ and $Q^3$ each independently represents the formula (a1):

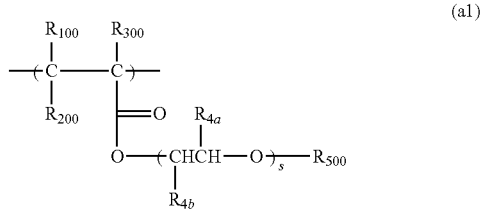

(a1)

(wherein $R_{100}$, $R_{200}$ and $R_{300}$ each independently represents a hydrogen atom or a C1 to 10 hydrocarbon group, $R_{100}$ and $R_{300}$ may be combined to form a ring, $R_{4a}$ and $R_{4b}$ each independently represents a hydrogen atom or a methyl group, $R_{500}$ represents a hydrogen atom, a hydrocarbon group, an acyl group, or a silyl group, s represents any integer of 2 to 100, groups represented by the formula: —CH($R_{4b}$)—CH($R_{4a}$)—O— may be the same or different);

(24) The polymer solid electrolyte described in (22), wherein the multibranched polymer represented by the formula (I) is a multibranched polymer having a structure represented by the formula (III-1):

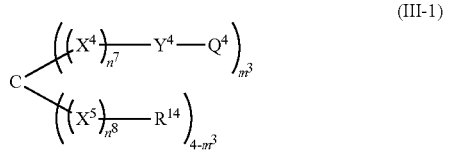

(III-1)

wherein $X^4$ and $X^5$ each independently represents a linking group containing any atom of Groups 14 to 16 in the Periodic Table, $Y^4$ represents a functional group having a structure capable of having an active halogen atom, $R^{14}$ represents a hydrogen atom, a C1 to C6 alkyl group, an aryl group which may have a substituent, halogen atom, or a C1 to C6 alkoxyl group, $n^7$, $n^8$ each independently represents an integer of 0 or 1 or more, when $n^7$ and $n^8$ each represents 2 or more, $X^4$(s) and $X^5$(s) may be the same or different.

$m^3$ represents 3 or 4, and groups represented by the formula: —($X^4$)$_{n7}$—$Y^4$-$Q^4$ may be the same or different, and $Q^4$ represents the formula (a1):

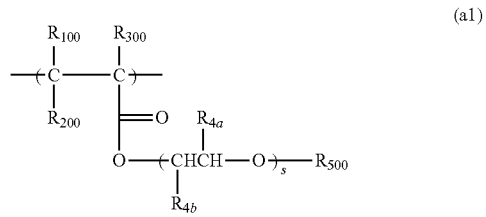

(a1)

(wherein $R_{100}$, $R_{200}$ and $R_{300}$ each independently represents a hydrogen atom or a C1 to 10 hydrocarbon group, $R_{100}$ and $R_{300}$ may be combined to form a ring, $R_{4a}$ and $R_{4b}$ each independently represents a hydrogen atom or a methyl group, $R_{500}$ represents a hydrogen atom, a hydrocarbon group, an acyl group, or a silyl group, s represents any integer of 2 to 100, and groups represented by the formula: —CH($R_{4b}$)—CH($R_{4a}$)—O— may be the same or different);

(25) The polymer solid electrolyte described in any one of (22) to (24), wherein the functional group having a structure capable of having an active halogen atom is a group having a structure represented by the formula (IV):

(IV)

wherein $T^1$ represents a divalent electron attractive group, $R^{20}$ represents a hydrogen atom, a halogen atom, a C1 to C6 alkyl group, a C7 to C12 aralkyl group, an aryl group, an ester group, or an acyl group, $R^{21}$ represents a hydrogen atom, a C1 to C6 alkyl group, a C7 to C12 aralkyl group, an aryl group, an ester group, or an acyl group, and the symbol * represents the substitution position of a halogen atom, or the formula (V);

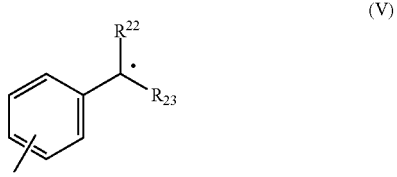

(V)

wherein $R^{22}$ represents a hydrogen atom, a halogen atom, a C1 to C6 alkyl group, a C7 to C12 aralkyl group, an aryl group, an ester group, or an acyl group, $R^{23}$ represents a hydrogen atom, a C1 to C6 alkyl group, a C7 to C12 aralkyl group, an aryl group, an ester group, or an acyl group, and the symbol * represents the substitution position of a halogen atom;

(26) The polymer solid electrolyte described in (25), wherein $T^1$ in the formula (IV) is a group represented by the formula (t11) or (t21):

wherein $Z^{11}$ represents an oxygen atom, a sulfur atom, or a group represented by $Nr^{71}$ ($r^{71}$ represents a hydrogen atom, a C1 to C6 alkyl group, a phenyl group which may have a substituent, an alkylcarbonyl group, a phenylcarbonyl group which may have a substituent, alkylsulfonyl group, or a phenylsulfonyl group which may have a substituent);

(27) The polymer solid electrolyte descried in any one of (22) to (26), wherein Q has the repeating unit (a) and a repeating unit (b) derived from styrene or a styrene derivative and a molar ratio of the repeating unit (a) to the repeating unit (b) is within a range from 95/5 to 70/30;

(28) The polymer solid electrolyte descried in any one of (21) to (27), wherein the multibranched polymer has a number average molecular weight within a range from 10,000 to 2,000,000;

(29) The polymer solid electrolyte described in any one of (22) to (28), wherein the multibranched polymer is obtained by polymerizing a compound represented by the formula (XII):

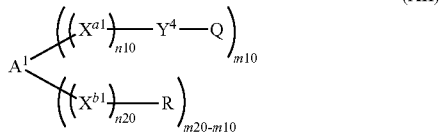

wherein $A^1$ represents an organic group having 3 or more branched chains, $X^{a1}$ and $X^{b1}$ each independently represents a linking group containing any atom of Groups 14 to 16 in the Periodic Table, $R^1$ represents a hydrogen atom, a C1 to C6 alkyl group, an aryl group which may have a substituent, a halogen atom, or a C1 to C6 alkoxyl group, $m^{10}$ represents any integer of 1 to the number of branched chains of A, $m^{20}$ represents the number of branched chains of A, $n^{10}$ and $n^{20}$ each independently represents an integer of 0 or 1 or more, when $n^{10}$ and $n^{20}$ each represents 2 or more, $X^{a1}$(s) and $X^{b1}$(s) may be the same or different, when $m^{10}$ and ($m^{20}-m^{10}$) each represents 2 or more, groups represented by the formula: $-(X^{a1})_{n10}-W$ and groups represented by the formula: $-(X^{b1})_{n20}-R^1$ may be the same or different, and W represents the formula (VII) or the formula (VIII) with a compound represented by the formula (a1) under living radical polymerization conditions;

(30) The polymer solid electrolyte described in (29), wherein $T^{11}$ in the formula (VIII) is a group represented by the formula (t111) or (t211):

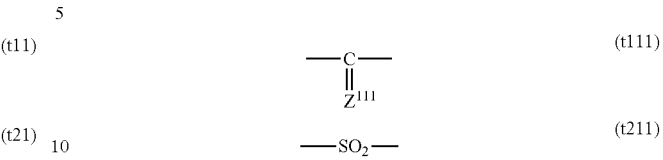

wherein $Z^{111}$ represents an oxygen atom, a sulfur atom, or $Nr^{711}$ ($r^{711}$ represents a hydrogen atom, a C1 to C6 alkyl group, a phenyl group which may have a substituent, an alkylcarbonyl group, a phenylcarbonyl group which may have a substituent, an alkylsulfonyl group, or a phenylsulfonyl group which may have a substituent);

(31) The polymer solid electrolyte described in (29) or (30), wherein the compound represented by the formula (VI) is a compound represented by the formula (IX);

(32) The polymer solid electrolyte described in (29) or (30), wherein the compound represented by the formula the formula (VI) is a compound represented by the formula (X);

(33) The polymer solid electrolyte described any one of (21) to (32), which has a microphase separated structure;

(34) The polymer solid electrolyte described any one of (21) to (33), wherein the electrolyte salt is at least one selected from the group consisting of an alkali metal salt, a quaternary ammonium salt, a quaternary phosphonium salt, a transition metal salt, and proton acid;

(35) The polymer solid electrolyte described any one of (21) to (34), wherein the electrolyte salt is a lithium salt; and

(36) A polymer solid electrolyte battery comprising the polymer solid electrolyte described in any one of (21) to (34).

According to a fourth aspect of the present invention, there are provided the adhesives, battery using the same, binders for production of an electrode and electrode using the same in the following (37) to (46):

(37) An adhesive comprising a multibranched polymer comprising a core moiety having 3 or more branched chains, and an arm moiety having a repeating unit (a) represented by the formula (a1):

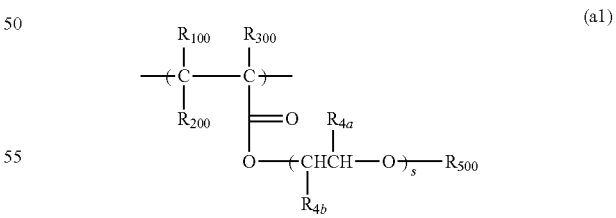

wherein $R_{100}$, t $R_{200}$ and $R_{300}$ each independently represents a hydrogen atom or a C1 to 10 hydrocarbon group, $R_{100}$ and $R_{300}$ may be combined to form a ring, $R_{4a}$ and $R_{4b}$ each independently represents a hydrogen atom or a methyl group, $R_{500}$ represents a hydrogen atom, a hydrocarbon group, an acyl group, or a silyl group, s represents any integer of 2 to 100, and groups represented by the formula: $-CH(R_{4b})-CH(R_{4a})-O-$ may be the same or different;

(38) An adhesive which is a multibranched polymer having a structure represented by the formula (XI):

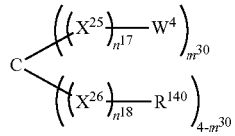
(XI)

wherein C represents a carbon atom, $X^{25}$ and $X^{26}$ each independently represents a linking group containing any atom of Groups 14 to 16 in the Periodic Table, $W^4$ represents the formula (VIII):

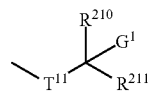
(VIII)

(wherein $T^{11}$ represents a divalent electron attractive group, $R^{210}$ represents a hydrogen atom, a halogen atom, a C1 to C6 alkyl group, a C7 to C12 aralkyl group, an aryl group, an ester group, or an acyl group, $R^{211}$ represents a hydrogen atom, a C1 to C6 alkyl group, a C7 to C12 aralkyl group, an aryl group, an ester group, or an acyl group, and $G^1$ represents a halogen atom), and Q represents the formula (a1):

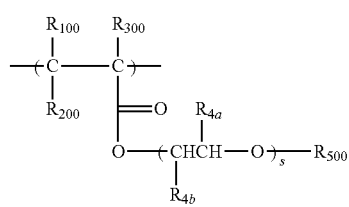
(a1)

(wherein $R_{100}$, $R_{200}$ and $R_{300}$ each independently represents a hydrogen atom or a C1 to 10 hydrocarbon group, $R_{100}$ and $R_{300}$ may be combined to form a ring, $R_{4a}$ and $R_{4b}$ each independently represents a hydrogen atom or a methyl group, $R_{500}$ represents a hydrogen atom, a hydrocarbon group, an acyl group, or a silyl group, s represents any integer of 2 to 100, and groups represented by the formula: $—CH(R_{4b})—CH(R_{4a})—O—$ may be the same or different);

(39) An adhesive wherein the multibranched polymer is the multibranched polymer described in any one of (1) to (9) and (11);

(40) A battery wherein the adhesive described in any one of (37) to (39) is used;

(41) A binder for production of an electrode which is a multibranched polymer comprising a core moiety having 3 or more branched chains, and an arm moiety having a repeating unit (a) represented by the formula (a1):

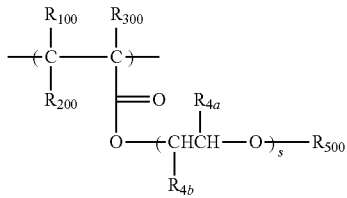
(a1)

wherein $R_{100}$, $R_{200}$ and $R_{300}$ each independently represents a hydrogen atom or a C1 to 10 hydrocarbon group, $R_{100}$ and $R_{300}$ may be combined to form a ring, $R_{4a}$ and $R_{4b}$ each independently represents a hydrogen atom or a methyl group, $R_{500}$ represents a hydrogen atom, a hydrocarbon group, an acyl group, or a silyl group, s represents any integer of 2 to 100, and groups represented by the formula: $—CH(R_{4b})—CH(R_{4a})—O—$ may be the same or different.

(42) A binder for production of an electrode which is a multibranched polymer comprising a structure represented by the formula (XI):

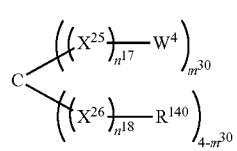
(XI)

wherein C represents a carbon atom, $X^{25}$ and $X^{26}$ each independently represents a linking group containing any atom of Groups 14 to 16 in the Periodic Table, $W^4$ represents the formula (VIII)

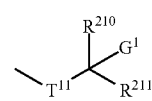
(VIII)

(wherein $T^{11}$ represents a divalent electron attractive group, $R^{210}$ represents a hydrogen atom, a halogen atom, a C1 to C6 alkyl group, a C7 to C12 aralkyl group, an aryl group, an ester group, or an acyl group, $R^{211}$ represents a hydrogen atom, a C1 to C6 alkyl group, a C7 to C12 aralkyl group, an aryl group, an ester group, or an acyl group, and $G^1$ represents a halogen atom), and an arm moiety having a repeating unit (a) represented the formula (a1) as Q

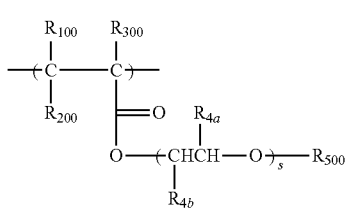
(a1)

(wherein $R_{100}$, $R_{200}$ and $R_{300}$ each independently represents a hydrogen atom or a C1 to 10 hydrocarbon group, $R_{100}$ and $R_{300}$ may be combined to form a ring, $R_{4a}$ and $R_{4b}$ each independently represents a hydrogen atom or a methyl group, $R_{500}$ represents a hydrogen atom, a hydrocarbon group, an acyl group, or a silyl group, s represents any integer of 2 to 100, and groups represented by the formula: —CH($R_{4b}$)—CH($R_{4a}$)—O— may be the same or different);

(43) A binder for production of an electrode wherein the multibranched polymer is the multibranched polymer described in any one of (1) to (9) and (11);

(44) The binder for production of an electrode described in any one of (41) to (43), which has conductivity;

(45) The binder for production of an electrode described in any one of (41) to (44), which has binding ability to an active material; and

(46) An electrode comprising an electrode material containing the binder for production of an electrode described in any one of (41) to (45).

The multibranched polymer of the present invention is a narrowly dispersed multibranched polymer having a controlled molecular weight, and is useful as a raw material for producing a polymer solid electrolyte, an adhesive material, and a binder material of an electrode, which are excellent in thermal characteristics, mechanical strength and ionic conductivity. Also, the multibranched polymer of the present invention is suited for use as a resist material; an electrochemical material for battery, capacitor, sensor, condenser, EC device, and photoelectric transducer; an inclusion material; and a functional material for electric appliances and industrial equipments.

According to the method for producing the multibranched polymer of the present invention, a narrowly dispersed multibranched polymer having a controlled molecular weight can be produced simply and efficiently. The production method of the present invention is suited for use as a method for producing the multibranched polymer of the present invention.

The polymer solid electrolyte of the present invention contains the multibranched polymer of the present invention, and an electrolyte salt, and has ionic conductivity in practical high level.

The polymer solid electrolyte battery of the present invention battery comprises the polymer solid electrolyte of the present invention and has thermal characteristics, physical characteristics and ionic conductivity in a practical level.

The multibranched polymer is suited for use as an adhesive, and a material for forming a battery of a binder of an electrode.

DETAILED DESCRIPTION OF THE INVENTION

Figure 1:
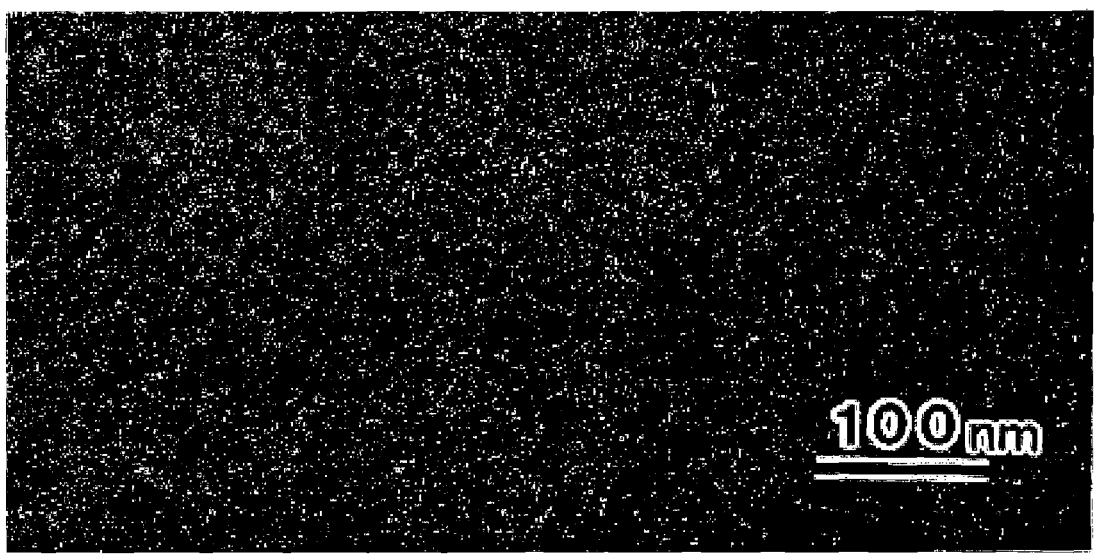
FIG. 1 is a transmission electron micrograph showing a cross section of an electrolyte membrane containing a multibranched polymer of the present invention.

The present invention will now be described in detail.

1) Multibranched Polymer

The multibranched polymer of the present invention is characterized by having a structure represented by the formula (I).

In the formula (I), A represents an organic group having 3 or more branched chains.

Specific examples of A include:

(i) organic group having a carbon atom in a center, such as carbon atom having 4 branched chains, or a combination of carbon atom having 4 branched chains and (alkylene group, alkenylene group, alkynylene group, phenylene group, or a combination of 2 or more kinds of them);

(ii) organic group having a carbon atom in a center, such as carbon atom having 3 branched chains, or a combination of carbon atom having 3 branched chains and (alkylene group, alkenylene group, alkynylene group, phenylene group, or combination of 2 or more kinds of them);

(iii) organic group having a nitrogen atom in a center, such as nitrogen atom having 3 branched chains, and a combination of nitrogen atom having 3 branched chains and (an alkylene group, an alkenylene group, an alkynylene group, a phenylene group, or a combination of 2 or more kinds of them); and (iv) organic group having a benzene ring in a center, such as phenyl group having 3 branched chains, and a combination of phenyl group having 3 branched chains and (alkylene group, alkenylene group, alkynylene group, phenylene group, or combination of 2 or more kinds of them).

The (alkylene group, alkenylene group, alkynylene group, phenylene group or a combination of 2 or more kinds of them) may also have one or more kinds of groups of —O—, —S—, —C(=O)—, —C(=O)O—, —NH—, —NHC(=O)—, —NHC(=S)—, and —OC(=O)NH— at any position.

$X^a$ represents a linking group containing any atom of Groups 14 to 16 in the Periodic Table.

Examples of the atom of Groups 14 to 16 in the Periodic Table include carbon atom, nitrogen atom, oxygen atom, silicon atom, phosphorus atom, sulfur atom, germanium atom, arsenic atom, selenium atom, tin atom, antimony atom, tellurium atom, and lead atom, and carbon atom, nitrogen atom, oxygen atom, and sulfur atom are preferable.

Specific examples of the linking group containing any atom of Groups 14 to 16 in the Periodic Table include —O—, —S—, —C(=O)—, —C(=O)—O—, —NH—, -Nr$^1$- (wherein r$^1$ represents a C1-C6 alkyl group such as methyl group, ethyl group, n-propyl group, isopropyl group, n-butyl group, sec-butyl group, t-butyl group, or n-pentyl group), —NH—C(=O)—, —NH—C(=S)—, —O—C(=O)—NH—, and a group represented by the formula: —O—C(=O)—Cr$^2$(CH$_2$O—)$_2$ (r$^2$ represents a hydrogen atom; or a C1 to C6 alkyl group such as methyl group, ethyl group, n-propyl group, isopropyl group, n-butyl group, sec-butyl group, t-butyl group, or n-pentyl group, the same shall apply hereinafter). Among these groups, —O—, —C(=O)—O—, and —NH— are preferable because a narrowly dispersed multibranched star polymer can be obtained and it is easy to obtain.

Also, the linking group containing any atom of Groups 14 to 16 in the Periodic Table of $X^a$ may be:

(i) group (dendrimer type polymer group having an —O— group at the end) obtained from a dendrimer type polymer which is obtained by repeating the reaction of a tri- or polyhydric alcohol compound with hydroxycarboxylic acid (or hydroxycarboxylic acid halide) having 2 or more hydroxyl groups such as 2,2-dimethylolpropionic acid (Bis-MPA) and repeating the reaction of a hydroxyl group of the resulting reaction product with the same hydroxycarboxylic acid having 2 or more hydroxyl groups (or hydroxycarboxylic acid halide) 1 to 200 times, (ii) group (network structure polymer group having an —NH— group at the end) obtained from a network structure polymer which is obtained by the reaction of ammonia with a (meth)acrylate ester (or (meth)acrylic acid halide or (meth) acrylic acid) and the reaction with ethylenediamine, followed by repeating the reaction of the resulting reaction product with a (meth)acrylate ester (or (meth)acrylic acid halide or (meth)acrylic acid) and the reaction with ethylenediamine 1 to 100 times, or (iii) group (polymer group having an —O— group at the end) obtained from a head-tail bond star shaped all conjugated polyphenylenevinylene or a head-tail bond star shaped all conjugated polyphenyleneethynylene compound, which is obtained by selective dehydrohalogenation of a halogenated phenyl derivative having a mobile hydrogen as a monomer using a transition metal catalyst.

Y represents a functional group having a structure capable of having an active halogen atom.

As used herein, "functional group having a structure capable of having an active halogen atom" means an atomic group having reactivity wherein a halogen atom has a structure capable of converting into an active halogen atom when bonded with the halogen atom.

In the multibranched polymer of the present invention, the functional group having a structure capable of having an active halogen atom of Y is preferably represented by the following formula (IV) or (V).

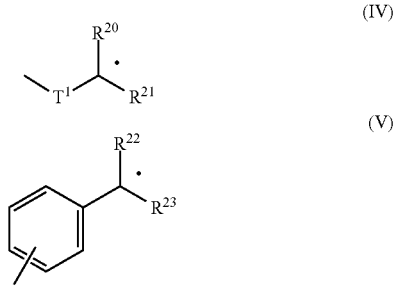

In the formula (IV), $T^1$ represents a divalent electron attractive group, $R^{20}$ represents a hydrogen atom, a halogen atom, a C1 to C6 alkyl group, a C7 to C12 aralkyl group, an aryl group, an ester group, or an acyl group, $R^{21}$ represents a hydrogen atom, a C1 to C6 alkyl group, a C7 to C12 aralkyl group, an aryl group, an ester group, or an acyl group.

The symbol * represents the substitution position of a halogen atom.

In the formula (V), $R^{22}$ represents a hydrogen atom, a halogen atom, a C1 to C6 alkyl group, a C7 to C12 aralkyl group, an aryl group, an ester group, or an acyl group, and $R^{23}$ represents a hydrogen atom, a C1 to C6 alkyl group, a C7 to C12 aralkyl group, an aryl group, an ester group, or an acyl group.

The symbol * represents the substitution position of a halogen atom.

$T^1$ in the formula (IV) is more preferably a group represented by the formula (t11) or (t21), and still more preferably a group represented by the formula (t11).

In the formula (t11), $Z^{11}$ represents an oxygen atom, a sulfur atom, or a group represented by $Nr^{71}$ ($r^{71}$ represents a hydrogen atom, a C1 to C6 alkyl group, a phenyl group which may have a substituent, alkylcarbonyl group, a phenylcarbonyl group which may have a substituent, an alkylsulfonyl group, or a phenylsulfonyl group which may have a substituent).

$R^a$ represents an organic group which is not associated with the polymerization reaction and is specifically an organic group having no polymerization reactivity or a group which has polymerization reactivity but is not subjected to the polymerization reaction, and $R^a$ is preferably a group represented by the following formula (Ia).

In the formula (Ia), $X^b$ represents a linking group containing any atom of Groups 14 to 16 in the Periodic Table similar to $X^a$.

R represents a hydrogen atom; an alkyl group having 1 to 6 carbon atoms, such as methyl group, ethyl group, n-propyl group, isopropyl group, n-butyl group, sec-butyl group, isobutyl group, t-butyl group, or n-pentyl group; an aryl group which may be substituted, such as phenyl group, naphthyl group, or benzyl group; a halogen atom such as fluorine atom, chlorine atom, bromine atom, or iodine atom; and a C1 to C6 alkoxyl group such as methoxy group, ethoxy group, propoxy group, isopropoxy group, butoxy group, or t-butoxy group.

$n^2$ represents an integer of 0 or 1 or more and, when $n^2$ is 2 or more, $X^b$(s) may be the same or different.

$m^1$ represents any integer of 1 to the number of branched chains of A, $m^2$ represents the number of branched chains of A, and $n^1$ represents an integer of 0 or 1 or more.

When $m^1$ is 2 or more, groups represented by the formula: —$(X^a)_{n1}$—Y-Q may be the same or different, when $n^1$ is 2 or more, $X^a$(s) may be the same or different and, when $(m^2-m^1)$ is 2 or more, $R^a$(s) may be the same or different.

In case the moiety obtained by eliminating Q from the formula (I) in the multibranched polymer of the present invention is a core moiety, specific examples of the core moiety include those represented by the following (XIII) to (XXI). Those listed below are considered as illustrative and the core moiety of the multibranched polymer of the present invention is not limited thereto.

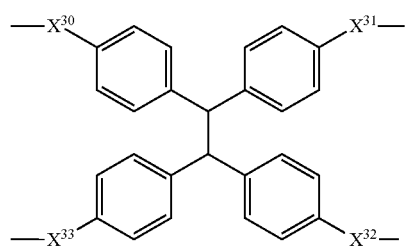

(XIII)

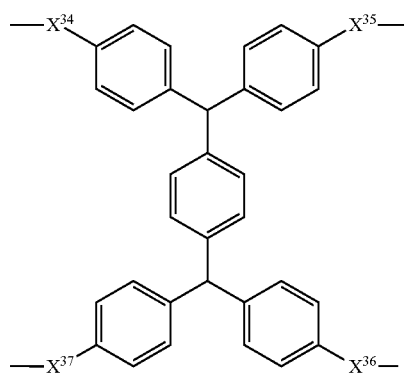

(XIV)

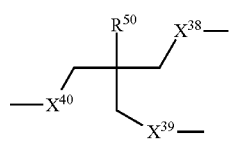

(XV)

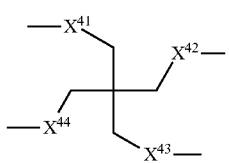

(XVI)

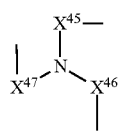

(XVII)

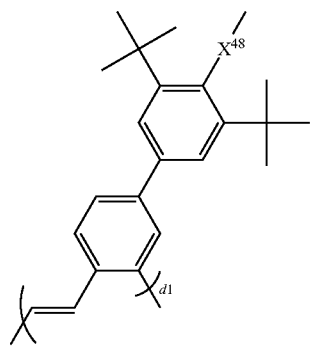

(XVIII)

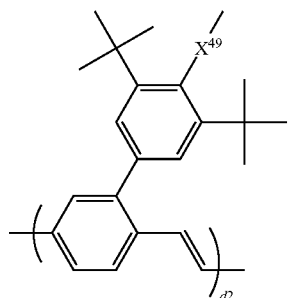

(XIX)

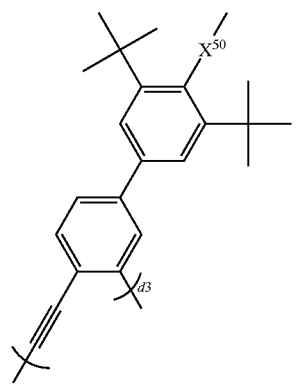

(XX)

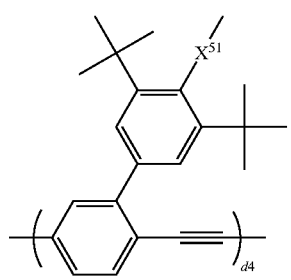

(XXI)

In the formulas (XIII) to (XXI), $X^{30}$ to $X^{51}$ each independently represents a linking group containing an atom of Groups 14 to 16 in the Periodic Table, which is the same as that of X, d1 to d4 each independently represents any natural number. $R^{50}$ represents a hydrogen atom; or an alkyl group such as methyl group or ethyl group.

In the formula (I), Q represents an arm moiety having a repeating unit derived from a polymerizable unsaturated bond, and plural Q(s) may be the same or different.

The repeating unit derived from a polymerizable unsaturated bond is not specifically limited as long as it initiates polymerization from plural polymerization active centers formed in the core moiety having tri- or multibranched structure to form a polymer chain (arm moiety).

Examples thereof include repeating units derived from (meth)acrylic acid, (meth)acrylic acid derivative, styrene, styrene derivative, vinyl group-containing heteroaryl compound, (meth)acrylamide compound, allyl compound; vinyl ether compound, vinylester compound, dialkyl itaconate compound, other monomers; and 2 or more kinds of these compounds.

Among these repeating units, a repeating unit derived from at least one kind selected from the group consisting of (meth)acrylic acid, a (meth)acrylic acid derivative, styrene, a styrene derivative and a vinyl group-containing heteroaryl compound is particularly preferable because a more narrowly dispersed multibranched star polymer is obtained. As used herein, (meth)acryl means acryl or methacryl.

Examples of the (meth)acrylic acid derivative include alkyl ester compound of (meth)acrylic acid, such as methyl (meth) acrylate, ethyl (meth)acrylate, propyl (meth)acrylate, n-butyl (meth)acrylate, t-butyl (meth)acrylate, amyl (meth)acrylate, hexyl (meth)acrylate, ethylhexyl (meth)acrylate, octyl (meth) acrylate, t-octyl (meth)acrylate, chloroethyl (meth)acrylate, 2-ethoxyethyl (meth)acrylate, 2,2-dimethyl-3-ethoxypropyl (meth)acrylate, 5-ethoxypentyl (meth)acrylate, 1-methoxyethyl (meth)acrylate, 1-ethoxyethyl (meth)acrylate, 1-methoxypropyl (meth)acrylate, 1-methyl-1-methoxyethyl (meth) acrylate, 1-(isopropoxy)ethyl (meth)acrylate, benzyl (meth) acrylate, or methoxybenzyl (meth)acrylate; cycloalkyl (meth)acrylate ester compound such as cyclopentyl (meth) acrylate, cyclohexyl (meth)acrylate, or cyclooctyl (meth) acrylate; aryl (meth)acrylate compound such as furfuryl (meth)acrylate, tetrahydrofurfuryl (meth)acrylate, phenyl (meth)acrylate, or 2-pyridyl (meth)acrylate; alkoxyalkyl (meth)acrylate ester compound such as 2-methoxyethyl (meth)acrylate, 2-ethoxyethyl (meth)acrylate, 2-methoxypropyl (meth)acrylate, or 2-ethoxypropyl (meth)acrylate; (meth)acrylate ester compound having a polyalkylene chain, such as methoxypolyethylene glycol (the number of units of ethylene glycol is from 2 to 100) (meth)acrylate, ethoxypolyethylene glycol (meth)acrylate, phenoxypolyethylene glycol (meth)acrylate, methoxypolypropylene glycol, methoxypolyethylene glycol (the number of units of propylene glycol is from 2 to 100) (meth)acrylate, ethoxypolypropylene glycol (meth)acrylate, phenoxypolypropylene glycol (meth)acrylate, polyethylene glycol mono(meth)acrylate, 2-hydroxypropyl (meth)acrylate, polypropylene glycol mono(meth) acrylate, polyethylene glycol-polypropylene glycol mono (meth)acrylate, octoxypolyethylene glycol-polypropylene glycol mono(meth)acrylate, lauroxypolyethylene glycol mono(meth)acrylate, stearoxypolyethylene glycol mono (meth)acrylate, acetyloxypolyethylene glycol (meth)acrylate, benzoyloxypolyethylene glycol (meth)acrylate, trimethylsilyloxypolyethylene glycol (meth)acrylate, or t-butyldimethylsilyloxypolyethylene glycol (meth)acrylate; compound represented by the formula (a11); and compound represented by the formula (b11). As used herein, (meth) acrylate means acrylate or methacrylate.

Also, in the present invention, it is also possible to use, as the (meth)acrylic acid and (meth)acrylic acid derivative, compounds wherein the (meth)acrylic acid and (meth)acrylic acid derivative are substituted with an organic group having a functional group, such as C1 to 10 hydrocarbon group, hydroxyl group, hydrocarbonoxy group, carboxyl group, acid anhydride group, amino group, ester group, or epoxy group.

Specific examples of the organic group include the followings. In the following formulas, u represents any integer of 1 to 3.

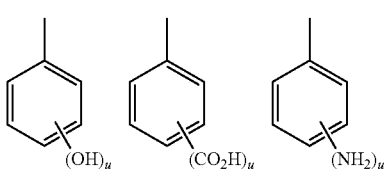

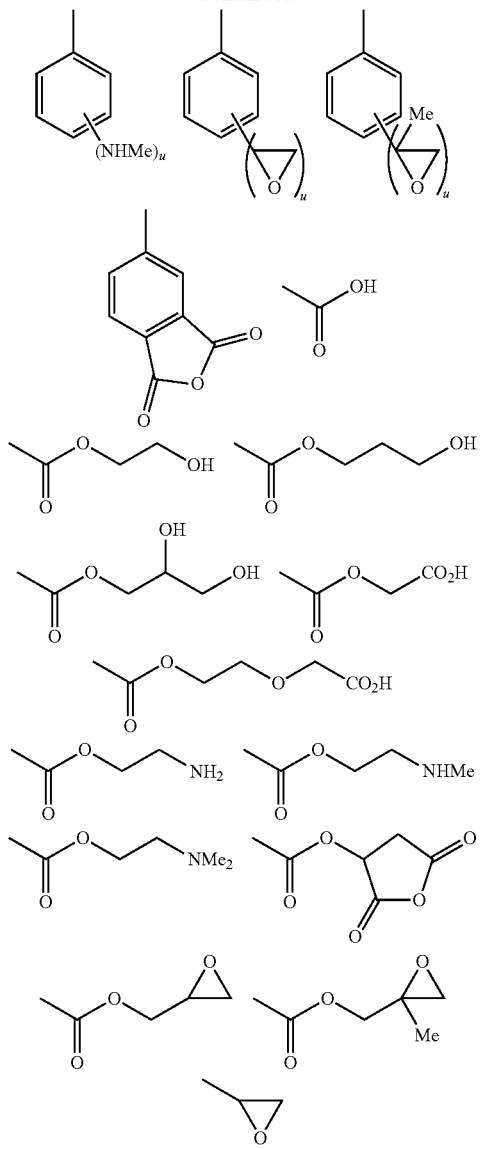

Examples of the styrene derivative include O-methylstyrene, p-methylstyrene, p-t-butylstyrene, a-methylstyrene, 2,4-dimethylstyrene, m-chlorostyrene, p-chlorostyrene, vinylbenzoic acid, vinylaniline, and an alkenyl phenol derivative represented by the following formula (c):

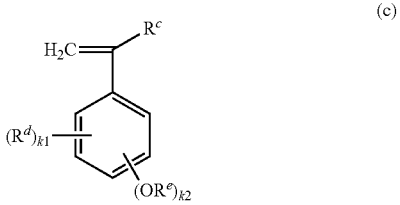

wherein $R^c$ represents a hydrogen atom or a C1 to C4 alkyl group, $R^d$ represents a halogen atom or a C1 to C12 hydrocarbon group, $R^e$ represents a hydrogen atom or a protective group, k1 is an integer of 0 to 4, $R^d$ may be the same or different when k1 is 2 or more, k2 is 1 or 2, and $R^e$ may be the same or different when k2 is 2, provided that k1+k2 is an integer of 1 to 5.

The protective group of $R^e$ is not specifically limited as long as it is a group which is known to be used as a protective group of a phenolic hydroxyl group in this technical field.

Examples of the protective group include acetyl group, methoxymethyl group, 2-ethoxyethyl group, 2-methoxyethoxymethyl group, bis(2-chloroethoxy)methyl group, tetrahydropyranyl group, 4-methoxytetrahydropyranyl group, tetrahydrofuranyl group, triphenylmethyl group, trimethylsilyl group, 2-(trimethylsilyl)ethoxymethyl group, t-butyldimethylsilyl group, trimethylsilylmethyl group, or groups represented by the following formulas:

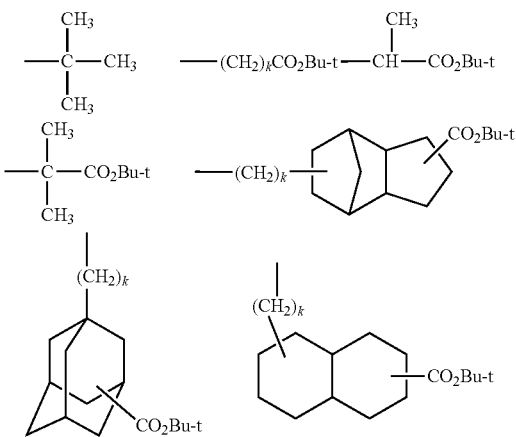

wherein k represents 0 or 1. Furthermore, the protective group includes groups represented by the following formula:

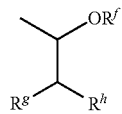

wherein $R^f$ represents a C1 to C20 non-substituted or alkoxy substituted alkyl group, a C5 to C10 cycloalkyl group, or a C6 to C20 non-substituted or alkoxy substituted aryl group, $R^g$ represents a hydrogen atom or a C1 to C3 alkyl group, $R^h$ represents a hydrogen atom, a C1 to C6 alkyl group, or a C1 to C6 alkoxyl group.

Specific examples of the substituent include 1-methoxyethyl group, 1-ethoxyethyl group, 1-methoxypropyl group, 1-methyl-1-methoxyethyl group, and 1-(isopropoxy)ethyl group.

Examples of the vinyl group-containing heteroaryl compound include 2-vinylpyridine, 4-vinylpyridine, 2-vinylquinoline, 4-vinylquinoline, 2-vinylthiophene, and 4-vinylthiophene. In addition, other vinylaryl compounds such as vinylnaphthalene and 9-vinylanthracene can also be used.

Examples of the (meth)acrylamide compound include acrylamide, N-alkylacrylamide (an alkyl group includes those having 1 to 10 carbon atoms, for example, methyl group, ethyl group, propyl group, butyl group, t-butyl group, heptyl group, octyl group, cyclohexyl group, and hydroxyethyl group), N,N-dialkylacrylamide (an alkyl group includes those having 1 to carbon atoms, for example, methyl group, ethyl group, butyl group, isobutyl group, ethylhexyl group, and cyclohexyl group), N-hydroxyethyl-N-methylacrylamide, N-2-acetamideethyl-N-acetylacrylamide, methacrylamide, N-alkylmethacrylamide (an alkyl group includes those having 1 to 10 carbon atoms, for example, methyl group, ethyl group, t-butyl group, ethylhexyl group, hydroxyethyl group, and cyclohexyl group), N,N-dialkylmethacrylamide (an alkyl group includes ethyl group, propyl group, and butyl group), and N-hydroxyethyl-N-methylmethacrylamide.

Examples of the allyl compound include an allyl ester compound such as allyl acetate, allyl caproate, allyl caprate, allyl laurate, allyl palmitate, allyl stearate, allyl benzoate, allyl acetoacetate, or allyl lactate; and an allyl alcohol compound such as allyloxyethanol.

Examples of the vinyl ether compound include hexyl vinyl ether, octyl vinyl ether, decyl vinyl ether, ethylhexyl vinyl ether, methoxyethyl vinyl ether, ethoxyethyl vinyl ether, chloroethyl vinyl ether, 1-methyl-2,2-dimethylpropyl vinyl ether, 2-ethylbutyl vinyl ether, hydroxyethyl vinyl ether, diethylene glycol vinyl ether, dimethylaminoethyl vinyl ether, diethylaminoethyl vinyl ether, butylaminoethyl vinyl ether, benzyl vinyl ether, and tetrahydrofurfuryl vinyl ether.

Examples of the vinylester compound include vinyl butyrate, vinyl isobutyrate, vinyl trimethylacetate, vinyl diethylacetate, vinyl valeate, vinyl caproate, vinyl chloroacetate, vinyl dichloroacetate, vinyl methoxyacetate, vinyl butoxyacetate, vinyl acetoacetate, vinyl lactate, vinyl-β-phenyl butyrate, and vinyl cyclohexylcarboxylate.

Examples of the dialkyl itaconate compound include dimethyl itaconate, diethyl itaconate, dibutyl itaconate, dialkylesters of fumaric acids, monoalkylesters of fumaric acid, and dibutyl fumarate.

Examples thereof include other monomers such as crotonic acid, itaconic acid, maleic anhydride, maleimide, acrylonitrile, methacrylonitrile, and maleilonitrile.

These monomers can be used alone or in combination.

Q may contain, in addition to the above described (meth)acrylic acid, a (meth)acrylic acid derivative, styrene, a styrene derivative and a vinyl group-containing heteroaryl compound, a repeating unit moiety derived from the other polymerizable monomer.

Examples of the other polymerizable monomer include conjugated dienes such as 1,3-butadiene, isoprene, 2,3-dimethyl-1,3-butadiene, 1,3-pentadiene, 2-methyl-1,3-pentadiene, 1,3-hexadiene, 1,6-hexadiene, 4,5-diethyl-1,3-octadiene, 3-butyl-1,3-octadiene, and chloroprene; α,β-unsaturated carboxylic acid imides such as N-methylmaleimide and N-phenylmaleimide; and α,β-unsaturated nitrites such as (meth)acrylonitrile.

The multibranched polymer of the present invention can contain, as a constituent unit, a repeating unit which has a double bond capable of copolymerizing with a monomer constituting a repeating unit derived from a polymerizable unsaturated bond constituting an arm moiety, and also has at least one functional group selected from the group consisting of hydroxyl group, carboxyl group, epoxy group, acid anhydride group, and amino group in the molecule.

Examples of the repeating unit include the following compounds. Monomers, from which the repeating unit is considered to be derived, are listed below.

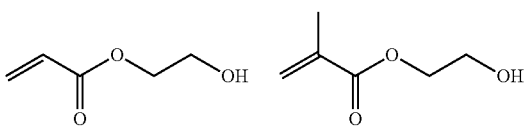

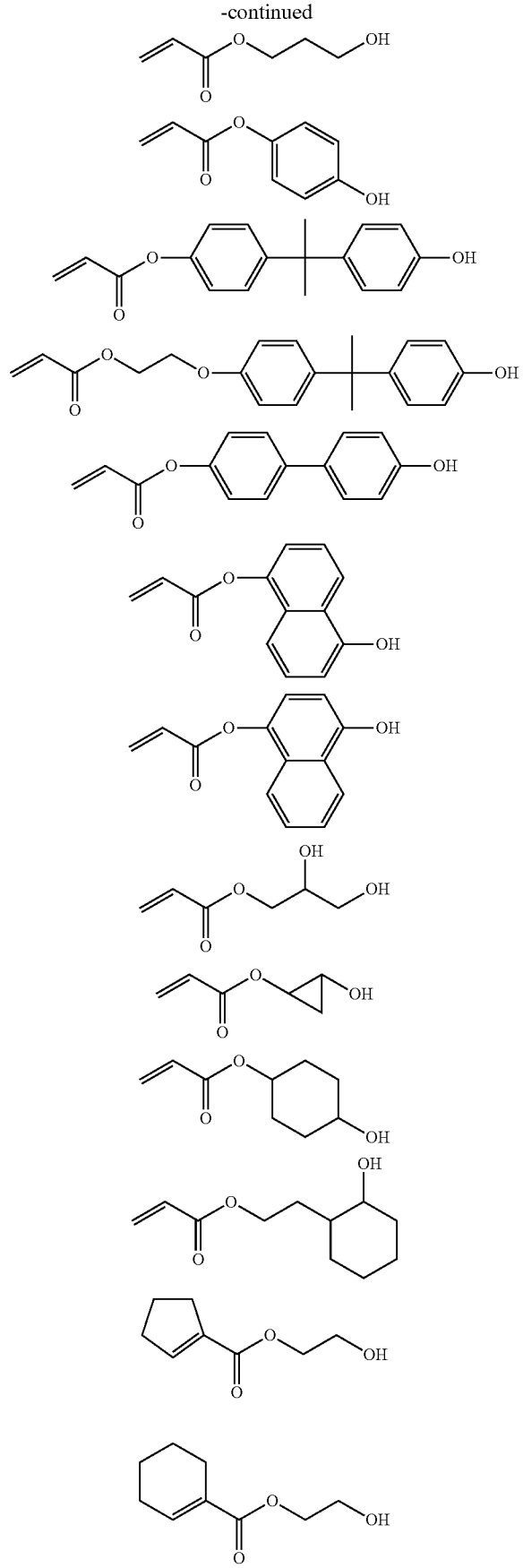
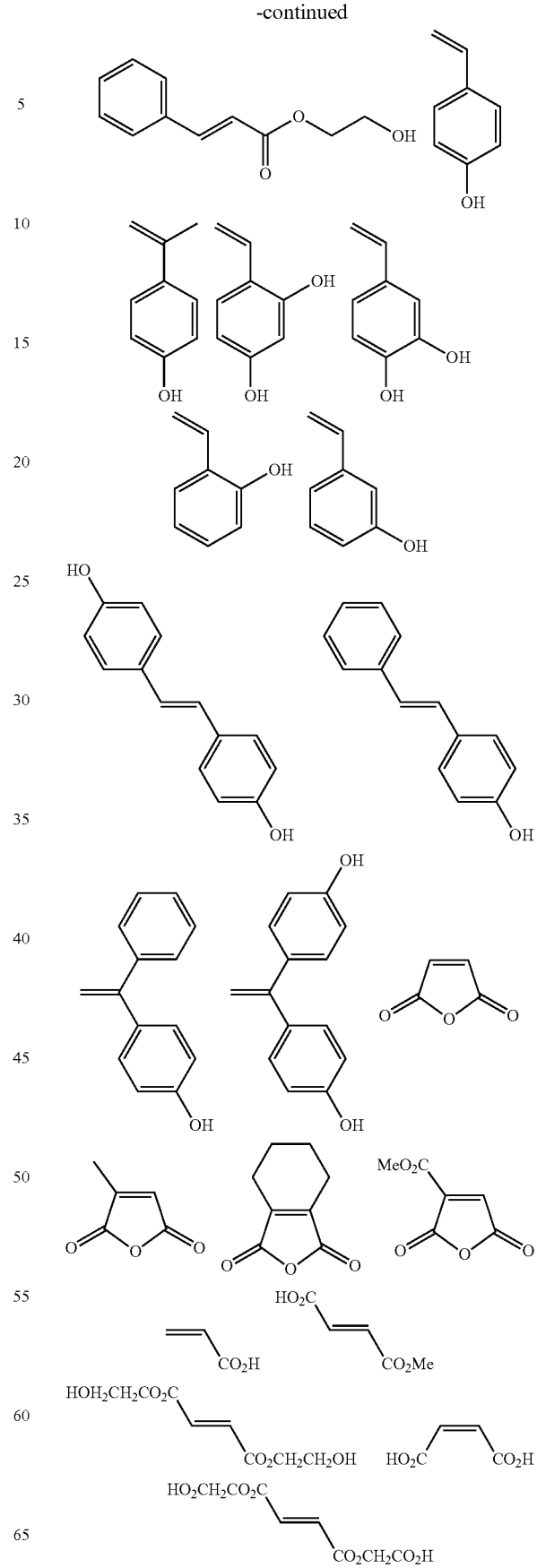

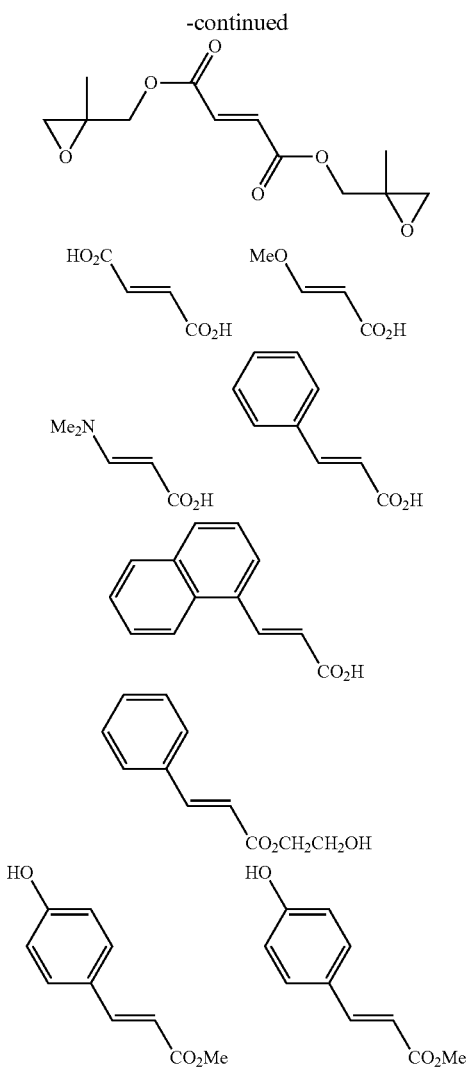

These monomers can be used alone or in combination.

The polymerization chain composed of a polymerizable unsaturated bond constituting an arm moiety of the multi-branched polymer of the present invention may be composed of a homopolymer or a di- or multicopolymer. The kind of a copolymer constituting the polymerization chain is not specifically limited and may be any kind of a copolymer such as random copolymer, block copolymer, gradient copolymer wherein a component ratio gradually changes, or tapered block copolymer wherein a component ratio between repeating units constituting the respective block chain gradually changes.

In the multibranched polymer of the present invention, a repeating unit derived from a polymerizable unsaturated bond of Q is more preferably a repeating unit represented by the following formula (a1) or (b1).

When the repeating unit derived from a polymerizable unsaturated bond of Q is a repeating unit represented by the following formula (a1), it is more preferable that it has a repeating unit represented by the following formula (a) and a repeating unit (c) derived from styrene or a styrene derivative and a molar ratio of the repeating unit (a) to the repeating unit (c) is within a range from 95/5 to 70/30.

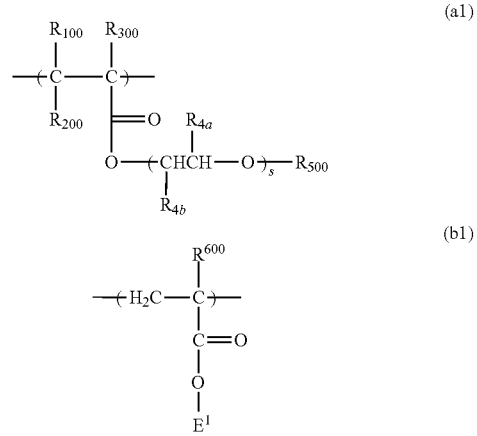

In the formula (a1), $R_{100}$ to $R_{300}$ each independently represents a hydrogen atom or a C1 to 10 hydrocarbon group.

Examples of the hydrocarbon group having 1 to 10 carbon atoms of $R_{100}$ to $R_{300}$ include an alkyl group having 1 to 10 carbon atoms, such as methyl group, ethyl group, n-propyl group, isopropyl group, n-butyl group, sec-butyl group, isobutyl group, or t-butyl group; and an aryl group having 6 to 10 carbon atoms, such as phenyl group or naphthyl group.

Also, $R_{100}$ and $R_{300}$ may be combined to form a ring. Examples of the ring include a 3- to 8-membered carbon ring such as cyclopropane ring, cyclopentane ring, or cyclohexane ring.

The hydrocarbon group of $R_{100}$ to $R_{300}$ may have a substituent at any position. Examples of the substituent include a halogen atom such as fluorine atom, chlorine atom, bromine atom; an alkyl group such as methyl group, ethyl group, or n-propyl group; an aryl group such as phenyl group or naphthyl group; an acyl group such as acetyl group or benzoyl group; a cyano group; a nitro group; an alkoxyl group such as methoxy group or ethoxy group; an aryloxy group such as phenoxy group; an alkylthio group such as methylthio group; an alkylsulfinyl group such as methylsulfinyl group; an alkylsulfonyl group such as methylsulfonyl group; an amino group which may have a substituent, such as amino group or dimethylamino group; and an anilino group. The hydrocarbon group of $R_{100}$ to $R_{300}$ may have the same substituent or plural different substituents.

$R_{4a}$ and $R_{4b}$ each independently represents a hydrogen atom or a methyl group.

S represents any integer of 2 to 100, preferably any integer of 5 to 100, and more preferably any integer of 10 to 100. The value of s in each repeating unit may be the same or different.

Also, groups represented by the formula: —CH($R_{4b}$)—CH($R_{4a}$)—O— may be the same or different.

$R_{500}$ represents a hydrogen atom, a hydrocarbon group, an acyl group, or a silyl group.

Examples of the hydrocarbon group of $R_{500}$ include an alkyl group such as methyl group, ethyl group, n-propyl group, isopropyl group, n-butyl group, sec-butyl group, isobutyl group, t-butyl group, or n-hexyl group; and an aryl group such as phenyl group, 1-naphthyl group, or 2-naphthyl group. Examples of the acyl group include formyl group, acetyl group, propionyl group, butyryl group, and benzoyl group. Examples of the silyl group include trimethylsilyl group, and t-butyldimethylsilyl group.

The number of carbon atoms of the hydrocarbon group of $R_{500}$ is not specifically limited, and is usually from 1 to 20, and preferably from 1 to 10. The hydrocarbon group of $R_{500}$ may have the same substituent as that of the hydrocarbon group of $R_{100}$ to $R_{300}$.

The polymerization degree of the repeating unit represented by the formula (a1) is preferably 10 or more, and more preferably 20 or more, although it depends on the value of s.

The repeating unit represented by the formula (a) can be derived, for example, from those which are commercially available from NOF CORPORATION under the trade name of "BLEMMER PME Series".

In the formula (b1), $R^{600}$ represents a hydrogen atom; or a C1 to C6 alkyl group such as methyl group or ethyl group.

$E^1$ represents a hydrogen atom or an organic group. As used herein, the organic group means a group having at least one carbon atom. Specific examples of preferable organic group include an organic group having an alicyclic hydrocarbon skeleton and an organic group having a lactone ring.

Specific examples of the organic group having an alicyclic hydrocarbon skeleton include groups represented by the formula (d): -a-β. In the formula (d), a represents a single bond, —O—, —COO—, —OCO—, —CO—, an alkylene group, or a divalent group as a combination thereof.

Also, β represents any of the following formulas (e-1) to (e-6).

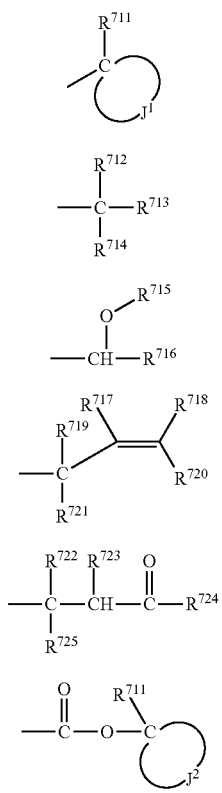

In the formula (e-1) to (e-6), $R^{711}$ represents a hydrogen atom or a C1 to C5 alkyl group.

$J^1$ and $J^2$ each independently represents an atomic group which is required to combine with a carbon atom to form an alicyclic hydrocarbon group.

$R^{712}$ to $R^{716}$ each independently represents a hydrogen atom, a C1 to C4 alkyl group, or an alicyclic hydrocarbon group. Provided that at least one of $R^{712}$ to $R^{714}$, and either $R^{715}$ or $R^{716}$ is an alicyclic hydrocarbon group.

$R^{717}$ to $R^{721}$ each independently represents a hydrogen atom, a C1 to C4 alkyl group, or an alicyclic hydrocarbon group. Provided that at least one of $R^{717}$ to $R^{721}$ is an alicyclic hydrocarbon group, and either $R^{719}$ or $R^{721}$ is a C1 to C4 alkyl group or an alicyclic hydrocarbon group.

$R^{722}$ to $R^{725}$ each independently represents a hydrogen atom, or a linear or branched C1 to C4 alkyl or alicyclic hydrocarbon group. Provided that at least one of $R^{722}$ to $R^{725}$ is an alicyclic hydrocarbon group.

Specific examples of the alicyclic hydrocarbon group include skeletons represented by the following formulas.

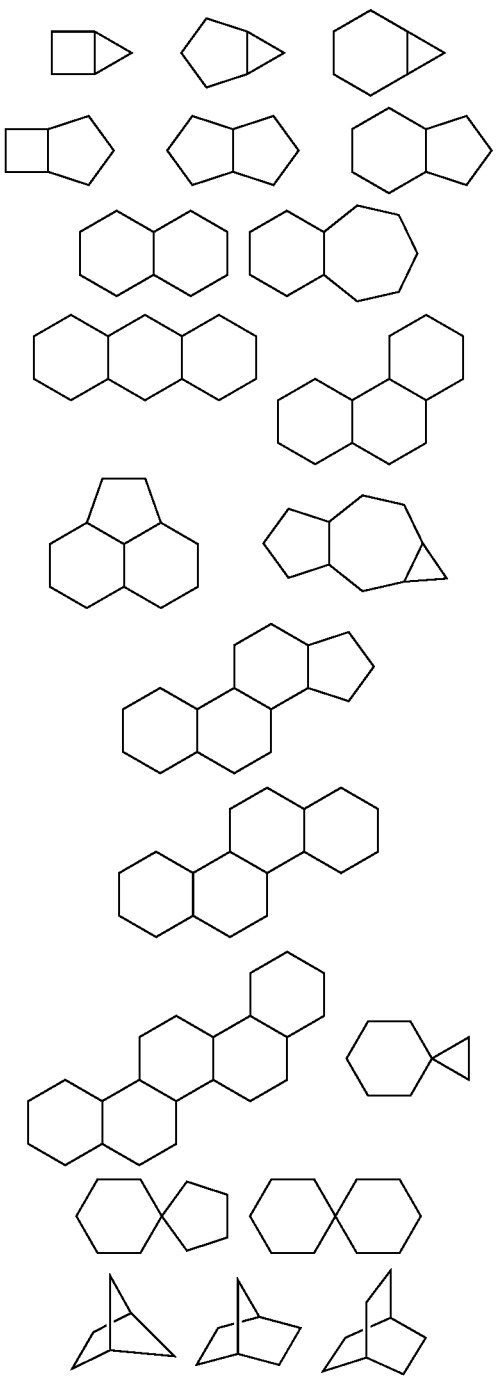

-continued

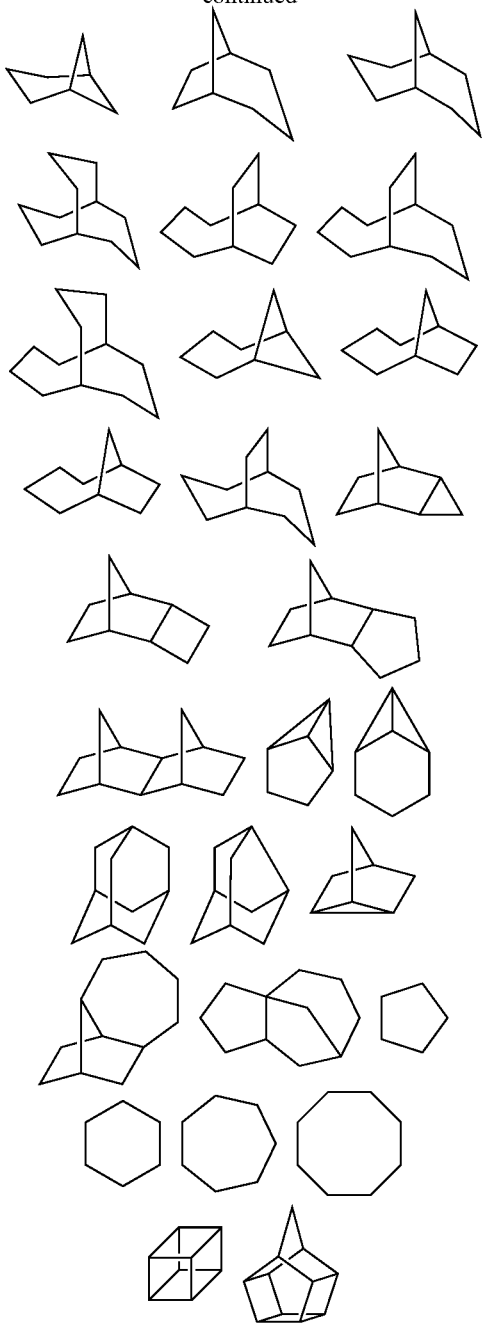

Among these, a 2-substituted adamantyl group represented by the following formula (f) is preferable.

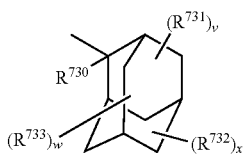

In the formula (f), $R^{730}$ represents a hydrogen atom, or an alkyl group which may have a substituent.

$R^{731}$ to $R^{733}$ each independently represents at least one group selected from the group consisting of hydroxyl group, halogen atom, carboxyl group, C1 to C6 alkyl group, C3 to C8 cycloalkyl group, C2 to C7 alkenyl group, alkoxyl group, alkoxycarbonyl group, and acyl group.

v, w and x each independently represents any integer of 0 to 3.

When v, x or w is 2 or more, $R^{731}$(s), $R^{732}$(s) and $R^{733}$(s) may be the same or different.

Also, specific examples of a are divalent groups represented by the following formulas.

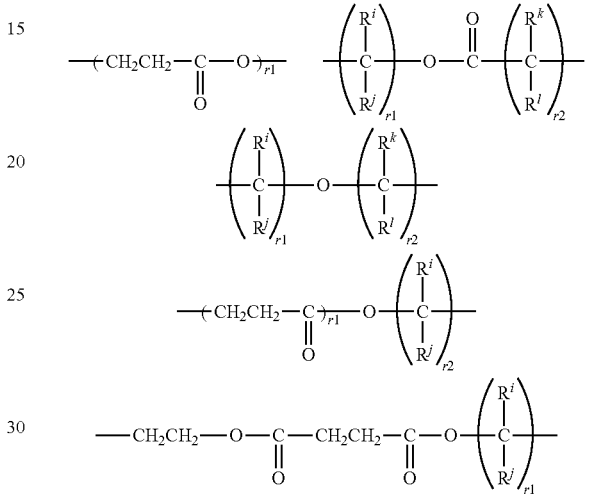

In the formula, $R^i$ to $R^l$ each independently represents a hydrogen atom, a C1 to C6 alkyl group which may have a substituent, a halogen atom, a hydroxyl group, or a C1 to C6 alkoxyl group.

Examples of the C1 to C6 alkyl group of $R^i$ to $R^l$ include methyl group, ethyl group, n-propyl group, isopropyl group, and n-butyl group.

Examples of the substituent of the C1 to C6 alkyl group which may have a substituent include hydroxyl group, halogen atom, and C1 to C6 alkoxyl group.

Examples of the C1 to C6 alkoxyl group include methoxy group, ethoxy group, propoxy group, and butoxy group.

Examples of the halogen atom include chlorine atom, bromine atom, fluorine atom, and iodine atom.

r1 and r2 each independently represents any integer of 1 to 10.

Examples of the compound wherein $E^1$ is an organic group having an alicyclic hydrocarbon skeleton among compounds represented by the formula (b1) include those represented by the following formulas.

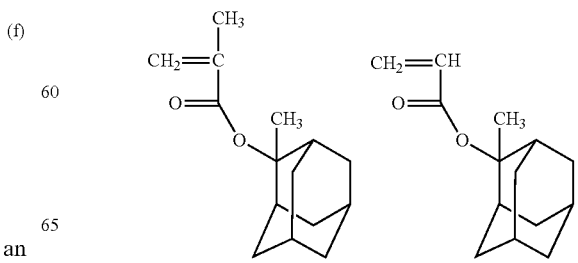

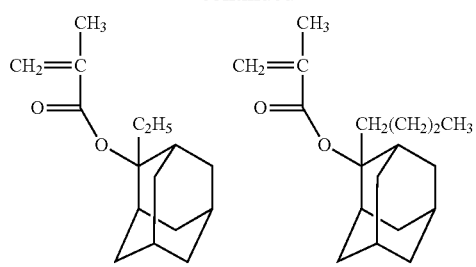
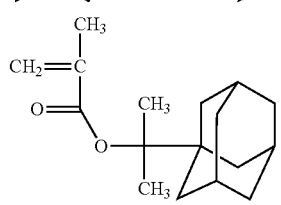
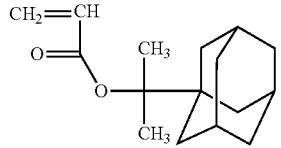
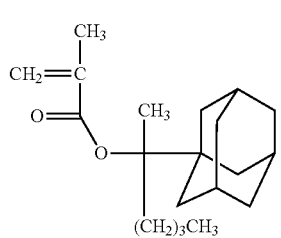
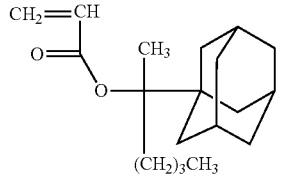
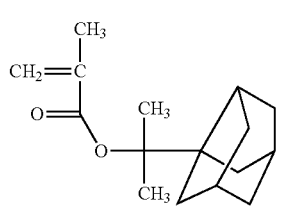
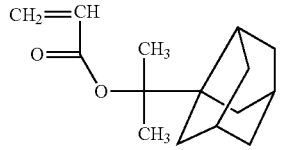
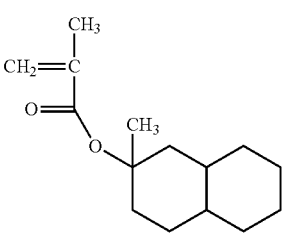
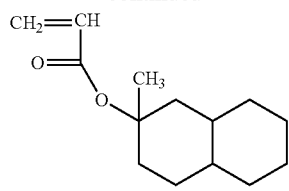
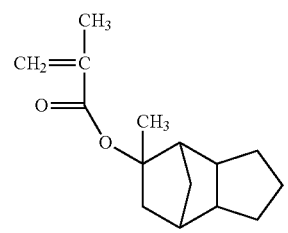
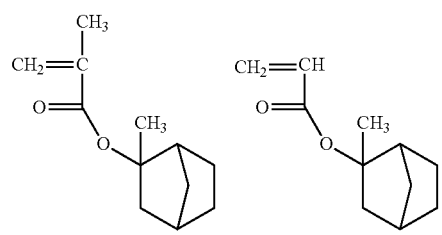
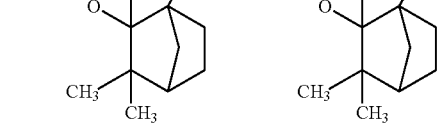

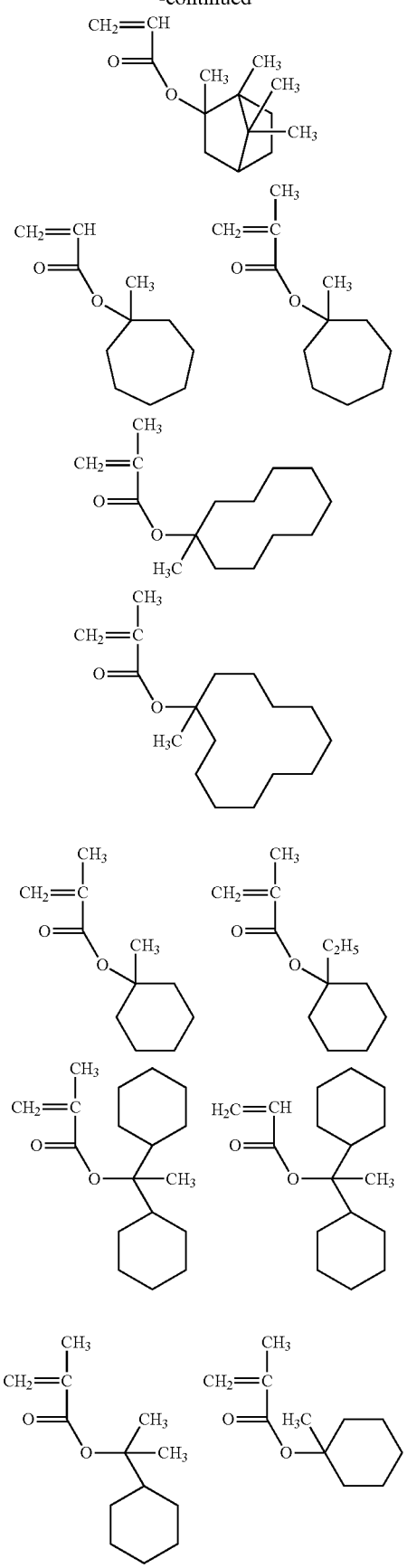
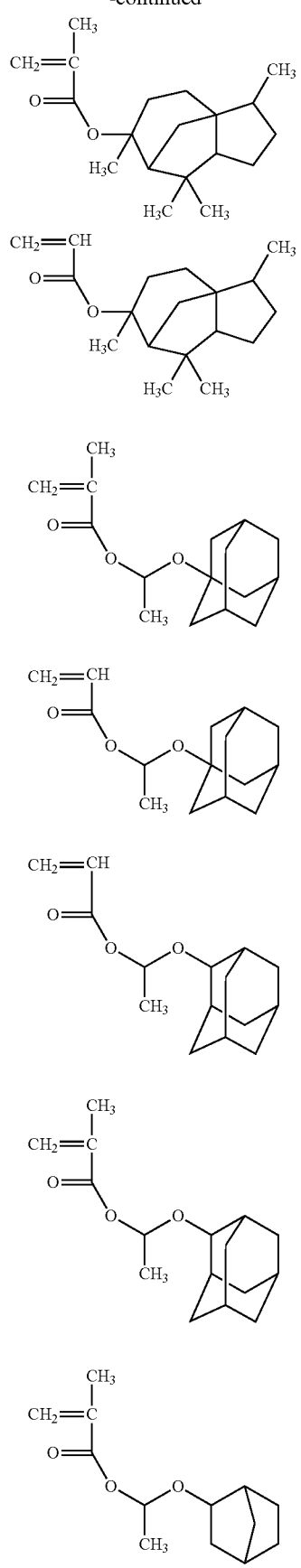

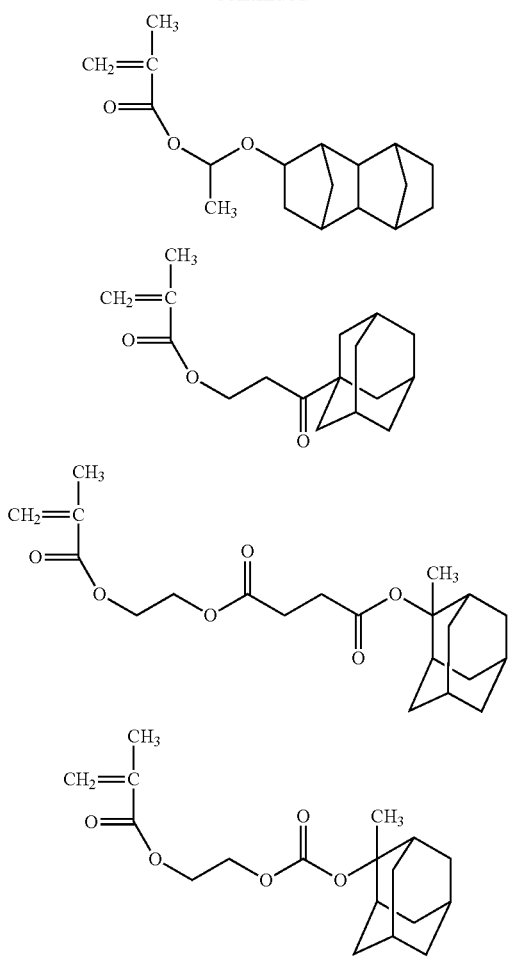

Specific examples of the compound wherein $E^1$ is an organic group having a lactone ring among compounds represented by the formula (b1) include butyrolactone acrylate, butyrolactone methacrylate, mevalonic lactone methacrylate, and pantolactone methacrylate. Among these compounds, a compound wherein $E^1$ is an organic group represented by the formula (g): -a-γ is preferable.

In the formula, a is as defined above, and γ is any one of the following formulas (h-1) to (h-5).

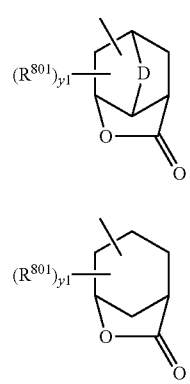

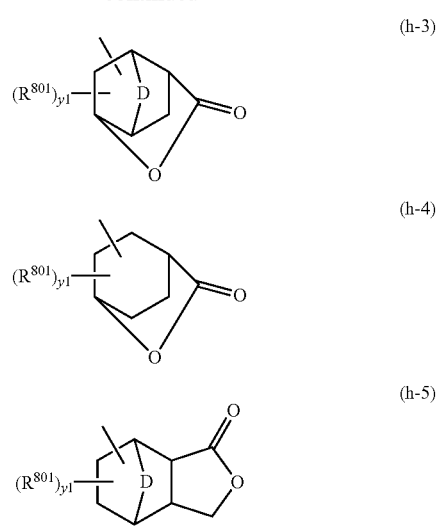

In the formulas (h-1) to (h-5), D represents an oxygen atom, a sulfur atom, or an alkylene group which may have a substituent.

$R^{801}$ represents a C1 to C6 alkyl group which may have a substituent, a C3 to C8 cycloalkyl group, or a C2 to C7 alkenyl group.

y1 represents any integer of 0 to 5 and, when y1 is 2 or more, $R^{801}$(s) may be the same or different or may be combined with each other to form a ring.

Specific examples of the compound wherein $E^1$ is an organic group having a lactone ring among compounds represented by the formula (b1) include those represented by the following formulas.

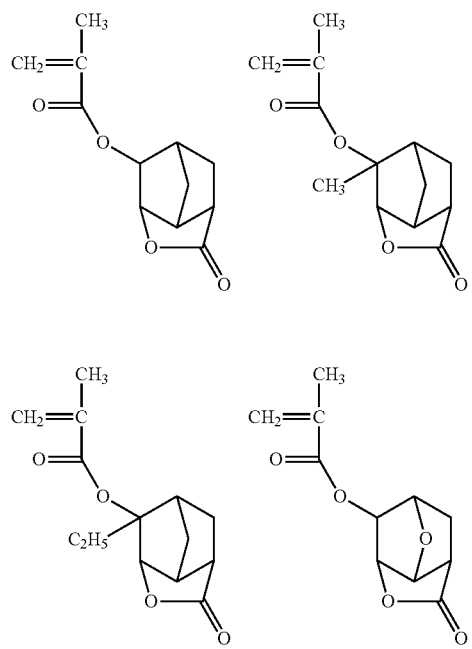

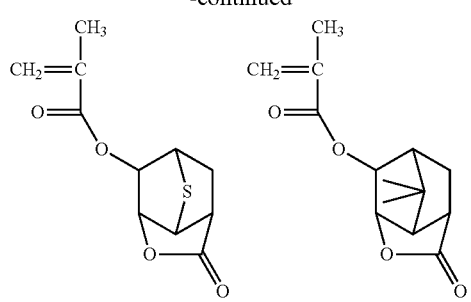
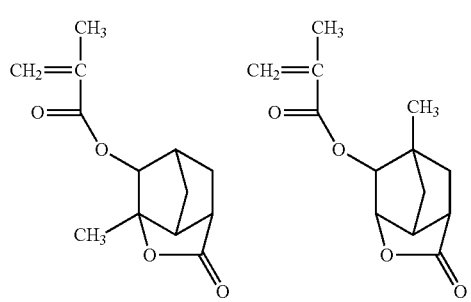
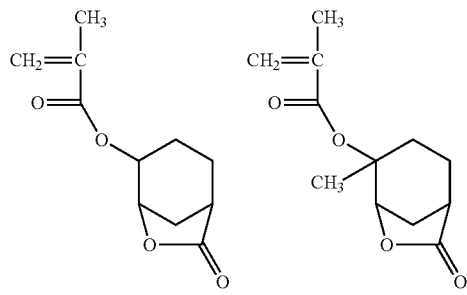
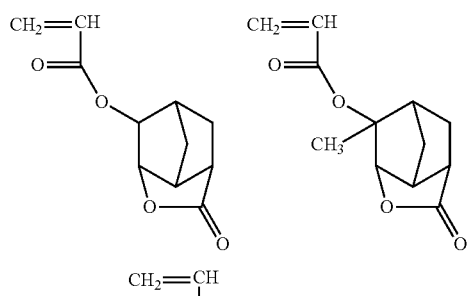
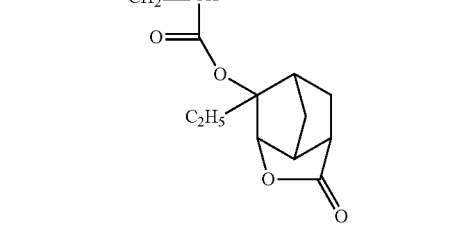
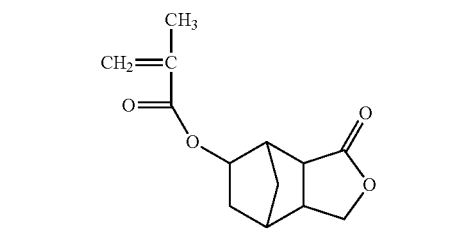
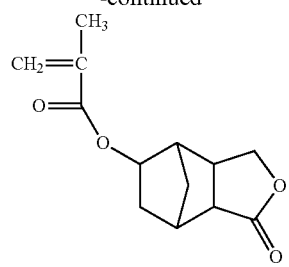
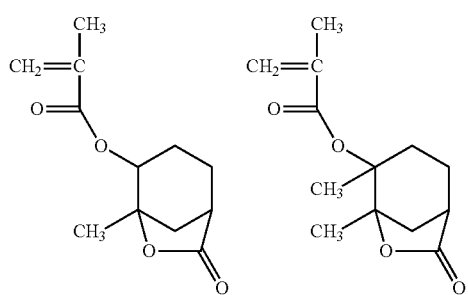
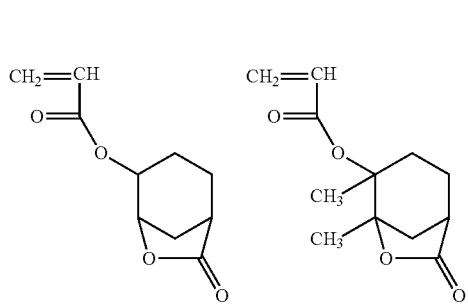
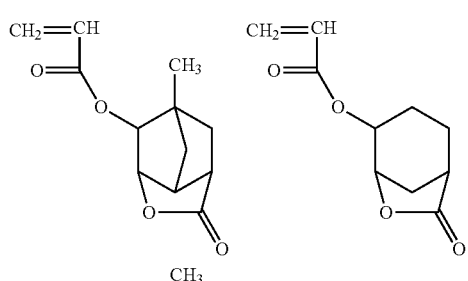
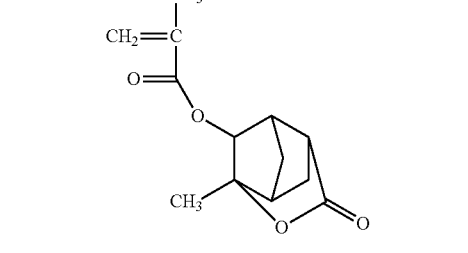
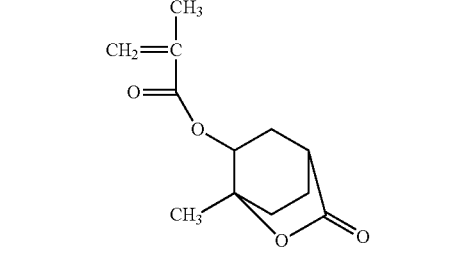

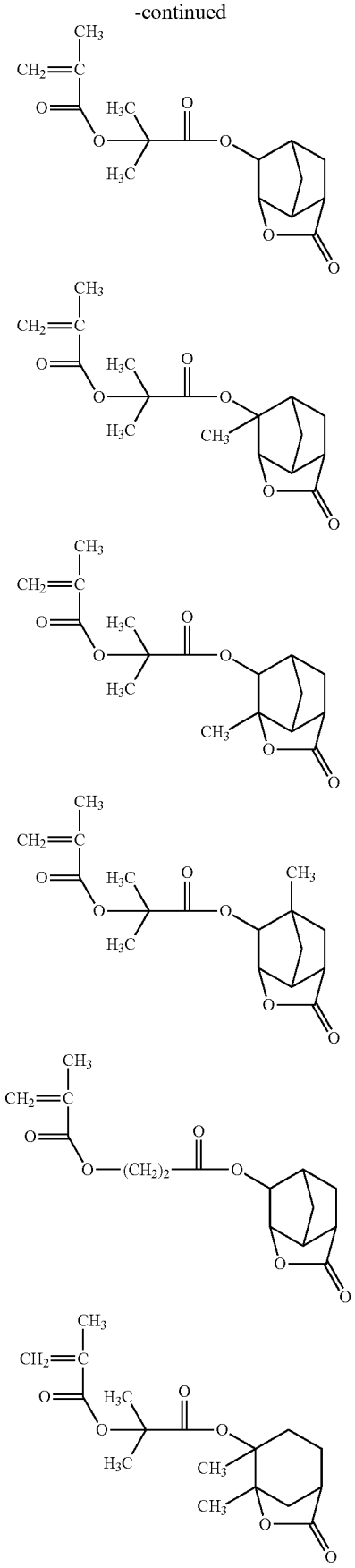
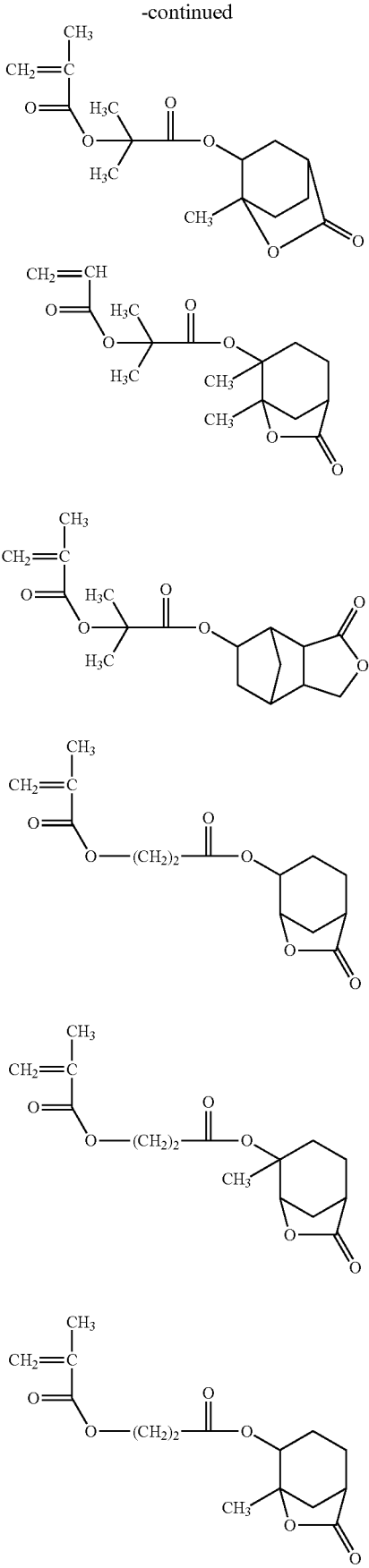

47
-continued
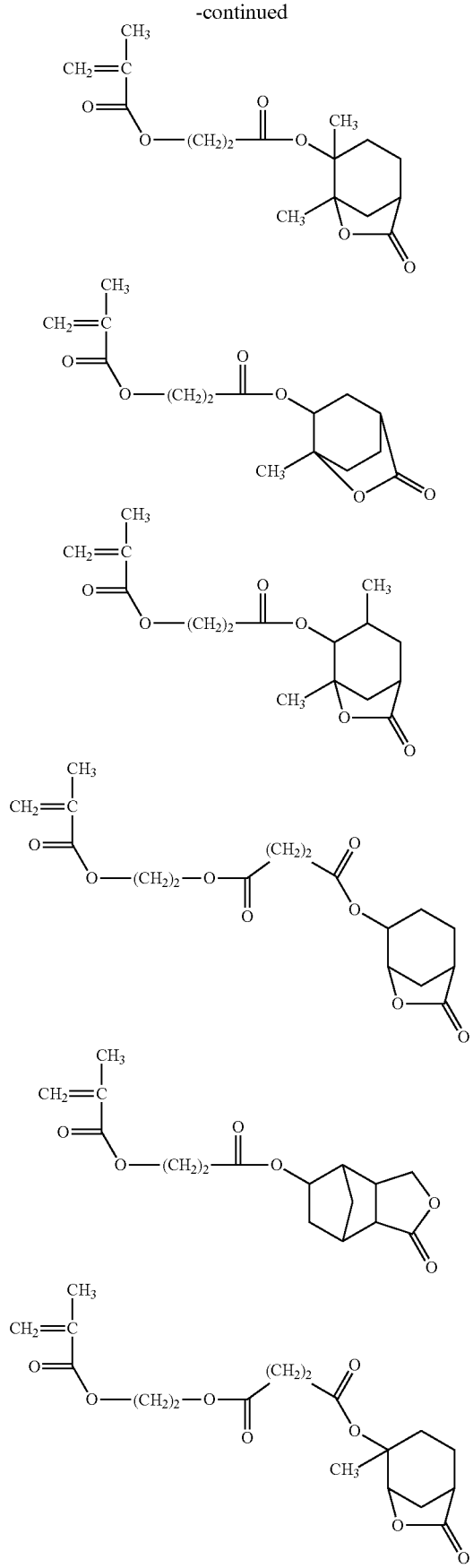
48
-continued
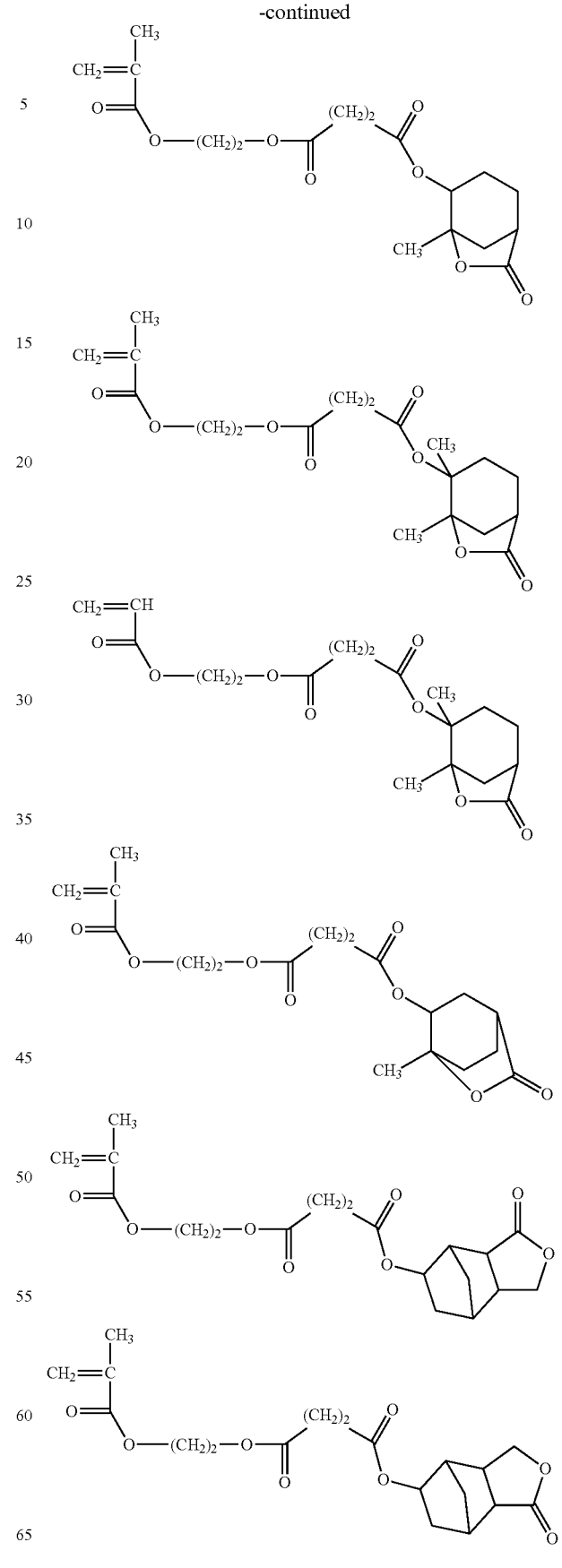

The multibranched polymer of the present invention is preferably represented by the formula (II) or (III).

In the formula (II), Z represents $(CH_2)_q$ or a p-phenylene group, and q represents an integer of 0 to 3.

$R^{10}$, $R^{11}$, $R^{12}$ and $R^{13}$ each independently represents a hydrogen atom, a C1 to C6 alkyl group, an aryl group which may have a substituent, a halogen atom, or a C1 to C6 alkoxyl group. Specific examples of them include the same one exemplified for R.

$n^3$, $n^4$, $n^5$ and $n^6$ each independently represents any integer of 0 to 3.

$X^0$, $X^1$, $X^2$ and $X^3$ each independently represents the same linking group containing an atom of Groups 14 to 16 in the Periodic Table as those for $X^a$.

$p^0$ to $p^3$ each independently represents 0 or 1.

$p^0$ to $p^3$ each preferably represents 1 because a raw material for production is easily available and a narrowly dispersed multibranched polymer having a controlled molecular weight can be easily obtained.

$Y^0$ to $Y^3$ each independently represents a functional group having a structure capable of having an active halogen atom. Specific examples of $Y^0$ to $Y^3$ include the same one listed as specific examples of Y.

$Q^0$ to $Q^3$ each independently represents the same arm moiety having a repeating unit derived from a polymerizable unsaturated bond as that of a repeating unit derived from a polymerizable unsaturated bond of Q.

In the formula (III), $X^4$ and $X^5$ each independently represents the same linking group containing an atom of Groups 14 to 16 in the Periodic Table as those for $X^a$.

$Y^4$ represents a functional group having a structure capable of having an active halogen atom. Specific examples of $Y^4$ include the same one listed as specific examples of Y.

$R^{14}$ represents a hydrogen atom, a C1 to C6 alkyl group, an aryl group which may have a substituent, a halogen atom, or a C1 to C6 alkoxyl group. Specific examples of them include the same one as those for $R^1$.

$Q^4$ represents the same arm moiety having a repeating unit derived from a polymerizable unsaturated bond as those of a repeating unit derived from a polymerizable unsaturated bond of Q.

$n^7$ and $n^8$ each independently represents an integer of 0 or 1 or more, and when $n^7$ and $n^8$ each represents 2 or more, $X^4(s)$ and $X^5(s)$ may be the same or different.

$m^3$ represents 3 or 4, and groups represented by the formula: $-(X^4)_{n7}-Y^4-Q^4$ may be the same or different.

Among these, the core moiety of the multibranched polymer of the present invention is particularly preferably a core moiety having a structure represented by the following formula (XXII):

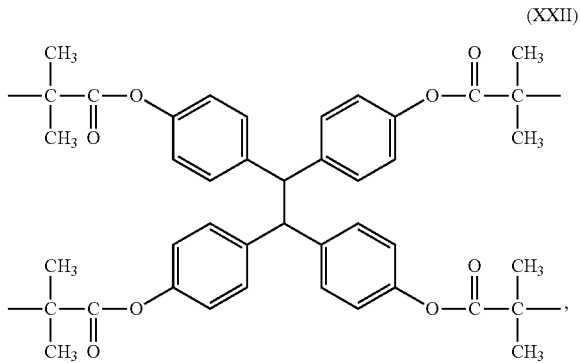

(XXII)

a core moiety having a structure represented by the formula (XXIII),

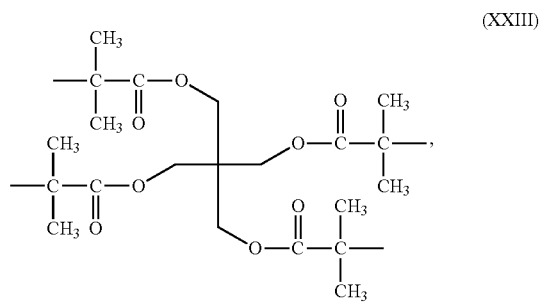

(XXIII)

or a core moiety having a structure obtained by bonding a group represented by the formula: $-C(CH_3)_2-C(=O)-$* (bonded with an oxygen atom at the position represented by the symbol *) at the terminal oxygen atom of a dendrimer type polymer compound (trade name: Boltorn H30, manufactured by Perstorp Co.) which is obtained by repeating the reaction of trimethylolpropane with 2,2-dimethylolpropionic acid (Bis-MPA) and the reaction of a hydroxyl group of the resulting reaction product with the same hydroxycarboxylic acid having 2 or more hydroxyl groups (or an acid halide) 1 to 200 times.

The weight average molecular weight of the polymer chain constituting the arm moiety of the multibranched polymer used in the present invention is not specifically limited, but is preferably within a range from 5,000 to 1,000,000 in terms of a polystyrene equivalent weight average molecular weight determined by a gel permeation chromatography MALLS method (GPC-MALLS method).

The weight average molecular weight (Mw) of the multibranched polymer of the present invention is within a range from 10,000 to 2,000,000, and preferably from 50,000 to 1,000,000, and the molecular of weight multibranched polymer is controlled.

2) Method for Producing Multibranched Polymer

The method for producing a multibranched polymer of the present invention is characterized by polymerizing the compound represented by the formula (VII) with a compound having a polymerizable unsaturated bond under living radical polymerization conditions. The method for producing a multibranched polymer of the present invention is particularly useful as a method for producing a multibranched polymer of the present invention.

In the formula (VII), $A^1$ represents the same organic group having 3 or more branched chains as that of A.

$X^{a1}$ represents the same linking group containing any atom of Groups 14 to 16 in the Periodic Table as that of $X^a$.

$m^{10}$ represents any integer of 1 to the number of branched chains of $A^1$, $m^{20}$ represents the number of branched chains of $A^1$, $n^{10}$ represents an integer of 0 or 1 or more, when $n^{10}$ is 2 or more, $X^{a1}(s)$ may be the same or different, when $m^{10}$ is 2 or more, groups represented by the formula: $-(X^{a1})_{n10}-W$ may be the same or different, and when $(m^{20}-m^{10})$ is 2 or more, $R^{a1}(s)$ may be the same or different.

$R^{a1}$ represents the same organic group which is not associated with the polymerization reaction as that of $R^a$.

In the production method of the present invention, $R^{a1}$ is preferably a group represented by the following formula (VIIa).

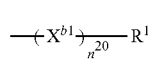
(VIIa)

In the formula (VIIa), $X^{b1}$ represents the same linking group containing any atom of Groups 14 to 16 in the Periodic Table as that of $X^b$.

$R^1$ represents the same hydrogen atom, C1 to C6 alkyl group, an aryl group which may have a substituent, halogen atom, or C1 to C6 alkoxyl group as that of R.

$n^{20}$ represents an integer of 0 or 1 or more and, when $n^{20}$ is 2 or more, $X^{b1}$(s) may be the same or different.

W represents a functional group represented by the following formula (VIII) or (IX).

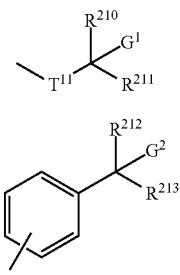

In the formula (VIII), $T^{11}$ represents a divalent electron attractive group.

$R^{210}$ represents a hydrogen atom; a halogen atom such as fluorine atom, chlorine atom, or bromine atom; a C1 to C6 alkyl group such as methyl group, ethyl group, or propyl group; a C7 to C12 aralkyl group such as benzyl group or phenethyl group; an aryl group such as phenyl group, 1-naphthyl group, or 2-naphthyl group; an ester group such as methoxycarbonyl group or ethoxycarbonyl group; or an acyl group such as formyl group, acetyl group, or benzoyl group.

$R^{211}$ represents a hydrogen atom; a C1 to C6 alkyl group such as methyl group or ethyl group; a C7 to C12 aralkyl group such as benzoyl group or phenethyl group; an aryl group such as phenyl group, 1-naphthyl group, or 2-naphthyl group; an ester group such as methoxycarbonyl group or ethoxycarbonyl group; or an acyl group such as formyl group, acetyl group, or benzoyl group.

$G^1$ represents a halogen atom such as chlorine atom, bromine atom, or iodine atom.

In the formula (IX), $R^{212}$ represents a hydrogen atom, a halogen atom, a C1 to C6 alkyl group, a C7 to C12 aralkyl group, an aryl group, an ester group, or an acyl group. Specific examples of them include the same one listed as specific examples of $R^{22}$.

$R^{213}$ represents a hydrogen atom, a C1 to C6 alkyl group, a C7 to C12 aralkyl group, an aryl group, an ester group, or an acyl group. Specific examples of them include the same one listed as specific examples of $R^{23}$.

$G^2$ represents the same halogen atom as that of $G^1$.

In the method for producing a multibranched polymer of the present invention, $T^{11}$ in the formula (VIII) is preferably a group represented by the following formula (t111) or (t211), and more preferably a group represented by the formula (t111).

(t111)

(t211)

In the formula, $Z^{111}$ represents an oxygen atom, a sulfur atom, or a group represented by $Nr^{711}$ ($r^{711}$ represents a hydrogen atom, a C1 to C6 alkyl group, a phenyl group which may have a substituent, an alkylcarbonyl group, a phenylcarbonyl group which may have a substituent, an alkylsulfonyl group, or a phenylsulfonyl group which may have a substituent).

In the formula $Nr^{711}$, $r^{711}$ represents a hydrogen atom; a C1 to C6 alkyl group such as methyl group or ethyl group; a phenyl group which may have a substituent, such as phenyl group or 4-methylphenyl group; an alkylcarbonyl group such as acetyl group; a phenylcarbonyl group which may have a substituent, such as benzoyl group or 4-chlorobenzoyl group; an alkylsulfonyl group such as methylsulfonyl group; or a phenylsulfonyl group which may have a substituent such as phenylsulfonyl group, 4-methylphenylsulfonyl group.

In the method for producing a multibranched polymer of the present invention, the compound represented by the formula (VII) is a compound represented by the formula (X) or (XI).

In the formula (X), $Z^1$ represents $(CH_2)_{q1}$ or a p-phenylene group.

q1 represents an integer of 0 to 3.

$R^{60}$ to $R^{63}$ each independently represents a C1 to C6 alkyl group, a phenyl group which may have a substituent, a halogen atom, or a C1 to C6 alkoxyl group. Specific examples of them include the same C1 to C6 alkyl group, phenyl group which may have a substituent, halogen atom, or C1 to C6 alkoxyl group as that listed as specific examples of R.

$n^{13}$ to $n^{16}$ each independently represents an integer of 0 to 3.

$X^{21}$ to $X^{24}$ each independently represents the same linking group containing any atom of Groups 14 to 16 in the Periodic Table as that of $X^{a1}$.

$W^0$ to $W^3$ each independently represents a functional group represented by the formula (VIII) or (IX).

$p^{20}$ to $p^{23}$ each independently represents 0 or 1. $p^{20}$ to $p^{23}$ each preferably represents 1 because a raw material for production is easily obtained and a narrowly dispersed multibranched polymer having a controlled molecular weight can be easily obtained.

In the formula (XI), $X^{25}$ and $X^{26}$ each independently represents the same linking group containing any atom of Groups 14 to 16 in the Periodic Table as that of $X^{a1}$.

$W^4$ represents a functional group represented by the formula (VIII) or (IX).

$n^{17}$ and $n^{18}$ each independently represents an integer of 0 or 1 or more and, when $n^{17}$ and $n^{18}$ each represents 2 or more, $X^{25}$ and $X^{26}$ may be the same or different.

$m^{30}$ represents 3 or 4, and groups represented by the formula: $—(X^{25})_{n17}—W^4$ may be the same or different.

$R^{140}$ represents a hydrogen atom, a C1 to C6 alkyl group, a phenyl group which may have a substituent, a halogen atom, or a C1 to C6 alkoxyl group, and specific examples of the C1 to C6 alkyl group, phenyl group which may have a substituent, halogen atom, or C1 to C6 alkoxyl group of $R^{140}$ include the same one listed as specific examples of the C1 to C6 alkyl group, phenyl group which may have a substituent, halogen atom, or C1 to C6 alkoxyl group of $R^1$.

The compound represented by the formula (VII) can be produced by a known production method. For example, a compound (VII-1) of the formula (VII) wherein $R^{a1}$ is a group represented by the formula (VIIa) can be obtained by the following method:

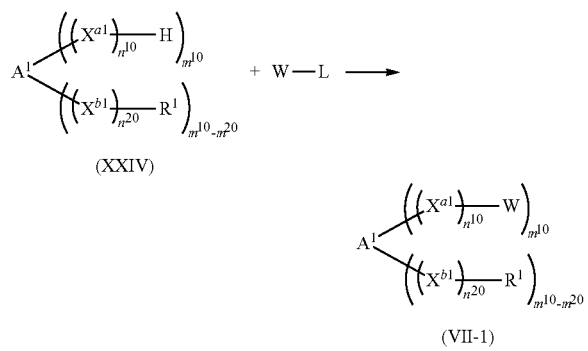

wherein $A^1$, $X^{a1}$, $X^{b1}$, $n^{10}$, $n^{20}$, $m^{10}$, $m^{20}$, $R^1$ and W are as defined above, and L represents a leaving group such as halogen atom.

Namely, it can be obtained by reacting a compound constituting a core moiety having a structure represented by the formula (XXIV) (hereinafter referred to as a "core moiety constituting compound", sometimes) with a reactive compound represented by the formula; W-L (hereinafter referred to as a "reactive compound", sometimes).

Examples of the core moiety constituting compound include (α) a compound wherein a linking group $X^{a1}$ or $X^{b1}$ is —O—, (β) a compound wherein a linking group $X^{a1}$ or $X^{b1}$ is —C(=O)—O—, and (γ) a compound wherein a linking group $X^{a1}$ or $X^{b1}$ is —NH—.

Specific examples of the compound (α) include tetrakis(hydroxyphenyl)alkanes, tetrakis(hydroxyphenyl)xylenes, a trihydric alcohol compound, and a tetrahydric alcohol compound.

Examples of the tetrakis(hydroxyphenyl)alkanes include tetrakis(hydroxyphenyl)ethanes such as 1,1,2,2-tetrakis(4-hydroxyphenyl)ethane, 1,1,2,2-tetrakis(3-methyl-4-hydroxyphenyl)ethane, 1,1,2,2-tetrakis(3,5-dimethyl-4-hydroxyphenyl)ethane, 1,1,2,2-tetrakis(3-chloro-4-hydroxyphenyl)ethane, 1,1,2,2-tetrakis(3,5-dichloro-4-hydroxyphenyl)ethane, 1,1,2,2-tetrakis(3-bromo-4-hydroxyphenyl)ethane, 1,1,2,2-tetrakis(3,5-dibromo-4-hydroxyphenyl)ethane, 1,1,2,2-tetrakis(3-t-butyl-4-hydroxyphenyl)ethane, 1,1,2,2-tetrakis(3,5-di-t-butyl-4-hydroxyphenyl)ethane, 1,1,2,2-tetrakis(3-fluoro-4-hydroxyphenyl)ethane, 1,1,2,2-tetrakis(3,5-difluoro-4-hydroxyphenyl)ethane, 1,1,2,2-tetrakis(3-methoxy-4-hydroxyphenyl)ethane, 1,1,2,2-tetrakis(3,5-dimethoxy-4-hydroxyphenyl)ethane, 1,1,2,2-tetrakis(3-phenyl-4-hydroxyphenyl)ethane, 1,1,2,2-tetrakis(3,5-diphenyl-4-hydroxyphenyl)ethane, 1,1,2,2-tetrakis(3-fluoro-5-methyl-4-hydroxyphenyl)ethane, 1,1,2,2-tetrakis(3-chloro-5-methyl-4-hydroxyphenyl)ethane, 1,1,2,2-tetrakis(3-bromo-5-methyl-4-hydroxyphenyl)ethane, 1,1,2,2-tetrakis(3-methoxy-5-methyl-4-hydroxyphenyl)ethane, 1,1,2,2-tetrakis(3-t-butyl-5-methyl-4-hydroxyphenyl)ethane, 1,1,2,2-tetrakis(3-phenyl-5-methyl-4-hydroxyphenyl)ethane, 1,1,2,2-tetrakis(3-chloro-5-bromo-4-hydroxyphenyl)ethane, and 1,1,2,2-tetrakis(3-chloro-5-phenyl-4-hydroxyphenyl)ethane;

tetrakis(hydroxyphenyl)propanes such as 1,1,3,3-tetrakis(4-hydroxyphenyl)propane, 1,1,3,3-tetrakis(3-methyl-4-hydroxyphenyl)propane, 1,1,3,3-tetrakis(3,5-dimethyl-4-hydroxyphenyl)propane, 1,1,3,3-tetrakis(3-chloro-4-hydroxyphenyl)propane, 1,1,3,3-tetrakis(3,5-dichloro-4-hydroxyphenyl)propane, 1,1,3,3-tetrakis(3-bromo-4-hydroxyphenyl)propane, 1,1,3,3-tetrakis(3,5-dibromo-4-hydroxyphenyl)propane, 1,1,3,3-tetrakis(3-phenyl-4-hydroxyphenyl)propane, 1,1,3,3-tetrakis(3,5-diphenyl-4-hydroxyphenyl)propane, 1,1,3,3-tetrakis(3-methoxy-4-hydroxyphenyl)propane, 1,1,3,3-tetrakis(3,5-dimethoxy-4-hydroxyphenyl)propane, 1,1,3,3-tetrakis(3-t-butyl-4-hydroxyphenyl)propane, and 1,1,3,3-tetrakis(3,5-di-t-butyl-4-hydroxyphenyl)propane;

tetrakis(hydroxyphenyl)butanes such as 1,1,4,4-tetrakis(4-hydroxyphenyl)butane, 1,1,4,4-tetrakis(3-methyl-4-hydroxyphenyl)butane, 1,1,4,4-tetrakis(3,5-dimethyl-4-hydroxyphenyl)butane, 1,1,4,4-tetrakis(3-chloro-4-hydroxyphenyl)butane, 1,1,4,4-tetrakis(3,5-dichloro-4-hydroxyphenyl)butane, 1,1,4,4-tetrakis(3-methoxy-4-hydroxyphenyl)butane, 1,1,4,4-tetrakis(3,5-dimethoxy-4-hydroxyphenyl)butane, 1,1,4,4-tetrakis(3-bromo-4-hydroxyphenyl)butane, 1,1,4,4-tetrakis(3,5-dibromo-4-hydroxyphenyl)butane, 1,1,4,4-tetrakis(3-t-butyl-4-hydroxyphenyl)butane, and 1,1,4,4-tetrakis(3,5-di-t-butyl-4-hydroxyphenyl)butane; and tetrakis(hydroxyphenyl)pentanes such as 1,1,5,5-tetrakis(4-hydroxyphenyl)pentane, 1,1,5,5-tetrakis(3-methyl-4-hydroxyphenyl)pentane, 1,1,5,5-tetrakis(3,5-dimethyl-4-hydroxyphenyl)pentane, 1,1,5,5-tetrakis(3-chloro-4-hydroxyphenyl)pentane, 1,1,5,5-tetrakis(3,5-dichloro-4-hydroxyphenyl)pentane, 1,1,5,5-tetrakis(3-methoxy-4-hydroxyphenyl)pentane, 1,1,5,5-tetrakis(3,5-dimethoxy-4-hydroxyphenyl)pentane, 1,1,5,5-tetrakis(3-bromo-4-hydroxyphenyl)pentane, 1,1,5,5-tetrakis(3,5-dibromo-4-hydroxyphenyl)pentane, 1,1,5,5-tetrakis(3-t-butyl-4-hydroxyphenyl)pentane, and 1,1,5,5-tetrakis(3,5-di-t-butyl-4-hydroxyphenyl)pentane.

Examples of the tetrakis(hydroxyphenyl)xylenes include tetrakis(hydroxyphenyl)xylenes such as a,a,a',a'-tetrakis(4-hydroxyphenyl)-p-xylene, a,a,a',a'-tetrakis(3-methyl-4-hydroxyphenyl)-p-xylene, a,a,a',a'-tetrakis(3,5-dimethyl-4-hydroxyphenyl)-p-xylene, a,a,a',a'-tetrakis(3-chloro-4-hydroxyphenyl)-p-xylene, a,a,a',a'-tetrakis(3,5-dichloro-4-hydroxyphenyl)-p-xylene, a,a,a',a'-tetrakis(3-bromo-4-hydroxyphenyl)-p-xylene, a,a,a',a'-tetrakis(3,5-dibromo-4-hydroxyphenyl)-p-xylene, a,a,a',a'-tetrakis(3-t-butyl-4-hydroxyphenyl)-p-xylene, a,a,a',a'(3,5-di-t-butyl-4-hydroxyphenyl)-p-xylene, a,a,a',a'-tetrakis(3-fluoro-4-hydroxyphenyl)-p-xylene, a,a,a',a'-tetrakis(3,5-difluoro-4-hydroxyphenyl)-p-xylene, a,a,a',a'-tetrakis(3-methoxy-4-hydroxyphenyl)-p-xylene, a,a,a',a'-tetrakis(3,5-dimethoxy-4-hydroxyphenyl)-p-xylene, a,a,a',a'-tetrakis(3-phenyl-4-hydroxyphenyl)-p-xylene, a,a,a',a'-tetrakis(3,5-diphenyl-4-hydroxyphenyl)-p-xylene, a,a,a',a'-tetrakis(3-fluoro-5-methyl-4-hydroxyphenyl)-p-xylene, a,a,a',a'-tetrakis(3-chloro-5-methyl-4-hydroxyphenyl)-p-xylene, a,a,a',a'-tetrakis(3-bromo-5-methyl-4-hydroxyphenyl)-p-xylene, a,a,a',a'-tetrakis(3-methoxy-5-methyl-4-hydroxyphenyl)-p-xylene, a,a,a',a'-tetrakis(3-t-butyl-5-methyl-4-hydroxyphenyl)-p-xylene, a,a,a',a'-tetrakis(3-chloro-5-bromo-4-hydroxyphenyl)-p-xylene, and a,a,a',a'-tetrakis(3-chloro-5-phenyl-4-hydroxyphenyl)-p-xylene.

Examples of the trihydric alcohol compound include tri(hydroxymethyl)methane(pentaerythritol), 1,1,1-tri(hydroxymethyl)ethane, 1,1,1-tri(hydroxymethyl)propane(trimethylolpropane), and glycerin.

Examples of the tetrahydric alcohol include pentaerythritol.

Specific examples of the compound (β) include tetrakis(carboxyphenyl)ethanes such as 1,1,2,2-tetrakis(4-carboxyphenyl)ethane, 1,1,2,2-tetrakis(3-methyl-4-carboxyphenyl)ethane, 1,1,2,2-tetrakis(3,5-dimethyl-4-carboxyphenyl)ethane, 1,1,2,2-tetrakis(3-chloro-4-carboxyphenyl)ethane, 1,1,2,2-tetrakis(3,5-dichloro-4-carboxyphenyl)ethane, 1,1,2,2-tetrakis(3-bromo-4-carboxyphenyl)ethane, 1,1,2,2-tetrakis(3,5-dibromo-4-carboxyphenyl)ethane, 1,1,2,2-tetrakis(3-t-butyl-4-carboxyphenyl)ethane, 1,1,2,2-tetrakis(3,5-di-t-butyl-4-carboxyphenyl)ethane, 1,1,2,2-tetrakis(3-fluoro-4-carboxyphenyl)ethane, 1,1,2,2-tetrakis(3,5-difluoro-4-carboxyphenyl)ethane, 1,1,2,2-tetrakis(3-methoxy-4-carboxyphenyl)ethane, 1,1,2,2-tetrakis(3,5-dimethoxy-4-carboxyphenyl)ethane, 1,1,2,2-tetrakis(3-phenyl-4-carboxyphenyl)ethane, 1,1,2,2-tetrakis(3,5-diphenyl-4-carboxyphenyl)ethane, 1,1,2,2-tetrakis(3-fluoro-5-methyl-4-carboxyphenyl)ethane, 1,1,2,2-tetrakis(3-chloro-5-methyl-4-carboxyphenyl)ethane, 1,1,2,2-tetrakis(3-bromo-5-methyl-4-carboxyphenyl)ethane, 1,1,2,2-tetrakis(3-methoxy-5-methyl-4-carboxyphenyl)ethane, 1,1,2,2-tetrakis(3-t-butyl-5-methyl-4-carboxyphenyl)ethane, 1,1,2,2-tetrakis(3-phenyl-5-methyl-4-carboxyphenyl)ethane, 1,1,2,2-tetrakis(3-chloro-5-bromo-4-carboxyphenyl)ethane, and 1,1,2,2-tetrakis(3-chloro-5-phenyl-4-carboxyphenyl)ethane.

Specific examples of the compound (γ) include tetrakis(aminophenyl)ethanes such as 1,1,2,2-tetrakis(4-aminophenyl)ethane, 1,1,2,2-tetrakis(3-methyl-4-aminophenyl)ethane, 1,1,2,2-tetrakis(3,5-dimethyl-4-aminophenyl)ethane, 1,1,2,2-tetrakis(3-chloro-4-aminophenyl)ethane, 1,1,2,2-tetrakis(3,5-dichloro-4-aminophenyl)ethane, 1,1,2,2-tetrakis(3-bromo-4-aminophenyl)ethane, 1,1,2,2-tetrakis(3,5-dibromo-4-aminophenyl)ethane, 1,1,2,2-tetrakis(3-t-butyl-4-aminophenyl)ethane, 1,1,2,2-tetrakis(3,5-di-t-butyl-4-aminophenyl)ethane, 1,1,2,2-tetrakis(3-fluoro-4-aminophenyl)ethane, 1,1,2,2-tetrakis(3,5-difluoro-4-aminophenyl)ethane, 1,1,2,2-tetrakis(3-methoxy-4-aminophenyl)ethane, 1,1,2,2-tetrakis(3,5-dimethoxy-4-aminophenyl)ethane, 1,1,2,2-tetrakis(3-phenyl-4-aminophenyl)ethane, 1,1,2,2-tetrakis(3,5-diphenyl-4-aminophenyl)ethane, 1,1,2,2-tetrakis(3-fluoro-5-methyl-4-aminophenyl)ethane, 1,1,2,2-tetrakis(3-chloro-5-methyl-4-aminophenyl)ethane, 1,1,2,2-tetrakis(3-bromo-5-methyl-4-aminophenyl)ethane, 1,1,2,2-tetrakis(3-methoxy-5-methyl-4-aminophenyl)ethane, 1,1,2,2-tetrakis(3-t-butyl-5-methyl-4-aminophenyl)ethane, 1,1,2,2-tetrakis(3-phenyl-5-methyl-4-aminophenyl)ethane, 1,1,2,2-tetrakis(3-chloro-5-bromo-4-aminophenyl)ethane, 1,1,2,2-tetrakis(3-chloro-5-phenyl-4-aminophenyl)ethane; and ammonia.

In the present invention, the followings are also possible to use, as a core moiety constituting compound, (i) a dendrimer type polymer (trade name: Boltorn (registered trademark of Perstorp Co.) H20, H2003, H2004, H30, H40, H311, P100, P1000, U3000, or W3000) obtained by repeating the reaction of a tri- or polyhydric alcohol compound with a hydroxycarboxylic acid having 2 or more hydroxyl groups (or a hydroxycarboxylic acid halide) such as 2,2-dimethylolpropionic acid (Bis-MPA), followed by the reaction of a hydroxyl group of the resulting reaction product with the same hydroxycarboxylic acid having 2 or more hydroxyl groups (or a hydroxycarboxylic acid halide) 1 to 200 times, (ii) a network structure polymer obtained by the reaction of ammonia with a (meth)acrylate ester (or a (meth)acrylic acid halide or (meth)acrylic acid) and the reaction with ethylenediamine, followed by repeating the reaction of the resulting reaction product with (meth)acrylate ester (or (meth)acrylic acid halide or (meth)acrylic acid) and the reaction with ethylenediamine 1 to 100 times, and (iii) a head-tail bond star shaped all conjugated polyphenylenevinylene or a head-tail bond star shaped all conjugated polyphenyleneethynylene compound, which is obtained by selective polycondensation after dehydrohalogenation of a halogenated phenyl derivative having a mobile hydrogen as a monomer using a transition metal catalyst.

The reactive compound is not specifically limited as long as it has a functional group (W) represented by the formula (VIII) or (IX) in the molecule, and also reacts with —($X^{a1}$—H) of the core moiety constituting compound to form a ($X^{a1}$—W) bond at the linking group $X^{a1}$ moiety of the compound.

Specific examples of the reactive compound include a-halogenoaliphatic carboxylic acid halides such as chloroacetylchloride, bromoacetylbromide, dichloroacetylchloride, 2-chloropropionylchloride, 2-bromopropionylbromide, 2-chloroisobutyrylchloride, 2-bromoisobutyrylbromide, 2-chlorobutyrylchloride, a-bromophenylacetic acidbromide, and 2-bromo-3-phenylpropionic acid bromide;

compounds wherein carbonyl group (C=O) of these a-halogenoaliphatic carboxylic acid halides is C=S, or C=$Nr^{711}$ ($r^{711}$ is as define above);

haloalkyl substituted aromatic carboxylic acid halides such as 4-chloromethylbenzyl acid chloride, 3-chloromethylbenzoic acid chloride, 4-chloromethylbenzoic acid bromide, 4-bromomethylbenzoic acid chloride, 4-bromomethylbenzoic acid bromide, 4-iodomethylbenzoic acid chloride, 4-iodomethylbenzoic acid bromide, 2-chloro-4-chloromethylbenzoic acid chloride, 2-chloro-4-chloromethylbenzoic acid bromide, 2-chloro-4-bromomethyl-benzoic acid chloride, 4-(1'-chloroethyl)benzoic acid chloride, 4-(1'-bromoethyl)benzoic acid chloride, 4-(1'-chloroisopropyl)benzoic acid chloride, 4-(1'-bromoisopropyl)benzoic acid chloride, and 4-chloromethyl-1-naphthalenecarboxylic acid chloride;

compounds wherein carbonyl group (C=O) of these haloalkyl substituted aromatic carboxylic acid halides is C=S, or C=$Nr^{711}$ ($r^{711}$ is as define above);

haloalkylsulfonyl halides such as chloromethylsulfonyl chloride, bromomethylsulfonyl chloride, dichloromethylsulfonyl chloride, 1-chloroethylsulfonyl chloride, 1-bromoethylsulfonyl chloride, 1-chloroisopropylsulfonyl chloride, and 1-bromoisopropylsulfonyl chloride;

bishaloalkylsulfones such as bis(chloromethyl)sulfone, (1-chloroethyl)(chloromethyl)sulfone, and (1-chloroisopropyl)(chloromethyl)sulfone; haloalkyl substituted arylsulfonyl halides such as 4-chloromethylphenylsulfonyl chloride, 3-chloromethylphenylsulfonyl chloride, 4-chloromethylphenylsulfonyl bromide, 4-bromomethylphenylsulfonyl chloride, 4-iodomethylphenylsulfonyl chloride, 2-chloro-4-chloromethylphenylsulfonyl chloride, 2-chloro-4-bromomethylphenylsulfonyl chloride, 4-(1'-chloroethyl)phenylsulfonyl chloride, 4-(1'-bromoethyl)phenylsulfonyl chloride, 4-(1'-chloroisopropyl)phenylsulfonyl chloride, 4-(1'-bromoisopropyl)phenylsulfonyl chloride, and 4-chloromethyl-1-naphthalenesulfonyl chloride;

haloalkylhaloaralkylsulfones such as 4-chloromethylsulfonylbenzyl chloride, 4-chloromethylsulfonylbenzyl bromide, 4-bromomethylsulfonylbenzyl chloride, 4-iodomethylsulfonylbenzyl chloride, and 4-chloromethylsulfonyl-a-methylbenzyl chloride; and ketones such as 1,3-dichloroacetone and 1,3-dibromoacetone In the present invention paraxylylene dichloride and paraxylylene dibromide, or the like can also be used as a reactive compound.

Among these, a-halogenoaliphatic carboxylic acid halides or haloalkyl substituted aromatic carboxylic acid halides are preferable, and a-halogenoaliphatic carboxylic acid halides are more preferable, because availability and handling properties are excellent and the multibranched polymer of the present invention can be produced with a good yield.

The reaction of the core moiety constituting compound with the reactive compound can be conducted by a known method. Namely, according to the kind of the core moiety constituting compound and the reactive compound, suitable reaction conditions can be selected.

More specifically, when 1,1,2,2-tetrakis(4-hydroxyphenyl)ethane (TEP) is used as the core moiety constituting compound and 2-bromoisobutyryl bromide is used as the reactive compound, 1,1,2,2-tetrakis[4-(2-bromoisobutyryloxyphenyl)]ethane can be obtained by reacting 1,1,2,2-tetrakis(4-hydroxyphenyl)ethane (TEP) with 2-bromoisobutyrylbromide in a solvent in the presence of a base such as triethylamine. Similarly, tetrakis(2-bromoisobutyryloxymethyl)methane can be obtained by reacting pentaerythritol with 2-bromoisobutyrylbromide in a solvent in the presence of a base such as triethylamine.

The multibranched polymer of the present invention can be produced by polymerizing a compound represented by the formula (VII) with a compound having a polymerizable unsaturated bond.

Examples of the polymerization method include a radical polymerization method comprising the steps of charging a monomer solution containing a compound represented by the formula (VII), a compound having a polymerizable unsaturated bond and, if necessary, the other copolymerizable monomer and a reaction solvent in a reaction vessel at a time or during the reaction, and polymerizing the monomer solution with heating optionally under an atmosphere of an inert gas such as nitrogen or argon using a commercially available radical initiator (azo-based initiator, peroxide, etc.), an anion polymerization method comprising the steps of charging a monomer solution containing a compound represented by the formula (VII), a compound having a polymerizable unsaturated bond and, if necessary, the other copolymerizable monomer and a reaction solvent in a reaction vessel at a time or during the reaction, and polymerizing the monomer solution with stirring under an atmosphere of an inert gas such as nitrogen or argon using an anion polymerization initiator added dropwise, and a living radical polymerization method; and the living radical polymerization method is preferable because a narrowly dispersed multibranched polymer having a controlled molecular weight is efficiently obtained.

Examples of the method of polymerizing a compound represented by the formula (VII) with the compound having a polymerizable unsaturated bond under living radical polymerization conditions include (A) a living radical polymerization method wherein the polymerization reaction is conducted using a compound represented by the formula (VII) having plural halogen atoms $G^1$ and $G^2$ in the molecule as a polymerization initiator and using a transition metal complex as a catalyst, and (B) a living radical polymerization method using a stable radical-based initiator. Among these methods, the living radical polymerization method (A) is preferable because the objective multibranched polymer can be efficiently obtained.

Central metals constituting the transition metal complex used in the living radical polymerization method (A) are preferably elements of Groups 7 to 11 in the Periodic Table (according to the Periodic Table described in "Fourth Revision of Manual of Basic Chemistry (Kagaku-Binran Kiso-Hen) I" (1993) edited by The Chemical Society of Japan) such as manganese, rhenium, iron, ruthenium, rhodium, nickel, and copper. Among these metals, ruthenium is preferable.

The ligand which is coordinated to these metals to form a complex is not specifically limited, and examples thereof include phosphorous-based ligand, halogen atom, carbon monoxide, hydrogen atom, hydrocarbon-based ligand, oxygen-containing-based ligand, other chalcogenides, nitrogen-containing ligand. The transition metal complex may have 2 or more kinds of these ligands.

Specific examples of preferable transition metal complex include dichlorotris(triphenylphosphine)ruthenium, chloroindenylbis(triphenylphosphine)ruthenium, dihydrotetrakis(triphenylphosphine)ruthenium, chlorocyclopentadienylbis(triphenylphosphine)ruthenium, chloropentamethylcyclopentadienylbis(triphenylphosphine)ruthenium; dicarbonylcyclopentadienyl ruthenium (II) iodide, dicarbonylcyclopentadienyl iron (II) iodide, carbonylcyclopentadienyl nickel (II) iodide; and tellurium complexes such as (1-ethoxycarbonyl-1-methylethyl)methyltellurium, (1-cyano-1-methylethyl)methyltellurium, a-methylbenzylmethyltellurium, benzylmethyltellurium, and methylbenzoyltellurium. These transition metal complexes can be used alone or in combination.

In the living radical polymerization, it is also possible to use in combination with an activating agent capable of accelerating radical polymerization by reacting with the transition metal complex. As the activating agent, Lewis acid and/or amines can be used.

The kind of Lewis acid is not specifically limited and, for example, aluminum-based Lewis acid, scandium-based Lewis acid, titanium-based Lewis acid, zirconium-based Lewis acid, and tin-based Lewis acid can be used. The amines are not specifically limited provided that they are nitrogen-containing compounds such as secondary amine, tertiary amine, and nitrogen-containing aromatic heterocyclic compound, and are preferably secondary amine and tertiary amine.

These Lewis acids and amines can be used alone or in combination. The amount of the Lewis acid and/or amines is usually from 0.1 to 20 mol, and preferably from 0.2 to 10 mol, based on 1 mol of the transition metal complex.

In the method for producing a multibranched polymer using a living radical polymerization method (A), a compound represented by the formula (VII) serves as a polymerization initiator. Namely, when the bonding site of an active halogen atom in a functional group represented by W of a compound represented by the formula (VII) becomes radical species by the action of the transition metal complex, a polymerization active center is formed and a compound having a living radical polymerizable unsaturated bond is polymerized at the polymerization active center.

Examples of the method for forming an arm moiety by the living radical polymerization method include:

(1) a method comprising the step of forming an arm moiety made of a homopolymer using a compound having one kind of a living radical polymerizable unsaturated bond, (2) a compound comprising the step of simultaneously adding a compound having plural living radical polymerizable unsaturated bonds to the reaction system to form an arm moiety made of a random copolymer, (3) a compound comprising the step of sequentially adding a compound having plural living radical polymerizable unsaturated bonds to the reaction system to form an arm moiety made of a block copolymer, and (4) a method comprising the step of changing a composition ratio of a compound having plural living radical polymerizable unsaturated bonds with time to form an arm moiety made of gradient copolymer gradient copolymer.

Among these methods, the method (3) of forming an arm moiety made of a block copolymer bonded with a block unit is preferable because a more narrowly dispersed multi-branched polymer can be obtained. According to this method, even when a compound having a functional group in the molecule is polymerized, it is not necessary to protect a functional group, like the living anionic polymerization method, and it is advantageous.

The polymerization method is not specifically limited and, for example, a bulk polymerization method, a solution polymerization method, a suspension polymerization method, or an emulsion polymerization method can be employed, but a solution polymerization method is preferable.

When the solution polymerization method is employed, the objective multibranched polymer can be obtained by mixing a compound represented by the formula (VII), a compound having a polymerizable unsaturated bond, a transition metal complex and, if necessary, Lewis acid and/or amines in an organic solvent and stirring with heating.

The organic solvent to be used is not specifically limited and examples thereof include aromatic hydrocarbons such as benzene, toluene, and xylene; aliphatic hydrocarbons such as hexane, heptane, and octane; alicyclic hydrocarbons such as cyclopentane, cyclohexane, and cyclooctane; ketones such as acetone, methyl ethyl ketone, and cyclohexanone; ethers such as tetrahydrofuran and dioxane; esters such as ethyl acetate and butyl acetate; amides such as N,N-dimethyl formamide and N,N-dimethyl acetamide; sulfoxides such as dimethyl sulfoxide; alcohols such as methanol and ethanol; and polyhydric alcohol derivatives such as ethylene glycol monomethyl ether and ethylene glycol monomethyl ether acetate.

These solvents can be used alone or in combination.

When the block polymerization is intermittently conducted, a different solvent may be used every polymerization reaction.

Examples of the stable radical-based initiator used in the living radical polymerization method (B) include a mixture of a stable free radical compound and a radical polymerization initiator, or various alkoxyamines.

Examples of the stable radical-based initiator include a mixture of a stable free radical compound and a radical polymerization initiator, or various alkoxyamines.

The stable free radical compound is a compound which is present as a singly stable free radical under room temperature or polymerization conditions, and can also react with a propagating terminal radical during the polymerization reaction to form a dormant bond. Examples thereof include compounds capable of forming one or more nitroxide and hydrazinyl radicals, such as 2,2,6,6-tetramethyl-1-piperidinyloxy (TEMPO), 4-amino-2,2,6,6-tetramethyl-1-piperidinyloxy, 4-hydroxy-2,2,6,6-tetramethyl-1-piperidinyloxy, 4-oxo-2,2,6,6-tetramethyl-1-piperidinyloxy, 4,4'-dimethyl-1,3-oxazolin-3-yloxy, 2,2,5,5-tetramethyl-1-pyrodinyloxy, di-t-butylnitroxide, and, 2-di(4-t-octylphenyl)-1-picrylhydrazyl.

The radical polymerization initiator is not specifically limited as long as it is a compound which is decomposed to form a free radical, and examples thereof include organic peroxides such as azo compounds, ketone peroxides, peroxyketals, hydroperoxides, dialkylperoxides, and peroxyesters. Also, a known polymerization accelerator, which is used in combination with an organic peroxide such as dimethylaniline or cobalt naphthate, may be used in combination.

These radical polymerization initiators are usually used in the amount within a range from 0.05 to 5 mol, and preferably from 0.2 to 2 mol, based on 1 mol of the stable free radical compound.

Alkoxyamines include, for example, compounds described in the documents such as Radical Polymerization Handbook, pp 107 (1999) NTS Co., and J. Am. Chem. Soc., 121, 3904 (1999), and are preferably the following compounds.

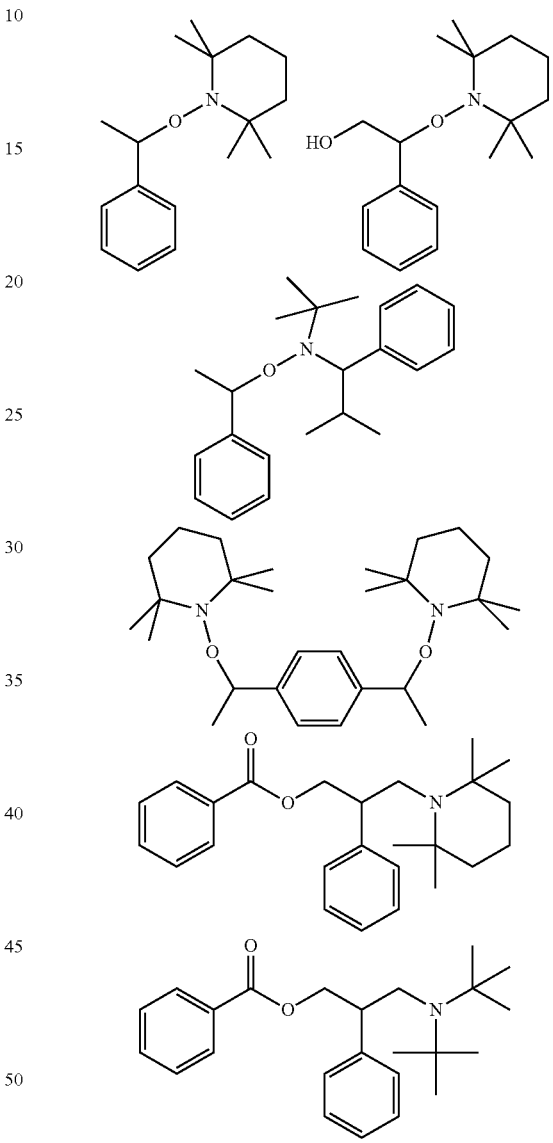

In any polymerization methods (A) and (B), the polymerization temperature is usually from room temperature to 200° C., and preferably from 40 to 150° C.

The polymerization time varied depending on the reaction scale, but is usually from 0.5 to 100 hours. The polymerization is usually conducted under vacuum or an atmosphere of an inert gas such as nitrogen or argon, at normal pressure or under pressure.

The polymerization reaction can be terminated by decreasing the temperature of the reaction system.

After the completion of the reaction, the objective multibranched polymer can be isolated by a conventional separation and purification method such as column purification, purification under reduced pressure, or filtration.

Monitoring of the polymerization reaction process and confirmation of the completion of the reaction can be conducted by gas chromatograph, liquid chromatography, gel permeation chromatography, membrane osmotic pressure method, and NMR.

The multibranched polymer obtained by the production method of the present invention is a narrowly dispersed multibranched polymer having a controlled molecular weight.

3) Polymer Solid Electrolyte

The polymer solid electrolyte of the present invention is characterized by comprising a multibranched polymer comprising a core moiety having 3 or more branched chains and an arm moiety having a repeating unit (a) represented by the formula (a1), and an electrolyte salt.

Among multibranched polymers of the present invention, those wherein the arm moiety have a repeating unit represented by the formula (a1) is useful as a raw material for producing a polymer solid electrolyte. Namely, the multibranched polymer of the present invention and the electrolyte salt are mixed to prepare a resin composition for polymer solid electrolyte, and a polymer solid electrolyte can be formed from the resin composition.

In the formula (XI), C represents a carbon atom, $X^{25}$ and $X^{26}$ each independently represents a linking group containing any atom of Groups 14 to 16 in the Periodic Table, $W^4$ represents the formula (VIII);

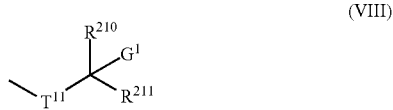
(VIII)

(wherein $T^{11}$ represents a divalent electron attractive group, $R^{210}$ represents a hydrogen atom, a halogen atom, a C1-C6 alkyl group, a C7-C12 aralkyl group, an aryl group, an ester group, or an acyl group, $R^{211}$ represents a hydrogen atom, a C1-C6 alkyl group, a C7-C12 aralkyl group, an aryl group, an ester group, or an acyl group, and $G^1$ represents a halogen atom), and Q represents an arm moiety having a repeating unit (a) represented by the formula (a1).

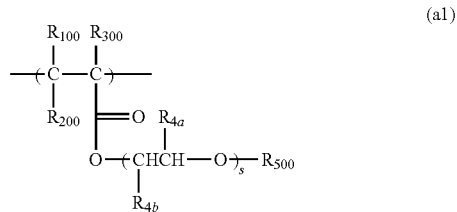
(a1)

In the formula (a1), $R_{100}$ to $R_{300}$, $R_{4a}$, $R_{4b}$ and $R_{500}$ are as define above, and the polymerization degree of a repeating unit represented by the formula (a1) varies depending on the value of s, and is preferably 10 or more, and more preferably 20 or more.

Q may contain, in addition to the repeating unit (a), the other repeating unit derived from a polymerizable unsaturated bond.

Examples of the other repeating unit include at least one selected form the group consisting of (meth)acrylic acid, a (meth)acrylic acid derivative (excluding a compound from which the repeating unit (a) is obtained), styrene, a styrene derivative, a vinyl group-containing heteroaryl compound, and the other polymerizable monomer.

Examples of the (meth)acrylic acid derivative include a acrylate ester compound such as methyl acrylate, ethyl acrylate, n-propyl acrylate, isopropyl acrylate, n-butyl acrylate, t-butyl acrylate, n-hexyl acrylate, cyclopentyl acrylate, cyclohexyl acrylate, phenyl acrylate, or 2-pyridyl acrylate; a methacrylate ester compound such as methyl methacrylate, ethyl methacrylate, n-propyl methacrylate, isopropyl methacrylate, n-butyl methacrylate, t-butyl methacrylate, n-hexyl methacrylate, cyclopentyl methacrylate, cyclohexyl methacrylate, phenyl methacrylate, or 2-pyridyl methacrylate; 2-methoxyethyl (meth)acrylate, 2-ethoxyethyl (meth)acrylate, 2-methoxypropyl (meth)acrylate, 2-ethoxypropyl (meth)acrylate, methoxypolyethylene glycol (the number of units of ethylene glycol is from 2 to 100) (meth)acrylate, ethoxypolyethylene glycol (meth)acrylate, phenoxypolyethylene glycol (meth)acrylate, methoxypolypropylene glycol (the number of units of propylene glycol is from 2 to 100) (meth)acrylate, ethoxypolypropylene glycol (meth)acrylate, phenoxypolypropylene glycol (meth)acrylate, polyethylene glycol mono(meth)acrylate, 2-hydroxypropyl (meth)acrylate, polypropylene glycol mono(meth)acrylate, polyethylene glycol-polypropylene glycol mono(meth)acrylate, octoxypolyethylene glycol-polypropylene glycol mono (meth)acrylate, lauroxypolyethylene glycol mono(meth) acrylate, stearoxypolyethylene glycol mono(meth)acrylate, acetyloxypolyethylene glycol (meth)acrylate, benzoyloxypolyethylene glycol (meth)acrylate, trimethylsilyloxypolyethylene glycol (meth)acrylate, t-butyldimethylsilyloxypolyethylene glycol (meth)acrylate, methoxypolyethylene glycol cyclohexene-1-carboxylate, and methoxypolyethylene glycol cinnamate.

Examples of the (meth)acrylic acid and (meth)acrylic acid derivative, styrene derivative and other polymerizable monomer include the same compounds described above. The multibranched polymer of the present invention can contain, as a constituent unit, a repeating unit which has a double bond capable of copolymerizing with a monomer constituting a repeating unit derived from a polymerizable unsaturated bond constituting an arm moiety, and also has at least one functional group selected from the group consisting of hydroxyl group, carboxyl group, epoxy group, acid anhydride group, and amino group in the molecule. Examples of the repeating unit include the same one as described above.

As described above, these monomers can be used alone or in combination.

The multibranched polymer used in the polymer solid electrolyte of the present invention is preferably a multibranched polymer wherein Q has a repeating unit (a) and a repeating unit (b) derived from styrene or a styrene derivative, and a molar ratio of the repeating unit (a) to the repeating unit (b) is within a range from 95/5 to 70/30.

The multibranched polymer used in the polymer solid electrolyte of the present invention is preferably represented by the formula (II) or (III).

In the formula (II), Z represents $(CH_2)_q$ or a p-phenylene group.

q reprints any integer of 0 to 3 and is preferably 0 or 1, and particularly preferably 0.

$R^{10}$, $R^{11}$, $R^{12}$ and $R^{13}$ each independently represents a hydrogen atom, a C1 to C6 alkyl group, an aryl group which may have a substituent, a halogen atom, or a C1 to C6 alkoxyl group. Specific examples of them include the same one as described above.

$n^3$, $n^4$, $n^5$ and $n^6$ each independently represents nay integer of 0 to 3.

$X^0$, $X^1$, $X^2$ and $X^3$ each independently represents the same linking group containing an atom of Groups 14 to 16 in the Periodic Table as that of $X^a$ and $X^b$.

Examples of $p^0$ to $p^3$, $Y^0$ to $Y^3$, and $Q^0$ to $Q^3$ include the same one as that described above.

In the formula (III), C represents a carbon atom, $X^4$ and $X^5$ each independently represents the same linking group containing an atom of Groups 14 to 16 in the Periodic Table as that of $X^a$ and $X^b$.

$Y^4$ represents a functional group capable of having an active halogen atom. Specific examples of $Y^4$ include the same one listed as specific examples of Y.

$R^{14}$ represents a hydrogen atom, a C1 to C6 alkyl group, an aryl group which may have a substituent, a halogen atom, or a C1 to C6 alkoxyl group. Specific examples thereof include the same one listed as specific examples of R.

$Q^4$ represents the same repeating unit derived from a polymerizable unsaturated bond as that derived from a polymerizable unsaturated bond of Q.

$n^7$, $n^8$ each independently represents an integer of 0 or 1 or more, and when $n^7$ and $n^8$ each represents 2 or more, $X^4$(s) and $X^5$(s) may be the same or different.

$m^3$ is 3 or 4, and groups represented by the formula: $—(X^4)_{n7}—Y^4-Q^4$ may be the same or different.

The core moiety of the multibranched polymer of the present invention is preferably the formula (XXII) or (XXIII), and is particularly preferably a core moiety having a structure obtained by bonding a group represented by the formula: $—C(CH_3)_2—C(=O)—*$ (bonded with an oxygen atom at the position represented by the symbol *) at the terminal oxygen atom of a dendrimer type polymer compound (1,1,2,2-tetrakis(4-hydroxyphenyl)ethane (TEP) or a dendrimer type polymer compound (trade name: Boltorn H30, manufactured by Perstorp Co.).

The number average molecular weight (Mn) of the polymer chain constituting the arm moiety of the multibranched polymer used in the present invention is not specifically limited, but is preferably within a range from 5,000 to 1,000,000 in terms of a polystyrene equivalent weight average molecular weight determined by gel permeation chromatography.

The number average molecular weight (Mn) of the multibranched polymer of the present invention is within a range from 10,000 to 2,000,000, and preferably from 50,000 to 1,000,000, and the multibranched polymer of the present invention is a polymer having a controlled molecular weight.

The multibranched polymer used in the present invention is a narrowly dispersed polymer and the molecular weight distribution (Mw/Mn) is usually from 0.5 to 2.5, and preferably from 1.0 to 2.3.

The multibranched polymer used in the present invention can be produced by polymerizing with a compound represented by the formula (a11):

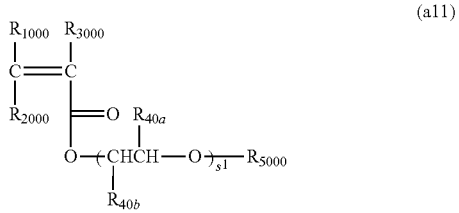

(a11)

under living radical polymerization conditions using the end of the multibranched chain of the core moiety having 3 or more multibranched chains as a polymerization initiation point. More specifically, it can be produced by polymerizing a compound represented by the formula (VI) with a compound represented by the formula (a11) under living radical polymerization conditions. The multibranched polymer can be produced in the same manner as in case of the above method.

In a compound represented by the formula (a11), $R_{1000}$, $R_{2000}$ and $R_{3000}$ each independently represents a hydrogen atom or a C1 to 10 hydrocarbon group, $R_{1000}$ and $R_{3000}$ may be combined to form a ring. Specific examples of the C1 to 10 hydrocarbon group of $R_{1000}$, $R_{2000}$ and $R_{3000}$ include the same one listed as specific examples of the C1 to 10 hydrocarbon group of $R_{100}$, $R_{200}$ and $R_{300}$.

$R_{40a}$, $R_{40b}$ each independently represents a hydrogen atom or a methyl group.

$R_{5000}$ represents a hydrogen atom, a hydrocarbon group, an acyl group, or a silyl group, and specific examples of the hydrocarbon group, acyl group or silyl group of $R_{5000}$ include the same one listed as specific examples of the hydrocarbon group, acyl group or silyl group of $R_{500}$.

$s^1$ represents any integer of 2 to 100, and groups represented by the formula: $—CH(R_{40b})—CH(R_{40a})—O—$ may be the same or different.

Specific examples of the compound represented by the formula (a11) include monomers (manufactured by NOF CORPORATION) wherein $R_{1000}=R_{2000}=R_{40b}=$hydrogen atom, $R_{40a}=$methyl group, and $s^1=2$ to 90 in BLEMMER PME Series Examples of the method of polymerizing a compound represented by the formula (X), a compound represented by the formula (a11), and, if necessary, the other compound having a polymerizable unsaturated bond under living radical polymerization conditions include the above method.

Examples thereof include:

(A) a living radical polymerization method wherein the polymerization reaction is conducted using a compound represented by the formula (X) having plural halogen atoms $G^1$ and $G^2$ in the molecule as a polymerization initiator and using a transition metal complex as a catalyst, and (B) a living radical polymerization method using a stable radical-based initiator. Among these methods, the living radical polymerization method (A) is preferable because the objective multibranched polymer can be efficiently obtained.

The multibranched polymer thus obtained is a narrowly dispersed multibranched star polymer having a controlled molecular weight, and preferably has a microphase separated structure. It can be used as a raw material for producing a polymer solid electrolyte, particularly preferably. Such a polymer solid electrolyte has high ionic conductivity.

The electrolyte salt to be used in not specifically limited and an electrolyte containing ions, which are to be used as a carrier by charge, and a dissociation constant in the polymer solid electrolyte obtained by curing is preferably large. At least one selected from the group consisting of an alkali metal salt, a quaternary ammonium salt such as $(CH_3)_4NBF_6$, a quaternary phosphonium salt such as $(CH_3)_4PBF_6$, a transition metal salt such as $AgClO_4$, or a proton acid such as hydrochloric acid, perchloric acid, or fluoroboric acid is preferable, and the use of an alkali metal salt, a quaternary ammonium salt, a quaternary phosphonium salt or a transition metal salt is preferable and the use of an alkali metal salt is more preferable.

Specific examples of the alkali metal salt include $LiCF_3SO_3$, $LiN(CF_3SO_2)_2$, $LiC(CF_3SO_2)_3$, $LiC(CH_3)(CF_3SO_2)_2$, $LiCH(CF_3SO_2)_2$, $LiCH_2(CF_3SO_2)$, $LiC_2F_5SO_3$, $LiN(C_2F_5SO_2)_2$, $LiN(CF_3SO_2)$, $LiB(CF_3SO_2)_2$, $LiPF_6$, $LiSbF_6$, $LiClO_4$, LiI, $LiBF_4$, LiSCN, $LiAsF_6$, $NaCF_3SO_3$, $NaPF_6$, $NaClO_4$, NaI, $NaBF_4$, $NaAsF_6$, $KCF_3SO_3$, $KPF_6$, KI, $LiCF_3CO_3$, $NaClO_3$, NaSCN, $KBF_4$, $KPF_6$, $Mg(ClO_4)_2$, $Mg(BF_4)_2$, and these electrolyte salts can be used alone or in combination. Among these electrolyte salts, a lithium salt is particularly preferable.

The amount of the electrolyte salt is preferably within a range from 0.005 to 80 mol %, and more preferably from 0.01 to 50 mol %, based on an alkylene oxide unit in the repeating unit having the ionic conductive site of a multibranched polymer.

The method of mixing the multibranched polymer of the present invention with the electrolyte salt is not specifically limited and examples thereof include a method of dissolving a multibranched polymer and an electrolyte salt in a suitable solvent such as tetrahydrofuran, methyl ethyl ketone, acetonitrile, ethanol, or dimethyl formamide, and a method of mechanically mixing a multibranched polymer with an electrolyte salt at normal temperature or with heating.

The solvent used is preferably a polar solvent.

The polar solvent is not specifically limited as long as it is a solvent having polarity, and specific examples thereof include acetonitrile, tetrahydrofuran, acetone, dimethyl formamide, dimethylsulfoxide, chloroform, N-methylpyrrolidone, and methanol.

The solid content of the resulting solution is not specifically limited, and is preferably within a range from 0.5 to 30% by weight. When the solid content is less than 0.5% by weight, a molded article cannot be obtained in a few steps because of too low solid content. On the other hand, when the solid content is more than 30% by weight, it becomes impossible to control the thickness of the membrane.

After casting or coating, the solvent is removed by a method such as distillation under normal pressure or reduced pressure, or drying with heating, and it is preferable to include the step of subjecting to a heat treatment in the state of containing the solvent. As the pre-treatment or post-treatment step other than the step, a step such as distillation under reduced pressure or drying with heating may be further included.

As used herein, the state of containing the solvent is a state before the solvent is completely removed, and the solvent is preferably remained in the amount within a range from 10 to 50% by weight, and more preferably from 15 to 30% by weight, based on the solid content in the solution cast or coated. The heating temperature is not specifically limited, but is preferably about a glass transition temperature or higher.

The polymer solid electrolyte preferably has a shape of a sheet, membrane or film. In the case of producing a solid electrolyte sheet, a composition for polymer solid electrolyte is preferably formed into a shape such as sheet, membrane or film and then crosslinked to obtain a sheet-shaped crosslinked polymer (polymer solid electrolyte sheet). In this case, it becomes easy and free to process, and it is advantageous for practical application.

The sheet-shaped polymer solid electrolyte can be produced by forming a coating film of a composition for polymer solid electrolyte on a carrier and curing the coating film with heating.

The material, size and shape of the carrier are not specifically limited as long as the carrier can support the polymer solid electrolyte sheet. The carrier is preferably made of polytetrafluoroethylene and is excellent in chemical resistance, heat resistance and peelability.

The method of coating a solution of a composition for polymer solid electrolyte on the carrier is not specifically limited and a known coating method can be employed. Examples thereof include various methods such as method of coating a solution of a polymer solid electrolyte on a carrier, roll coater method, screen coating method, doctor blade method, bar coating method, curtain coater method, spin coating method, dipping method, and cast method.

The resulting sheet-shaped polymer solid electrolyte can be preferably used as a solid electrolyte layer of a solid electrolyte battery comprising a positive electrode, a negative electrode, and a solid electrolyte layer. Namely, a polymer solid electrolyte battery can be obtained by interposing a polymer solid electrolyte sheet between a positive electrode and a negative electrode.

Also, the polymer solid electrolyte of the present invention has excellent mechanical strength enough to form a freestanding film, and also has excellent ionic conductivity over a wide temperature range of 30 to 60° C. Ionic conductivity at 30 to 60° C. of the polymer solid electrolyte of the present invention is usually from $1.0 \times 10^{-4}$ (S/cm) to $1.0 \times 10^{-6}$ (S/cm).

The polymer solid electrolyte battery of the present invention is characterized by comprising the polymer solid electrolyte of the present invention.

The polymer solid electrolyte battery thus obtained can be produced by a method comprising the steps of preliminary using a polymer solid electrolyte as a molded article and interposing between electrodes; or a method comprising the steps of coating the above described composition containing a multibranched polymer and an electrolyte salt on an electrode using various coating methods such as roll coater method, curtain coater method, spin coating method, dipping method, and cast method to form a film of the polymer solid electrolyte on a substrate, and disposing another electrode.

The polymer solid electrolyte battery of the present invention comprises the polymer solid electrolyte of the present invention having thermal characteristics, physical characteristics and ionic conductivity in a practical level.

The polymer solid electrolyte battery of the present invention is a 5 V class battery, which has a endurance voltage of 4.2 V or more, and preferably 4.5 V or more, and merely not only has 5 V resistance at room temperature or high temperature but also high conductivity, and is also suited for practical use because excellent characteristics are maintained in a charge/discharge test. Specifically, the battery has electric conductivity of $10^{-5}$ S/cm or more (23° C.), and preferably $10^{-4}$ S/cm or more (23° C.). The endurance voltage can be measured by an electrochemical stability of +5 V.

The polymer solid electrolyte battery of the present invention is a polymer solid electrolyte battery having high energy density composed of a polymer solid electrolyte which has a weight energy density of 150 Wh/kg or more, preferably 170 Wh/kg or more, or a volume capacity energy density of 350 Wh/kg or more, and preferably 370 Wh/kg or more.

The resulting polymer solid electrolyte battery can be used as a power supply for equipments such as note PC, cellular phone, cordless phone, electronic note, desk-top calculator, liquid crystal television, electric shaver, electric power tool, electronic interpreter, voice inputter, memory card, backup power supply, radio, head-set stereo, and navigation system; and a power supply resource for refrigerator, air conditioner, television, water heater, microwave oven, dishwasher, clothes washer, game equipments, lighting equipments, toy, medical equipments, automobile, electromotive cart, and electric power storage system.

4) Adhesive and Binder

The adhesive and binder of the present invention are characterized by comprising a multibranched polymer comprising a core moiety having 3 or more branched chains, and an arm moiety having a repeating unit (a) represented by the formula (a1).

Specifically, the present invention relates to an adhesive and a binder for production of an electrode which are a multi-branched polymer represented by the formula (XI) and is characterized by having conductivity, and binding ability to an active material.

The present invention compensates various drawbacks of the adhesive and binder described hereinafter and provides an adhesive for battery which has higher adhesive strength and is more suited for practical use, and a binder which has higher binding capacity and also has excellent characteristics suited for use as a binder.

Examples of the formulas (a1) and (XI) include the same one as derived above.

Various adhesives have hitherto been developed according to various purposes and, for example, there is proposed, as an adhesive for battery, "an adhesive for lithium secondary battery, comprising a solvent, a non-conductive powder dispersed in the solvent, a dispersing agent dispersed in the solvent, and an adhesive resin which has adhesion ability and is dissolved in the solvent". A lithium ion battery comprises, as main constituent elements, a positive electrode, a negative electrode, and a separator interposed between these positive and negative electrodes, the positive electrode, the negative electrode, and the separator being impregnated with an electrolytic solution. In a lithium ion battery which is now put into practical use, the positive electrode is obtained by coating a positive electrode active material composed of a powder of lithium cobalt oxide on a positive electrode collector and forming into a plate, and the negative electrode is obtained by coating a negative electrode active material composed of a carbon-based powder on a negative electrode collector and forming into a plate. As the electrolytic solution, a non-aqueous solvent such as propylene carbonate and a supporting electrolyte is usually added. As the separator, a porous membrane made of polyethylene or polypropylene is used.

However, the separator often causes shrinkage by heat. Therefore, under a high temperature environment where abnormal temperature rise is caused by overcharge of a battery or internal short circuit, thermal shrinkage of the separator occurs and, in some case, the separator is melted and broken and thus it does not fulfill a function as the separator between electrodes, which leads to proceeding of the decomposition reaction of the electrolytic solution and positive electrode, resulting in ignition from the battery or bursting of the battery. In order to prevent such a risk, the separator and the electrode are bonded with an adhesive.

As the adhesive, polyvinylidene fluoride (PVDF) is usually used. However, the adhesive don't enough adhesive strength.

The positive electrode of the lithium ion battery is obtained by adding a conductive material of a metal powder or carbon and a binder to lithium cobaltate as an active material and kneading/preparating them in the presence of N-methyl-2-pyrrolidone to obtain a paste, coating the paste using a doctor blade, drying the paste, alternately binding lithium cobaltate and a conductive material using a binder, and binding to a metal collector. On the other hand, the negative electrode is obtained by adding a binder to a carbon material as an active material and kneading/preparating them in the presence of water or the like to obtain a paste, coating the paste using a doctor blade, and drying the paste, thereby binding the carbon material to a metal collector using a binder. As the electrolytic solution of the lithium ion battery, a non-aqueous solvent such as propylene carbonate is used and a supporting electrolyte is usually added.

Therefore, the binder of the battery requires the followings: (1) it shall be a polymer which enables high adhesion between a collector and an active material, and adhesion between conductive materials, and between materials, (2) it shall be a stable substance under a severe environment where a voltage is applied in a battery, and (3) it shall be excellent in corrosion resistance to an electrolytic solution.

As the binder for secondary battery, for example, a fluorine-containing polymer such as polytetrafluoroethylene (PTFE) and a water insoluble polymer such as styrene-ethylene-butene-styrene (SEBS) is used and, if necessary, a mixture with a water soluble polymer such as polyvinyl alcohol, water soluble cellulose derivative, polyethylene oxide, or polyvinyl pyrrolidone is used.

However, when using only each binder described above, binding/capacity of the active material to the collector was still insufficient. Therefore, there were a problem that the active material gradually falls off from the collector by swelling shrinkage of the electrode with the proceeding of charge/discharge cycles and thus performances of the battery deteriorate, that is, a problem that sufficient cycle characteristics are not obtained.

The adhesive and binder of the present invention provide an agent capable of solving these various problems and are useful as a material for battery.

5) Resist Material

Among multibranched polymers of the present invention, those wherein the arm moiety has a repeating unit represented by the formula (b1) are useful as a resist material.

When the multibranched polymer of the present invention is used as a resist material, a molar ratio of each repeating structural unit is appropriately set so as to adjust dry etching resistance, suitability for standard developing solution, substrate adhesion, and resist profile of a resist, and generally required performances of the resist, such as resolution, heat resistance, and sensitivity.

When the multibranched polymer of the present invention is used as a resist material, the multibranched polymer of the present invention is dissolved in a suitable organic solvent, together with a photo acid generator (chemically amplified photo acid generator, non-chemically amplified photo acid generator, etc.) and, if necessary, an acid-labile dissolution inhibiting compound, a dye, a plasticizer, a surfactant, a photosensitizer, an organic basic compound, and a compound capable of accelerating solubility in a developing solution to obtain a resist composition.

The photo acid generator is not specifically limited as long as it is a compound which generates an acid upon irradiation with active ray or radiation. For example, it is possible to use a photoinitiator of photocation polymerization, a photoinitiator of photoradical polymerization, a photobleaching agent of a pigment, photochromic agent, a compound which generates an acid upon irradiation with known light (ultraviolet ray of 400 to 200 nm, far ultraviolet ray, particularly preferably g-line, h-line, i-line, KrF excimer laser, etc.) used in a microresist, ArF excimer laser, electron beam, X-ray, molecular ray or ion beam, and a mixture thereof.

The added amount of the photo acid generator is usually within a range from 0.001 to 30% by weight, preferably from 0.3 to 20% by weight, and more preferably from 0.5 to 10% by weight, based on the solid content in the composition.

Examples of the organic solvent used in the preparation of the resist composition include ethylene dichloride, cyclohexanone, cyclopentanone, 2-heptanone, γ-butyrolactone, methyl ethyl ketone, ethylene glycol monomethyl ether, ethylene glycol monoethyl ether, 2-methoxyethyl acetate, ethylene glycol monoethyl ether acetate, propylene glycol monomethyl ether, propylene glycol monomethyl ether acetate, toluene, ethyl acetate, methyl lactate, ethyl lactate, methyl methoxypropionate, ethyl ethoxypropionate, methyl pyruvate, ethyl pyruvate, propyl pyruvate, N,N-dimethyl formamide, dimethyl sulfoxide, N-methylpyrrolidone, and tetrahydrofuran.

A good resist pattern can be obtained by coating the resulting resist composition on a substrate using suitable coating means such as spinner or coater, followed by exposure through a predetermined mask, baking, and further development with a developing solution.

Specific examples of the exposure light include g-line, h-line, i-line, KrF excimer laser (248 nm), ArF excimer laser (193 nm), F2 excimer laser (157 nm), X-ray, and electron beam.

As the developing solution, for example, it is possible to use an aqueous alkali solution of inorganic alkalis such as sodium hydroxide, potassium hydroxide, sodium carbonate, sodium silicate, sodium metasilicate, and ammonia water; primary amines such as ethylamine and n-propylamine; secondary amines such as diethylamine and di-n-butylamine; tertiary amines such as triethylamine and methyldiethylamine; alcoholamines such as dimethylethanolamine and triethanolamine; quaternary ammonium salts such as tetramethylammonium hydroxide and tetraethylammonium hydroxide; and cyclic amines such as pyrrole and piperidine. Furthermore, to the aqueous alkali solution, alcohols and surfactants can be added in a suitable amount.

EXAMPLES

The present invention will now be described in detail by way of examples, but the scope of the present invention is not limited to the following examples. The molecular weight distribution was analyzed by GPC-MALLS (gel permeation chromatography multi-angle light scattering detecting method).

Example 1

Synthesis of Multibranched Polymer 1

(1) Preparation of Polymerization Initiator 1

20.0 g (50 mmol) of 1,1,2,2-tetrakis(4-hydroxyphenyl)ethane (TEP), 25.3 g (250 mmol) of triethylamine and 200 ml of tetrahydrofuran (THF) were charged in a flask and then cooled to 0° C. To the mixture, 50.58 g (220 mmol) of 2-bromoisobutyrylbromide diluted with 50 ml of THF was gradually added dropwise. After the completion of the dropwise addition, the reaction solution was aged overnight at room temperature. The reaction solution was filtered thereby removing a triethylamine hydrochlorate, and the solvent was distilled off under reduced pressure from the filtrate. To the resulting residue, dichloromethane and water were added to separate a water layer and an organic layer and thus the organic layer was fractionated and then dried with anhydrous $MgSO_4$. The solvent was distilled off and purified by silica gel column chromatography, and then the resulting crude product was recrystallized to obtain 23.2 g of the objective multibranched polymer as a white crystal (isolation yield: 44%, hereinafter abbreviated to "BiB-TEP").

$^1$H-NMR ($CDCl_3$, d ppm): 2.00 (s, 24H), 4.73 (s, 2H), 6.93, 7.14 (d, 16H)

(2) Synthesis of Multibranched Polymer 1

0.25 g (0.25 mmol) of BiB-TEP obtained in (1), 10.0 g (100 mmol) of methyl methacrylate (hereinafter abbreviated to "MMA") and 40.0 g of THF were charged in a flask and then the inside of the flask was deaerated. Then, 0.24 g (0.25 mmol) of dichlorotris(triphenylphosphine)ruthenium was added, followed by mixing to be uniform. Furthermore, 0.13 g (1 mmol) of di-n-butylamine was added and the polymerization reaction was initiated by heating to 60° C. After polymerization for 7.5 hours, the reaction solution was cooled to 0° C. thereby terminating the polymerization reaction. The reaction rate of MMA determined by gas chromatography analysis was 54%.

The reaction solution was poured into a large amount of methanol and the precipitated polymer crystal was collected by filtration and then dried under reduced pressure at 50° C. for 5 hours to obtain 4.7 g of the objective multibranched polymer 1 a pale yellow crystal (isolation yield: 47%).

As a result of GPC-MALLS analysis, it was found that the resulting multibranched polymer 1 is a monodisperse polymer wherein Mw=22,000 and Mw/Mn=1.17.

Example 2

Synthesis of Multibranched Polymer 2

0.1 g (0.1 mmol) of BiB-TEP obtained in Example 1 (1), 20.0 g (40 mmol) of a homopolymer (trade name: BLEMMER PME-400, manufactured by NOF CORPORATION, hereinafter abbreviated to "PME400") of a monomer ($R_{1000}$=$R_{2000}$=$R_{40a}$=$R_{40b}$=hydrogen atom, $R_{3000}$=$R_{5000}$=methyl group) represented by the formula (a11) and 80.0 g of THF in a flask and then the inside of the flask was deaerated. Then, 0.24 g (0.25 mmol) of dichlorotris(triphenylphosphine)ruthenium was added, followed by mixing to be uniform. Furthermore, 0.1 g (0.1 mmol) of dichlorotris(triphenylphosphine)ruthenium was added, followed by mixing to be uniform. Then, 0.05 g (0.4 mmol) of di-n-butylamine was added and the polymerization reaction was initiated by heating to 60° C. After polymerization for 9 hours, the reaction solution was cooled to 0° C. thereby terminating the polymerization reaction.

After the solvent was distilled off from the reaction solution, the resulting residue was purified by silica gel column chromatography thereby removing the transition metal complex and the unreacted monomer. The resulting viscous oil was dried under reduced pressure at 60° C. for 5 hours to obtain 7.1 g of the objective multibranched polymer 2 as a pale violet viscous substance (isolation yield: 36%).

As a result of GPC-MALLS analysis, it was found that the resulting multibranched polymer 2 is a monodisperse polymer wherein Mw=183,000 and Mw/Mn=1.23.

Example 3

Synthesis of Multibranched Polymer 3

0.50 g (0.5 mmol) of BiB-TEP obtained in Example 1 (1), 0.14 g (1.0 mmol) of CuBr, 0.0067 g (0.05 mmol) of $CuBr_2$, 10.0 g (116 mmol) of methyl acrylate (MA) and 10.0 g (78 mmol) of t-butyl acrylate (tBA) were charged in a flask and the inside of the flask was deaerated. Then, 0.17 g (1.0 mmol) of deaerated N,N,N',N',N''-pentamethyldiethylenetriamine was added, followed by stirring at room temperature for 30 minutes. The polymerization reaction was initiated by heating to 60° C. and, after polymerization for 2 hours, the reaction solution was cooled to 0° C. thereby terminating the polymerization reaction. After the solvent was distilled off from the reaction solution, the residue was dissolved in THF and the transition metal complex was removed by silica gel column chromatography to obtain a crude product. The crude product was reprecipitated from methanol/water to obtain 9.5 g of the objective multibranched polymer 3 as a white crystal (isolation yield: 48%).

As a result of GPC-MALLS analysis, it was found that the resulting multibranched polymer 3 is a monodisperse polymer wherein Mw=27,000 and Mw/Mn=1.04.

$^1$H-NMR analysis revealed that MA/tBA=48/52 (% by weight) and 42/58 (mol %).

Example 4

Synthesis of Multibranched Polymer 4

0.25 g (0.25 mmol) of BiB-TEP obtained in Example 1 (1), 10.0 g (96 mmol) of styrene (St) and 40.0 g of toluene were charged in a flask and then the inside of the flask was deaerated. Then, 0.16 g (0.2 mmol) of chloropentamethylcyclopentadienylbis(triphenylphosphine)-ruthenium was added, followed by mixing to be uniform. Furthermore, 0.26 g (2 mmol) of di-n-butylamine was added and the polymerization reaction was initiated by heating to 100° C. and, after polymerization for 49 hours, the reaction solution was cooled to 0° C. thereby terminating the polymerization reaction. The reaction rate of St determined by gas chromatography analysis was 69%. The reaction solution was poured into a large amount of methanol and the precipitated crystal was collected by filtration. This operation was repeated three times and the resulting crystal of a multibranched polymer 4 was dried under pressure at 60° C. for 5 hours to obtain 7.2 g of a pale orange crystal (isolation yield: 66%).

Example 5

Synthesis of Multibranched Polymer 5

1 g of the multibranched polymer 4 obtained in Example 4, 0.08 g of sodium ethoxide and 15 ml of THF were charged in a 20 ml vial and, after stirring overnight at room temperature, the mixture was added dropwise in a large amount of methanol and then the precipitated crystal was collected by filtration. This operation was repeated three times and a St polymer (arm moiety) was dried under reduced pressure at 60° C. for 5 hours to obtain 0.5 g of a white crystal.

As a result of GPC-MALLS analysis, it was found that the resulting multibranched polymer 5 is a monodisperse polymer having a uniform molecular weight of the arm moiety wherein Mw=14,600 and Mw/Mn=1.03.

Example 6

Synthesis of Multibranched Polymer 6

(1) Preparation of Polymerization Initiator having Tri- or Multibranched Structure 18.0 g (0.16 mol) of a dendrimer type polymer compound (trade name: Boltorn H30, manufactured by Boltorn Co.) which is obtained by repeating the reaction of trimethylolpropane with 2,2-dimethylolpropionic acid (Bis-MPA), followed by the reaction of a hydroxyl group of the resulting reaction product with the same hydroxycarboxylic acid having 2 or more hydroxyl groups (or an acid halide) 1 to 200 times, 21.05 g (0.21 mol) of triethylamine, and 240 ml of tetrahydrofuran (THF) were charged in a flask and then cooled to 0° C. To the mixed solution, 44.14 g (0.192 mol) of 2-bromoisobutyrylbromide was gradually added dropwise at a temperature of 5° C. or lower. After the dropwise addition, the temperature made gradually to room temperature, followed by aging overnight. The salt thus formed was removed by filtration, the solution was concentrated and then dissolved in dichloromethane. This dichloromethane solution was washed five times with a sodium hydrogen carbonate (NaHCO$_3$) solution, washed three times with saturated sodium chloride solution and then dried with magnesium sulfate (Mg$_2$SO$_4$). After substituting with tetrahydrofuran (THF) the solvent was subjecting to column profication to obtain 24.5 g (isolation yield: 60%) of an orange viscous liquid (hereinafter abbreviated to "BiB-Bol").

(2) Synthesis of Multibranched Polymer 6

0.49 g (0.51 mmol) of dichlorotris(triphenylphosphine)ruthenium, 32.0 g (64.4 mmol) of PME400, 1.28 g (0.16 mmol) of BiB-Bol obtained in (1) and 96.0 g of toluene were charged in a flask, followed by mixing to be uniform. This mixed solution was deaerated and 0.27 g (2.1 mmol) of di-n-butylamine was added, followed by heating to 80° C. The polymerization reaction was conducted for 5 hours.

At 5 Hours after the initiation of the polymerization reaction, the polymerization reaction was terminated by cooling the reaction solution to 0° C. The column purification of the reaction solution was conducted thereby removing the metal complex and the unreacted monomer. The viscous residue obtained by concentrating the solvent under reduced pressure was further dried under reduced pressure at 60° C. for 6 hours. The polymerization yield was 87% based on the total amount of the monomer used.

Analysis of the resulting multibranched polymer 6 by a GPC-MALLS method revealed that Mw=407,600 and Mw/Mn=2.20 (hereinafter abbreviated to "P-PME400").

Example 7

Synthesis of Multibranched Polymer 7

0.26 g (0.27 mmol) of dichlorotris(triphenylphosphine)ruthenium, 100.2 g (90 mmol) of a homopolymer (trade name: BLEMMER PME-1000, manufactured by NOF CORPORATION, hereinafter abbreviated to "PME1000") of a monomer ($R_{1000}$=$R_{2000}$=$R_{40a}$=$R_{40b}$=hydrogen atom, $R_{3000}$=$R_{5000}$=methyl group) represented by the formula (a11), 1.33 g (0.17 mmol) of BiB-Bol obtained in (1) and 300.6 g of toluene were charged in a flask, followed by mixing to be uniform. This mixed solution was deaerated and 0.28 g (2.1 mmol) of di-n-butylamine was added, followed by heating to 80° C. The polymerization reaction was conducted for 9 hours.

At 9 hours after the initiation of the polymerization reaction, the polymerization reaction was terminated by cooling the reaction solution to 0° C. The column purification of the reaction solution was conducted thereby removing the metal complex and the unreacted monomer. The viscous residue obtained by concentrating the solvent under reduced pressure was further dried under reduced pressure at 60° C. for 6 hours. The polymerization yield was 65% based on the total amount of the monomer used.

Analysis of the resulting multibranched polymer 7 by a GPC-MALLS method revealed that Mw=733,700 and Mw/Mn=1.86 (hereinafter abbreviated to P-PME1000).

Example 8

Synthesis of Multibranched Polymer 8

0.26 g (0.27 mmol) of dichlorotris(triphenylphosphine)ruthenium, 2.65 g (25.4 mmol) of styrene, 1.33 g (0.17 mmol) of BiB-Bol obtained in (1) and 70.6 g of toluene were charged in a flask, followed by mixing to be uniform. This mixed solution was deaerated and 0.28 g (2.1 mmol) of di-n-butylamine was added, followed by heating to 80° C. The polymerization reaction was conducted for 9 hours.

At 9 Hours after the initiation of the polymerization reaction, the polymerization reaction was terminated by cooling the reaction solution to 0° C. The column purification of the reaction solution was conducted thereby removing the metal complex and the unreacted monomer. The viscous residue obtained by concentrating the solvent under reduced pressure was further dried under reduced pressure at 60° C. for 6 hours to obtain the multibranched polymer 8. The polymerization yield was 29% based on the total amount of the monomer used.

Analysis of the resulting multibranched polymer 8 by a GPC-MALLS method revealed that Mw=190,000 and Mw/Mn=1.61 (hereinafter abbreviated to P-ST*).

Example 9

Synthesis of Multibranched Polymer 9

0.19 g (0.24 mmol) of chloropentamethylcyclopentadienylbis(triphenylphosphine)-ruthenium, 15.0 g (0.037 mmol) of P-PME400, 2.65 g (25.4 mmol) of styrene (St) and 70.6 g of toluene were charged in a flask, followed by mixing to be uniform. This mixed solution was deaerated and 0.16 g (1.2 mmol) of di-n-butylamine was added, and then the polymerization reaction was conducted for 21 hours by heating to 100° C.

The reaction solution was cooled to 0° C. thereby terminating the polymerization reaction. The polymerization yield was 62% based on the total amount of styrene used. The column purification of the reaction solution was conducted thereby removing the metal complex and the unreacted monomer. The viscous residue obtained by concentrating the solvent under reduced pressure was further dried under reduced pressure at 60° C. for 5 hours. The resulting multibranched polymer 9 was a clay-like solid wherein P-PME400:St=90:10 (% by weight:% by weight) and the PEO content of 72%.

Example 10

Synthesis of Multibranched Polymer 10

In the same manner as in Example 9, 0.11 g (0.13 mmol) of chloropentamethylcyclopentadienylbis(triphenylphosphine)-ruthenium, 20.0 g (0.027 mmol) of P-PME1000 synthesized in Example 7, 5.0 g (48 mmol) of styrene and 100 g of toluene were charged in a flask, followed by mixing to be uniform. This mixed solution was deaerated and 0.08 g (0.64 mmol) of di-n-butylamine was added, followed by heating to 100° C. The polymerization reaction was conducted for 23 hours.

At 23 Hours after the initiation of the polymerization reaction, the reaction solution was cooled to 0° C. thereby terminating the polymerization reaction. The polymerization yield was 51% based on the total amount of styrene used. The reaction solution was added dropwise in cold hexane and reprecipitated three times. The resulting polymer was dried overnight under reduced pressure at room temperature. The resulting multibranched polymer 10 was a white crystal wherein P-PME1000:St=88:12 (% by weight:% by weight) and the PEO content is 80%.

The resulting multibranched polymer 10 was dissolved in acetone and a film was formed, and then a cross section of the resulting film was observed by a transmission electron microscope (TEM). As a result, it was found that the film has a microphase separated structure.

Example 11

Synthesis of Multibranched Polymer 11

5 mg (0.05 mmol) of cuprous chloride, 1.0 g (0.005 mmol) of P-ST* synthesized in Example 8, 5.0 g (10.7 mmol) of PME400 and 24.0 g of toluene were charged in a flask, followed by mixing to be uniform. This mixed solution was deaerated and 8.7 mg (0.05 mmol) of PMDETA was added, followed by heating to 80° C. The polymerization reaction was conducted for 21 hours.

The reaction solution was cooled to 0° C. thereby terminating the polymerization reaction. The polymerization yield was 62% based on the total amount of styrene used. The column purification of the reaction solution was conducted thereby removing the metal complex and the unreacted monomer. The viscous residue obtained by concentrating the solvent under reduced pressure was further dried under reduced pressure at 60° C. for 5 hours. The resulting multibranched polymer 11 was a white solid wherein P-PME400:St=72:28 (% by weight:% by weight) and the PEO content is 57%.

Example 12

Synthesis of Multibranched Polymer 12

In the same manner as in Example 11, a multibranched polymer 12 was obtained as a white solid wherein P-PME400:St=81:19 (% by weight:% by weight) and the PEO content is 65%.

Example 13

Production of Polymer Solid Electrolyte and Evaluation Test (1)

The multibranched polymer 9 produced in Example 9 was dissolved in 25 ml of a mixed solvent of acetone/THF in a mixing ratio of 1/1. To this solution, 0.09 g ([Li]/[EO]=0.05) of $LiClO_4$ as an electrolyte salt was added and, after uniform dissolving, the solution was transferred to an aluminum cup. The solution was allowed to stand at room temperature for 24 hours and then dried under reduced pressure at 60° C. for 24 hours to obtain a uniform solid electrolyte membrane having excellent physical properties (thickness: 50 μm).

Under an argon atmosphere, this membrane was interposed between platinum plates and then ionic conductivity at 30° C., 40° C., 50° C. and 60° C. was measured by complex impedance analysis using an impedance analyzer (Model Solartron-1260) at a frequency of 5 to 10 MHz. The results are shown in Table 1.

A cross section of the resulting polymer solid electrolyte membrane was observed by a transmission electron microscope (TEM). The results are shown in FIG. 1. As is apparent from FIG. 1, the membrane structure is a microphase separated structure.

Then, the film of the polymer solid electrolyte membrane obtained in Example 13 was cut into strip-shaped test samples (30 mm×5 mm). The film strength of each sample was measured using a desktop material testing apparatus STA-1150 (manufactured by ORIENTEC Co., LTD).

<Measuring Conditions>
Load Cell Rating: 10 N
Testing Rate: 20.0 mm/min
Chuck-to-Chuck Distance: 20 mm
Environmental Temperature: 25° C.
Environmental Humidity: 60% RH Maximum point stress (MPa) was determined from an S—S curve obtained by the measurement and was taken as a film strength of the polymer solid electrolyte membrane.

The film strength of the polymer solid electrolyte membrane obtained in Example 13 was 3.0 MPa and the polymer solid electrolyte membrane had excellent mechanical strength.

Under an argon atmosphere, a lithium metal pressure-bonded on a copper foil was laminated on this polymer solid electrolyte membrane, and the laminate was interposed between PP plates, followed by fixing with a clip to obtain a test cell. Using the resulting test cell, a polymer solid electrolyte battery was produced by using lithium as a counter electrode and a reference electrode.

Using this battery, stability of a spontaneous-potential (open circuit voltage) of the test cell was confirmed and then linear sweep voltammetry from the spontaneous-potential to +5 V was conducted to obtain a current-potential curve (I-E curve) at 20° C. and 60° C.

Using the battery, a change in current with a retention time was measured by maintaining a potential when arrived at +5 V to obtain a current-time curve (I-t curve) at 20° C. and 60° C.

As is apparent from the above results, the polymer solid electrolyte battery of Example 1 at 20° C. and 60° C. has high conductivity and also has endurance voltage performance at +5 V.

The conditions of a endurance voltage test in an electrochemical stability of +5 V are as follows.

Voltage Range: spontaneous-potential to 5 V, sweep rate: 1 mV/sec
Measuring Temperature: 20, 60° C.

Example 14

Production of Polymer Solid Electrolyte and Evaluation Test (2)

In the same manner as in Example 13, except that the multibranched polymer 9 was replaced by the multibranched polymer 10 obtained in Example 10 and 0.10 g of LiClO$_4$ was used as an electrolyte salt, a uniform polymer solid electrolyte membrane having excellent physical properties was obtained.

Ionic conductivity was measured. The results are shown in Table 1.

Figure 2:
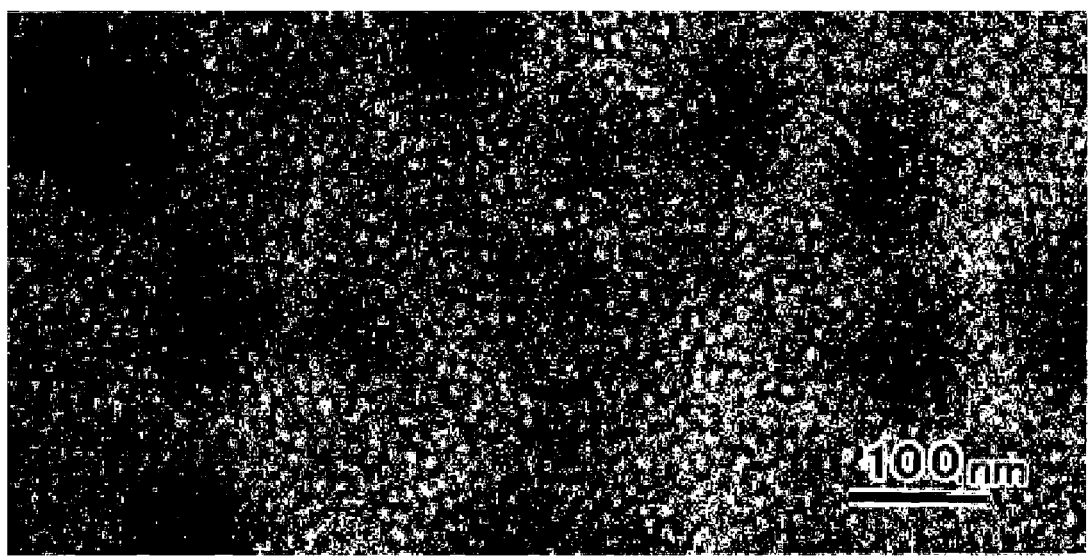
FIG. 2 is a transmission electron micrograph showing a cross section of an electrolyte membrane containing a multibranched polymer of the present invention.

A cross section of the resulting polymer solid electrolyte membrane was observed by a transmission electron microscope (TEM). The results are shown in FIG. 2. As is apparent from FIG. 2, the membrane structure is a microphase separated structure.

In the same manner as in Example 13, the film strength of the resulting polymer solid electrolyte membrane was measured. As a result, it was 2.0 MPa and the polymer solid electrolyte membrane had excellent mechanical strength.

Under an argon atmosphere, a lithium metal pressure-bonded on a copper foil was laminated on this polymer solid electrolyte membrane, and the laminate was interposed between PP plates, followed by fixing with a clip to obtain a test cell. Using the resulting test cell, a polymer solid electrolyte battery was produced by using lithium as a counter electrode and a reference electrode.

Using this battery, linear sweep voltammetry from the spontaneous-potential to +5 V was conducted in the same manner as in Example 13 to obtain a current-potential curve (I-E curve) at 20° C. and 60° C.

Also, using the battery, a change in current with a retention time was measured by maintaining a potential when arrived at +5 V in the same manner as in Example 13 to obtain a current-time curve (I-t curve) at 20° C. and 60° C.

As is apparent from the above results, the polymer solid electrolyte battery of Example 14 at 20° C. and 60° C. has high conductivity and also has endurance voltage performance at +5 V.

Example 15, 16

In the same manner as in Example 13, except that the multibranched polymer 9 was replaced by the multibranched polymer 11 obtained in Example 11 or replaced by the multibranched polymer 12 obtained in Example 12, and LiClO$_4$ was used as an electrolyte salt in the amount of 0.09 g and 0.08 g respectively, a uniform polymer solid electrolyte membranes having excellent physical properties was obtained.

Ionic conductivity was measured. The results are shown in Table 1.

Figure 3:
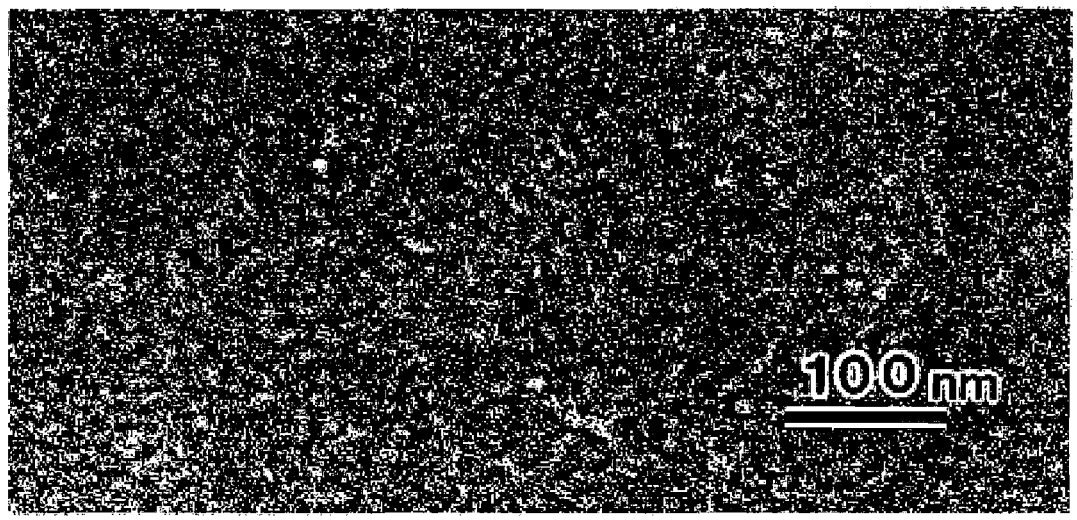
FIG. 3 is a transmission electron micrograph showing a cross section of an electrolyte membrane containing a multibranched polymer of the present invention.
Figure 4:
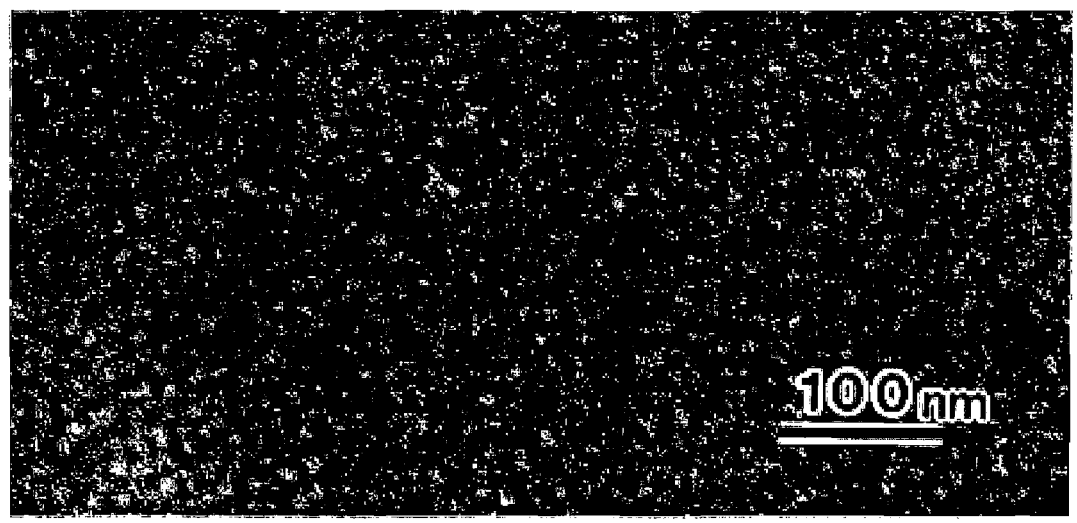
FIG. 4 is a transmission electron micrograph showing a cross section of an electrolyte membrane containing a multibranched polymer of the present invention.

A cross section of the resulting polymer solid electrolyte membrane was observed by a transmission electron microscope (TEM). The results are shown in FIG. 3 (Example 15) and FIG. 4 (Example 16). As is apparent from FIG. 3 and FIG. 4, the membrane structure is a microphase separated structure.

In the same manner as in Example 13, the film strength of the resulting polymer solid electrolyte membrane was measured. As a result, it was 1.0 MPa and the polymer solid electrolyte membranes had excellent mechanical strength.

Under an argon atmosphere, a lithium metal pressure-bonded on a copper foil was laminated on each of polymer solid electrolyte membranes obtained in Example 15 and 16, and the laminate was interposed between PP plates, followed by fixing with a clip to obtain a test cell. Using the resulting test cell, polymer solid electrolyte batteries of Examples 15 and 16 was produced by using lithium as a counter electrode and a reference electrode.

Using this battery, linear sweep voltammetry from the spontaneous-potential to +5 V was conducted in the same manner as in Example 13 to obtain a current-potential curve (I-E curve) at 20° C. and 60° C.

Also, using the battery, a change in current with a retention time was measured by maintaining a potential when arrived at +5 V in the same manner as in Example 13 to obtain a current-time curve (I-t curve) at 20° C. and 60° C.

As is apparent from the above results, the polymer solid electrolyte batteries of Example 15 and 16 at 20° C. and 60° C. have high conductivity and also has endurance voltage performance at +5 V.

Comparative Example 1

In the same manner as in Example 13, except that an electrolytic solution was used in place of the polymer solid electrolyte, a battery was produced using lithium as a counter electrode and a reference electrode and, after confirming stability of a spontaneous-potential (open circuit voltage) of a test cell, linear sweep voltammetry from the spontaneous-potential to +5 V was conducted to obtain a current-potential curve (1-E curve) at 20° C. and 60° C.

Then, a change in current with a retention time was measured by maintaining a potential when arrived at +5 V to obtain a current-time curve (I-t curve) at 20° C. and 60° C.

As is apparent from the measurement results, the polymer solid electrolyte battery of Comparative Example 1 has high conductivity at 30° C., 40° C., 50° C. and 60° C., but current leakage was observed in a endurance voltage performance test at +5 V and it was suggested that an electrolytic solution was decomposed.

Comparative Example 2

In the same manner as in Example 13, except that polyethylene oxide (PEO, Mw=4,000,000) was used in place of the multibranched polymer 1 used in Example 1, a polymer solid electrolyte battery was produced. A film made of PEO by using acetone solution of PEO was interposed between platinum plates and then ionic conductivity at 30° C., 40° C., 50° C. and 60° C. was measured by complex impedance analysis using an impedance analyzer (Model Solartron-1260) at a frequency of 5 to 10 MHz. The measurement results are shown in Table 1.

TABLE 1

|  | Ionic conductivity (S/cm) Measuring temperature | | | |
|---|---|---|---|---|
|  | 30° C. | 40° C. | 50° C. | 60° C. |
| Example 13 | $8.8 \times 10^{-5}$ | $2.1 \times 10^{-4}$ | $3.0 \times 10^{-4}$ | $3.8 \times 10^{-4}$ |
| Example 14 | $1.3 \times 10^{-4}$ | $2.6 \times 10^{-4}$ | $4.2 \times 10^{-4}$ | $6.1 \times 10^{-4}$ |
| Example 15 | $1.1 \times 10^{-5}$ | $2.1 \times 10^{-5}$ | $5.1 \times 10^{-5}$ | $8.0 \times 10^{-5}$ |
| Example 16 | $2.8 \times 10^{-5}$ | $5.8 \times 10^{-5}$ | $9.9 \times 10^{-5}$ | $2.0 \times 10^{-4}$ |
| Comparative Example 1 | $6.2 \times 10^{-5}$ | $3.5 \times 10^{-5}$ | $5.8 \times 10^{-5}$ | $8.0 \times 10^{-4}$ |
| Comparative Example 2 | $1.7 \times 10^{-6}$ | $7.8 \times 10^{-6}$ | $3.3 \times 10^{-5}$ | $2.4 \times 10^{-4}$ |

As is apparent from the measurement results of Table 1, the polymer solid electrolyte membranes (Examples 13 to 16) comprising the multibranched polymer of the present invention have high ionic conductivity within a wide temperature range of 30 to 60° C. On the other hand, the polymer solid electrolyte of Comparative Example 2 had excellent ionic conductivity at 50° C. and 60° C., but ionic conductivity was practically insufficient at low temperature (30° C., 40° C.).

Example 17

Synthesis of ECHMA/NLMA Linear Polymer 3.0 g (15.3 mmol) of ethylcyclohexyl methacrylate, 2.0 g (9 mmol) of 5,3-bicyclo[2.2.1]heptanecarbolacton-2-yl methacrylate, 0.049 g (0.5 mmol) of CuCl and 20 g of THF were charged in a flask and then the inside of the flask was deaerated. To this reaction solution, 0.098 g (0.5 mmol) of ethyl 2-bromoisobutyrate and 0.095 g (0.55 mmol) of N,N, N',N',N"-pentamethyldiethylenetriamine were added, followed by stirring at room temperature for 20 minutes. The polymerization reaction was initiated by heating this mixture to 60° C.

At 16 Hours after the initiation of the polymerization reaction, the reaction solution was cooled to 0° C. thereby terminating the polymerization reaction. The reaction solution was subjected to column purification thereby removing the metal complex. After purifying by reprecipitation with a large amount of methanol, the resulting polymer was dried under reduced pressure at 60° C. for 5 hours to obtain 1.75 g of a white polymer (ECHMA/NLMA linear polymer). The resulting polymer had Mw of 5,500 and Mw/Mn of 1.09.

Example 18

Synthesis of 2MAdMA/NLMA Linear Polymer 2.5 g (10.7 mmol) of 2-methyladamantyl methacrylate, 2.5 g (11.3 mmol) of 5,3-bicyclo[2.2.1]heptanecarbolacton-2-yl methacrylate, 0.049 g (0.5 mmol) of CuCl and 20 g of THF were charged in a flask and then the inside of the flask was deaerated. To this reaction solution, 0.098 g (0.5 mmol) of ethyl 2-bromoisobutyrate and 0.095 g (0.55 mmol) of N,N, N',N',N"-pentamethyldiethylenetriamine were added, followed by stirring at room temperature for 20 minutes. The polymerization reaction was initiated by heating this mixture to 60° C.

At 20 Hours after the initiation of the polymerization reaction, the reaction solution was cooled to 0° C. thereby terminating the polymerization reaction. The reaction solution was subjected to column purification thereby removing the metal complex. After purifying by reprecipitation with a large amount of methanol, the resulting polymer was dried under reduced pressure at 60° C. for 5 hours to obtain 3.0 g of a white polymer (2MAdMA/NLMA linear polymer). The resulting polymer had Mw of 5,900 and Mw/Mn of 1.16.

Example 19

Synthesis of ECHMA/NLMA Star Polymer 4.8 g (24.5 mmol) of ethylcyclohexyl methacrylate, 3.2 g (14.4 mmol) of 5,3-bicyclo[2.2.1]heptanecarbolacton-2-yl methacrylate, 0.079 g (0.8 mmol) of CuCl, 0.4 g (0.1 mmol) of Bol-16Br (hexadeca-branched initiator using Boltorn as a core) and 32 g of THP were charged in a flask and then the inside of the flask was deaerated. To this reaction solution, 0.305 g (1.76 mmol) of N,N,N',N',N"-pentamethyldiethylenetriamine was added, followed by stirring at room temperature for 20 minutes. The polymerization reaction was initiated by heating this mixture to 60° C.

At 2 Hours after the initiation of the polymerization reaction, the reaction solution was cooled to 0° C. thereby terminating the polymerization reaction. The reaction solution was subjected to column purification thereby removing the metal complex. After purifying by reprecipitation with a large amount of methanol, the resulting polymer was dried under reduced pressure at 50° C. for 3 hours to obtain 1.53 g of a white polymer (ECHMA/NLMA star polymer). The resulting polymer had Mw of 43,000 and Mw/Mn of 1.40.

Example 20

Synthesis of 2MAdMA/NLMA Star Polymer 4.0 g (17.1 mmol) of 2-methyladamantyl methacrylate, 4.0 g (18.0 mmol) of 5,3-bicyclo[2.2.1]heptanecarbolacton-2-yl methacrylate, 0.079 g (0.8 mmol) of CuCl, 0.4 g (0.05 mmol) of Bol-32Br (dotriaconta-branched initiator using Boltorn as a core) and 32 g of THF were charged in a flask and the inside of the flask was deaerated. To this reaction solution, 0.098 g (0.5 mmol) of ethyl 2-bromoisobutyrate and 0.153 g (0.88 mmol) of N,N,N',N',N"-pentamethyldiethylenetriamine were added, followed by stirring at room temperature for 20 minutes. The polymerization reaction was initiated by heating this mixture to 60° C.

At 3 Hours after the initiation of the polymerization reaction, the reaction solution was cooled to 0° C. thereby terminating the polymerization reaction. The reaction solution was subjected to column purification thereby removing the metal complex. After purifying by reprecipitation with a large amount of methanol, the resulting polymer was dried under reduced pressure at 50° C. for 3 hours to obtain 2.8 g of a white polymer (2MAdMA/NLMA star polymer). The resulting polymer had Mw of 87,700 and Mw/Mn of 1.35.

$^{13}$C-NMR of the resulting polymer was measured. As a result, 2-MAdMA/NLMA=39/6 μmol %/mol %.

<PGMEA Solubility Test>

Solubility of each of the ECHMA/NLMA linear polymer, the 2MAdMA/NLMA linear polymer, the ECHMA/NLMA star polymer and the 2MAdMA/NLMA star polymer obtained in Examples 17 to 20 in propylene glycol monomethyl ether acetate (hereinafter abbreviated to "PGMEA") was examined. As a result, the ECHMA/NLMA linear polymer and the ECHMA/NLMA star polymer were soluble in PGMEA, but the 2-MAdMA/NLMA linear polymer and the 2-MAdMA/NLMA star polymer were insoluble in PGMEA.

<Resist Evaluation Test>

The ECHMA/NLMA star polymer obtained in Example 19 was dissolved in PGMEA so as to adjust the solid content of the resin to 15% and, furthermore, triphenylsulfonium trifluoromethanesulfonate was added so as to adjust the amount to 3.0% by weight based on the solid content of the resin to prepare a resist solution 1. This resist solution 1 was coated on a silicone wafer using a spin coater and then heated on a hot plate at 110° C. for 90 seconds to obtain a thin membrane having a thickness of about 600 nm.

Figure 5:
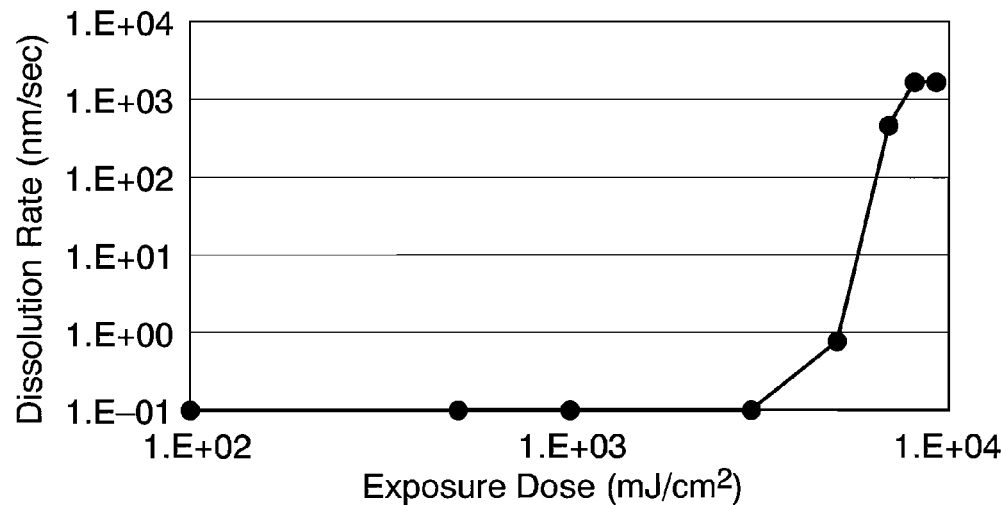
FIG. 5 is a graph showing a relation between the exposure dose (mJ/cm$^2$) and the dissolution rate (nm/sec) measured in a resist evaluation test.

This thin membrane was exposed to light (wavelength: 365 nm, illuminance: 10 mW) from an ultrahigh pressure mercury lamp for a predetermined time and then heated on a hot plate at 100° C. for 90 seconds. With respect to the exposed thin membrane, the dissolution rate was measured using an aqueous 2.38% tetramethylammonium hydroxide solution. A relationships between the exposure dose (mJ/cm$^2$) and the dissolution rate (nm/sec) is shown in FIG. 5. In FIG. 5, the abscissa denotes the exposure dose, and the ordinate denotes the dissolution rate.

As is apparent from FIG. 5, the ECHMA/NLMA star polymer obtained in Example 19 is useful as a resist resin.

Example 21

Synthesis of Multibranched Polymer 13

0.15 g (0.16 mmol) of dichlorotris(triphenylphosphine) ruthenium, 54.0 g (48.5 mmol) of BLEMMER PME-1000 (manufactured by NOF CORPORATION), 6.0 g (46.1 mmol) of hydroxymethyl methacrylate (hereinafter abbreviated to HEMA), 0.8 g (0.1 mmol) of Bo1-32BiB synthesized in the same manner as in Example 6 and 180 g of toluene were charged in a flask, followed by mixing to be uniform. This mixed solution was deaerated and 0.17 g (1.3 mmol) of di-n-butylamine was added, followed by heating to 80° C. thereby initiating the polymerization reaction.

At 7 Hours after the initiation of the polymerization reaction, the reaction solution was cooled to 0° C. thereby terminating the polymerization reaction. The reaction solution was subjected to column purification thereby removing the metal complex and the unreacted monomer. The viscous residue obtained by concentrating the solvent under reduced pressure was dried at 60° C. for 6 hours. The polymerization yield was 68% based on the total amount of the monomer used.

The resulting polymer was analyzed by GPC-MALLS. As a result, Mw=1,340,000 and Mw/Mn=2.77.

0.05 g (0.06 mmol) of chloropentamethylcyclopentadienylbis(triphenylphosphine)ruthenium, 20.0 g (0.015 mmol) of P-(PME1000/HEMA), 20.0 g (192 mmol) of styrene, and 160 g of toluene were charged in a flask and then uniformly mixed. This mixed solution was deaerated and 0.04 g (0.3 mmol) of di-n-butylamine was added, and then the polymerization reaction was initiated by heating to 100° C.

At 41 Hours after the initiation of the polymerization reaction, the reaction solution was cooled to 0° C. thereby terminating the polymerization reaction. The polymerization rate of styrene was 36%. The reaction solution was subjected to column purification thereby removing the metal complex. The viscous residue obtained by concentrating the solvent under reduced pressure was reprecipitated with cold hexane and then dried under reduced pressure at room temperature for 10 hours. The resulting multibranched polymer was a crystal wherein PME1000:HEMA:St=66:7:27 (wt %:wt %:wt %) and the PEO content is 60%.

In a nitrogen substituted 500 mL four-neck flask, 17 g of dehydrated tetrahydrofuran (hereinafter abbreviated to THF) and 153 g of dehydrated toluene were added and the reaction system was maintained at −40° C. with stirring. To the reaction system, 2.4 g (5.1 mmol) of DPE-(m-OTBDMS)$_2$(diphenylethylene-(m-OSit-Bu(CH$_3$)$_2$) and 1.82 g (2.7 mmol) of an n-butyl lithium/hexane 1.6 mol/L solution (hereinafter abbreviated to NBL) were added, followed by aging at −40° C. for 30 minutes. Then, 30.4 g (292 mmol) of styrene was added to the reaction system and the polymerization was conducted. 20 Minutes after the completion of the dropwise addition, sampling was conducted and the completion of the polymerization was confirmed by gas chromatography (hereinafter abbreviated to GC).

This polymer solution was analyzed by GPC. As a result, it was a polymer having a single peak wherein the molecular weight Mn=9940 and the polydispersity index Mw/Mn=1.088.

In this reaction system, 0.33 g (0.53 mmol) of 1,1,2,2-tetrakis-(4-ethoxycarbonylphenyl)ethane dissolved in 5 ml of hydrated THF was added and, after the reaction was continued for 30 minutes, the reaction was terminated using methanol. This polymerization solution was poured into a large amount of methanol thereby precipitating a polymer, followed by filtration, washing, and further drying under vacuum at 50° C. for 5 hours to obtain 29.8 g (yield: 98%) of a white powdered polymer.

An excessive amount of an arm polymer was removed by separating solution to obtain a white powdered star polymer. This polymer was measured by GPC-MALLS. As a result, the molecular weight Mw=75300 and the polydispersity index Mw/Mn=1.008.

Example 22

Synthesis of Multibranched Polymer 14

In a nitrogen substituted 300 mL flask, 10.8 g (0.14 mmol) of the star polymer obtained in Example 2, 160 g of dehydrated CHCl$_3$, 40 g of dehydrated acetonitrile, 0.62 g (7.1 mmol) of LiBr and 1.16 g (10.7 mmol) of TMS-Cl were added and then aged at 40° C. for 48 hours. The solution was reprecipitated with a large amount of MeOH and then dried under reduced pressure at 50° C. for 5 hours to obtain 10.2 g of a white polymer. This polymer was measured by GPC-MALLS. As a result, the molecular weight Mw=73400 and the polydispersity index Mw/Mn=1.022.

1.5 g (0.02 mmol) of the star type PSt initiator obtained here, 0.06 g (0.06 mmol) of dichlorotris(triphenylphosphine)ruthenium, 2.0 g (1.8 mmol) of BLEMMER PME-1000 (manufactured by NOF CORPORATION), 0.2 g (1.7 mmol) of hydroxymethyl methacrylate (hereinafter abbreviated to HEMA) and 14.6 g of toluene were charged in a flask and then uniformly mixed. This mixed solution was deaerated and 0.03 g (0.3 mmol) of di-n-butylamine was added, and then the polymerization reaction was initiated by heating to 80° C.

At 24 Hours after the initiation of the polymerization reaction, the reaction solution was cooled to 0° C. thereby terminating the polymerization reaction. The reaction solution was subjected to column purification thereby removing the metal complex and the unreacted monomer. The viscous residue obtained by concentrating the solvent under reduced pressure was reprecipitated with cold hexane and then under reduced pressure at 30° C. for 10 hours. The resulting polymer was a crystal wherein PME1000:HEMA:St=43:8:49 (wt %:wt %:wt %) and the PEO content is 39%. This polymer was measured by GPC-MALLS. As a result, the molecular weight Mw=301,000 and the polydispersity index Mw/Mn=1.91.

Example 23

Synthesis of Linear Polymer B-A1-B Copolymer

Under an argon atmosphere, 135.0 g (121.3 mmol) of methoxypolyethylene glycol monomethacrylate (manufactured by NOF CORPORATION, BLEMMER PME-1000, in the formula (I), $R^1=R^2=R^{4a}=R^{4b}$=hydrogen atom, $R^3=R^5$=methyl group, m=23, hereinafter abbreviated to "PME-1000"), 15.0 g (115.3 mmol) of HEMA and 450 g of toluene were charged in a flask, uniformly mixed and then subjected to a deaeration treatment.

To this mixed solution, 0.72 g (0.75 mmol) of dichlorotris(triphenylphosphine)ruthenium and 0.39 g (3 mmol) of di-n-butylamine were added and also 0.28 g (1.5 mmol) of 2,2-dichloroacetophenone was added, and then the polymerization reaction was initiated by heating to 80° C. with stirring.

At 47 Hours after the initiation of the polymerization reaction, the reaction system was cooled to 0° C. thereby terminating the polymerization reaction. The column purification of the reaction solution was conducted thereby removing the metal complex and the unreacted monomer. The viscous residue obtained by removing the volatile component under reduced pressure was dried under reduced pressure at 60° C. for 5 hours. The polymerization yield was 76% based on the total amount of the monomer used.

As described above, a random copolymer of PME-1000 and HEMA was obtained. GPC-MALLS analysis of the resulting polymer was conducted. As a result, Mn=215,000 and Mw/Mn=2.26. This polymer is abbreviated to "P-PME/HEMA-1".

Under an argon atmosphere, 50.0 g (2.33 mmol) of P-PME/HEMA-1, 75.0 g (720 mmol) of St and 300 g of toluene were charged in a flask, uniformly mixed and then subjected to a deaeration treatment. To this mixed solution, 0.12 g (0.15 mmol) of chloropentamethylcyclopentadienylbis(triphenylphosphine)-ruthenium (hereinafter abbreviated to "CPS") and 0.07 g (0.5 mmol) of di-n-butylamine were added and the copolymerization reaction was initiated by heating to 100° C.

At 68 Hours after the initiation of the copolymerization reaction, the reaction system was cooled to 0° C. thereby terminating the copolymerization reaction. The polymerization yield of styrene was 21%. The viscous residue obtained by reprecipitating with a large amount of hexane was dried under reduced pressure at 30° C. for 20 hours.

As described above, a copolymer wherein a block chain B composed of polystyrene (PSt) and a block chain A1 composed of P-PME/HEMA-1 are bonded in the sequence of B-A1-B was obtained.

$^1$H-NMR analysis of the resulting copolymer revealed that a polymer has a composition ratio of PME-1000/HEMA/St=68/8/24 (wt %) and the content of PEO (polyethylene oxide) is 62%. The copolymer thus obtained is abbreviated to "R-1".

Example 24

Preparation of Adhesive Containing Electrolyte Salt (Lithium Salt)

(1) Production of Lithium Salt-Containing Polymer 1 g of a polymer 13 was dissolved in 9 g of a mixed solvent of tetrahydrofuran (hereinafter abbreviated to "THF") and acetonitrile (THF: 4 g; acetonitrile: 5 g) and also 62 mg of $LiPF_6$ was added and uniformly dissolved to prepare an adhesive (polymer $ALiPF_6$). An equivalent ratio of metal (Li) in the electrolyte salt ($LiPF_6$) added to ethylene oxide (hereinafter abbreviated to "EO") in 1 g of the polymer A, ([Li]/[EO]), was 0.03.

(2) Preparation of Adhesive Containing Crosslinking Agent 1 g of a polymer A was dissolved in 9 g of a mixed solvent of THF and acetonitrile (THF: 4 g; acetonitrile: 5 g) and 46 mg of tolylene-2,4-diisocyanate (hereinafter abbreviated to "TDI") as a crosslinking agent was added and uniformly dissolved to prepare an adhesive (polymer A TDI (100%)). The proportion of crosslinking by TDI (crosslinking rate of TDI) among crosslinking points in this adhesive polymer was 100%.

The same operation was conducted, except that the amount of a crosslinking agent (TDI) was decreased, an adhesive (polymer A TDI (50%)) was prepared. The proportion of crosslinking by TDI (crosslinking rate of TDI) among crosslinking points in this adhesive polymer was 50%.

The same operation was conducted, except that a polymer 14 was used in place of a polymer 13, an adhesive polymer B TDI (100%)) and a polymer B TDI (50%)) were prepared. The proportion of crosslinking by TDI (crosslinking rate of TDI) among crosslinking points in this adhesive polymer was 100% and 50%, respectively.

(3) Preparation of Adhesive Containing Crosslinking Agent and Electrolyte Salt 1 g of a polymer 13 was dissolved in 9 g of a mixed solvent of THF and acetonitrile (THF: 4 g; acetonitrile: 5 g), and 46 mg of tolylene-2,4-diisocyanate (hereinafter abbreviated to "TDI") as a crosslinking agent and 62 mg ([Li]/[EO])=0.03) of $LiPF_6$ were added and uniformly dissolved to prepare an adhesive (polymer E TDI (100%) $LiPF_6$). The proportion of crosslinking by TDI (crosslinking rate of TDI) among crosslinking points in this adhesive polymer was 100%.

The same operation was conducted, except that the amount of a crosslinking agent (TDI) was decreased, an adhesive (polymer A TDI (50%) $LiPF_6$) was prepared. The proportion of crosslinking by TDI (crosslinking rate of TDI) among crosslinking points in this adhesive polymer was 50%.

Comparative Example 3

Using a linear polymer B-A1-B copolymer, the same manner as in the above example, a lithium salt-containing polymer (linear polymer B-A1-B copolymer $LiPF_6$) and an adhesive containing crosslinking agent (linear polymer B-A1-B copolymer TDI (100%) and linear polymer B-A1-B copolymer TDI (50%)), and an adhesive containing a crosslinking agent and an electrolyte salt (linear polymer B-A1-B copolymer TDI (100%) LiPF$_6$) were prepared. An equivalent ratio of metal (Li) in the electrolyte salt (LiPF$_6$) added to EO in 1 g of the polymer, ([Li]/[EO]), was 0.03.

Comparative Example 4

0.3 g of polyvinylidene fluoride (hereinafter abbreviated to "PVdF") was dissolved in 4.7 g of an NMP solvent and 21.4 mg of LiPF$_6$ was added and uniformly dissolved to prepare an adhesive (PVdF LiPF$_6$).

Example 25

Adhesion Test 1

(1) Production of Adhesion Test Material

An aluminum plate (100 mm×25 mm×1 mm) was prepared and each adhesive described in Table 2 was coated on the part (12.5 mm×25 mm) of one end. Separately, a polyethylene porous film (100 mm×25 mm×1 mm) was prepared and the part (12.5 mm×25 mm) of one end was laminated on the part coated with the adhesive of the aluminum plate. Then, the laminate was vacuum-dried with heating (heating at 25° C. for 0.5 hours, followed by heating at 60° C. for 4 hours) to obtain an adhesion test sample.

(2) Measurement of Adhesive Strength

Both ends of the resulting adhesion test sample were set to an autograph (manufactured by Shimadzu Corporation) and a tensile test was conducted at 25° C. at a testing speed of 10 mm/min. The tensile test was carried out according to JIS K 6850: 1990. The rupture stress (MPa) was calculated from the measurement results of the tensile test. The results are shown in Table 2.

TABLE 2

| | Adhesive | Rupture stress (MPa) |
|---|---|---|
| Example 25 | Polymer 13 | 0.212 |
| Example 25 | Polymer 13 LipF$_6$ | 0.202 |
| Example 25 | Polymer 13 TDI (50%) | 0.269 |
| Example 25 | Polymer 13 TDI (100%) | 0.267 |
| Example 25 | Polymer 13 TDI (100%) LipF$_6$ | 0.274 |
| Example 25 | Polymer 14 | 0.157 |
| Example 25 | Polymer 14 TDI (100%) | 0.119 |
| Comparative Example 3 | Linear polymer | 0.116 |
| Comparative Example 3 | Linear polymer LipF$_6$ | 0.202 |
| Comparative Example 3 | Linear polymer TDI (50%) | 0.166 |
| Comparative Example 3 | Linear polymer TDI (100%) | 0.162 |
| Comparative Example 3 | Linear polymer TDI (100%) LipF$_6$ | 0.242 |
| Comparative Example 4 | PvdF | 0.079 |
| Comparative Example 4 | PvdF LipF$_6$ | 0.100 |

As is apparent from the results shown in Table 2, both the polymers 13 and 14 have higher adhesive strength than that of polyvinylidene fluoride of Comparative Example 4. In the case of comparing the polymer 13 and PVdF, which has almost the same PEO content, the polymer 13 as the multi-branched polymer shows high adhesive strength when the polymer is used alone, and when a crosslinking agent (TDI) is added, and when an electrolyte salt (lithium salt) is further added in addition to a crosslinking agent (TDI).

Example 26

Solvent Resistance of Adhesive

A graphite electrode was prepared and each adhesive described in Table 2 was coated thereon. Separately, a polyethylene porous film (20 mm×20 mm×0.02 mm) was prepared and then laminated on the part coated with the adhesive of the graphite electrode. Then, the laminate was vacuum-dried with heating (heating at 25° C. for 0.5 hours, followed by heating at 60° C. for 4 hours) to obtain an adhesion test sample.

A mixed solvent of ethylene carbonate/diethylene carbonate in a mixing ratio of 3/7 (volume ratio) wherein the concentration of a lithium salt (LiPF$_6$) is 1 M was prepared and the adhesion test sample was dipped in 20 ml of the mixed solvent, and then solvent resistance of the adhesive polymer was examined. The test conditions are as follows, that is, the test sample was allowed to stand at room temperature for 12 hours, followed by standing at 60° C. for 2 hours, standing at 80° C. for 2 hours and standing at 100° C. for 2 hours.

As a result of the measurement, the case where the adhesive polymer had satisfactory adheres to the polyethylene porous film in the mixed solvent was rated "A", the case where the polyethylene porous film is partially peeled off was rate "B", the case where the polyethylene porous film is partially peeled off by about 50% was rate "C", and the case where the polyethylene porous film is completely peeled off was rate "D", respectively.

TABLE 3

| | Test conditions | | | |
|---|---|---|---|---|
| Adhesive | Room temperature × 12 h | 60° C. × 2 h | 80° C. × 2 h | 100° C. × 2 h |
| Polymer 13 | A | A | C | C |
| Polymer 13 TDI (100%) | A | C | C | C |
| Polymer 14 | A | A | A | A |
| Polymer 14 TDI (100%) | A | A | A | A |
| Linear polymer | D | D | D | D |
| Linear polymer TDI (100%) | C | C | D | D |

As is apparent from the results shown in Table 3, the linear polymer is inferior in solvent resistance, but both the polymers 13 and 14 hold the polyethylene porous film in the mixed solvent without causing peeling and show excellent solvent resistance.

It was also found that the polymers 13 and 14 as the multi-branched polymer satisfactory bond and hold the polyethylene porous film in the mixed solvent without causing peeling even if TDI crosslinking was not conducted.

Example 27

Conductivity Test

Under an argon atmosphere, an adhesive (polymer 13 LiPF$_6$), (polymer 13 TDI (100%) LiPF$_6$), (linear polymer LiPF$_6$), (linear polymer TDI (100%) LiPF$_6$) was coated on a polytetrafluoroethylene plate and then vacuum-dried with heating (heating at 25° C. for 0.5 hours, followed by heating at 65° C. for 4 hours) to obtain a uniform membrane for evaluation of electric conductivity (thickness: 100 μm). The resulting membrane for evaluation was interposed between platinum plates and then ionic conductivity was measured by complex impedance analysis using an impedance analyzer (Model Solartron-1260) at a frequency of 5 to 10 Hz. The results are shown in FIG. 6 below.

Figure 6:
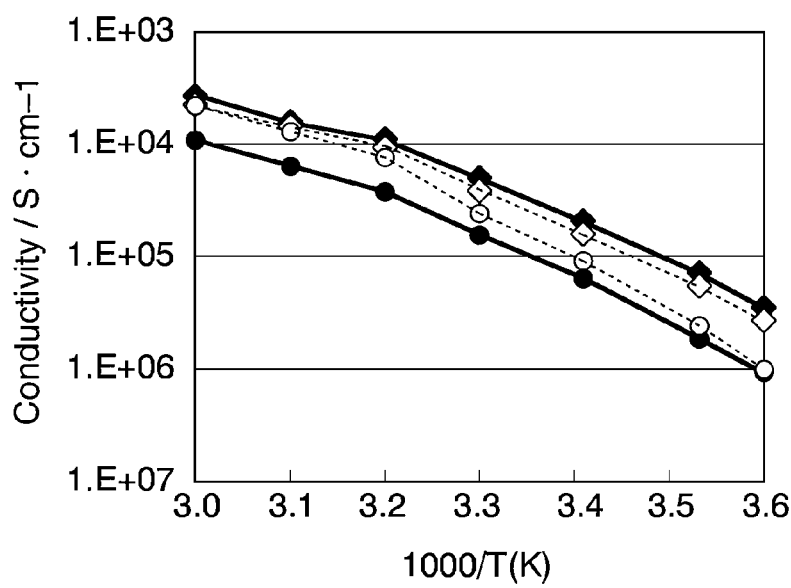
FIG. 6 is a graph showing a change in electric conductivity of an adhesive of the present invention.

As is apparent from the results shown in FIG. 6, the polymer 13 showed excellent ionic conductivity in each membrane for evaluation as compared with the linear polymer.

INDUSTRIAL APPLICABILITY

The multibranched polymer of the present invention is a narrowly dispersed multibranched polymer having a controlled molecular weight, and is useful as a raw material for producing a polymer solid electrolyte, an adhesive material, and a binder material of an electrode, which are excellent in thermal characteristics, mechanical strength and ionic conductivity. Also, the multibranched polymer of the present invention is suited for use as a resist material; an electrochemical material for battery, capacitor, sensor, condenser, EC device, and photoelectric transducer; an inclusion material; and a functional material for electric appliances and industrial equipments.

According to the method for producing the multibranched polymer of the present invention, a narrowly dispersed multibranched polymer having a controlled molecular weight can be produced simply and efficiently. The production method of the present invention is suited for use as a method for producing the multibranched polymer of the present invention.

The polymer solid electrolyte of the present invention contains the multibranched polymer of the present invention, and an electrolyte salt, and has ionic conductivity in practical high level.

The polymer solid electrolyte battery of the present invention comprises the polymer solid electrolyte of the present invention and has thermal characteristics, physical characteristics and ionic conductivity in a practical level.

The multibranched polymer is suited for use as an adhesive, and a material for forming a battery of a binder of an electrode.

The invention claimed is:

1. A multibranched polymer comprising a structure represented by formula (II):

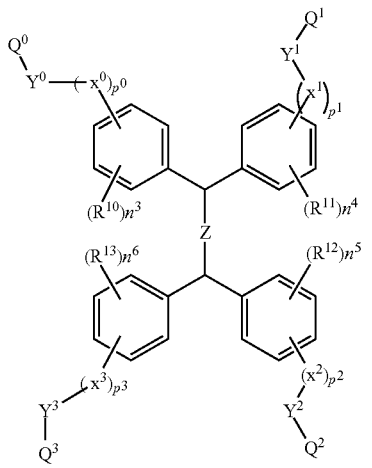

(II)

wherein

Z represents $(CH_2)_q$ or a p-phenylene group, q represents an integer of 0 to 3, $R^{10}$, $R^{11}$, $R^{12}$ and $R^{13}$ each independently represents a hydrogen atom, a C1-C6 alkyl group, an aryl group which may have a substituent, a halogen atom, or a C1-C6 alkoxyl group, $n^3$, $n^4$, $n^5$ and $n^6$ each independently represents an integer of 0 to 3, $X^0$, $X^1$, $X^2$ and $X^3$ each independently represents a linking group containing any atom selected from the group consisting of carbon, nitrogen, oxygen, silicon, phosphorus, sulfur, germanium, arsenic, selenium, tin, antimony, tellurium, and lead, $Y^0$, $Y^1$, $Y^2$ and $Y^3$ each independently represents a functional group having a structure capable of having an active halogen atom, $p^0$ to $p^3$ each independently represents an integer of 0 or 1 or more, and $Q^0$, $Q^1$, $Q^2$ and $Q^3$ each independently represents an arm moiety having a repeating unit derived from a polymerizable unsaturated bond.

2. The multibranched polymer according to claim 1, wherein the functional group having a structure capable of having an active halogen atom is a group having a structure represented by the formula (IV):

(IV)

wherein $T^1$ represents a divalent electron attractive group, $R^{20}$ represents a hydrogen atom, a halogen atom, a C1-C6 alkyl group, a C7-C12 aralkyl group, an aryl group, an ester group, or an acyl group, $R^{21}$ represents a hydrogen atom, a C1-C6 alkyl group, a C7-C12 aralkyl group, an aryl group, an ester group, or an acyl group, the symbol ● represents the substitution position of a halogen atom, or the formula (V):

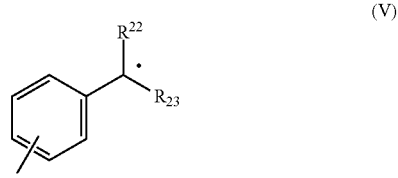

(V)

wherein $R^{22}$ represents a hydrogen atom, a halogen atom, a C1-C6 alkyl group, a C7-C12 aralkyl group, an aryl group, an ester group, or an acyl group, $R^{23}$ represents a hydrogen atom, a C1-C6 alkyl group, a C7-C12 aralkyl group, an aryl group, an ester group, or an acyl group, and the symbol ● represents the substitution position of a halogen atom.

3. The multibranched polymer according to claim 2, wherein $T^1$ in the formula (IV) is a group represented by the formula:

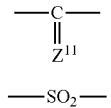

(t 11)

—SO$_2$—  (t 21)

wherein
$Z^{11}$ represents an oxygen atom, a sulfur atom, or a group represented by Nr71 (r71 represents a hydrogen atom, a C1-C6 alkyl group, a phenyl group which may have a substituent, an alkylcarbonyl group, a phenylcarbonyl group which may have a substituent, an alkylsulfonyl group, or a phenylsulfonyl group which may have a substituent).

4. The multibranched polymer according to claim 1, wherein the repeating unit derived from a polymerizable unsaturated bond is a repeating unit derived from at least one selected from the group consisting of (meth)acrylic acid, a (meth)acrylic acid derivative, styrene, a styrene derivative and a vinyl group-containing heteroaryl compound.

5. The multibranched polymer according to claim 1, wherein the repeating unit derived from a polymerizable unsaturated bond includes a repeating unit (a) represented by the formula (a1):

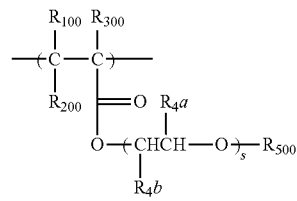

(a$_1$)

wherein
$R_{100}$, $R_{200}$ and $R_{300}$ each independently represents a hydrogen atom or a C1-10 hydrocarbon group,
$R_{100}$ and $R_{300}$ may be combined to form a ring,
$R_{4a}$ and $R_{4b}$ each independently represents a hydrogen atom or a methyl group,
$R_{500}$ represents a hydrogen atom, a hydrocarbon group, an acyl group, or a silyl group,
s represents any integer of 2 to 100, and
groups represented by the formula: —CH($R_{4b}$)—CH($R_{4a}$)—O— may be the same or different.

6. The multibranched polymer according to claim 1, which is a polymer having a weight average molecular weight of 10,000 to 2,000,000.

\* \* \* \* \*